United States Patent [19]

Ransburg et al.

[11] Patent Number: 4,646,224

[45] Date of Patent: Feb. 24, 1987

[54] SPRINKLER CONTROLLER WHICH COMPUTES SPRINKLER CYCLES BASED ON INPUTTED DATA

[75] Inventors: David P. Ransburg; Douglas C. Fletcher, both of Peoria, Ill.; Sven E. Wahlstrom, Palo Alto, Calif.

[73] Assignee: L. R. Nelson Corporation, Peoria, Ill.

[21] Appl. No.: 558,043

[22] Filed: Dec. 5, 1983

[51] Int. Cl.$^4$ .................. G05B 11/01; A01G 27/00
[52] U.S. Cl. .................. 364/143; 364/145; 364/146; 364/186; 364/420; 371/20; 137/624.18; 137/624.2; 239/63; 239/67; 239/68; 239/69; 239/70; 417/12; 417/27; 417/505
[58] Field of Search ............... 364/143, 144, 145, 146, 364/200, 420, 900, 186; 137/624.18, 624.2; 239/63-70; 417/12, 27, 316, 505; 371/20

[56] References Cited

U.S. PATENT DOCUMENTS

| | | | |
|---|---|---|---|
| 484,294 | 10/1892 | Carlson | 239/189 |
| 1,079,817 | 11/1913 | Williamson | 239/189 |
| 2,578,981 | 12/1951 | Parker | 299/27 |
| 2,674,490 | 4/1954 | Richards | 299/25 |
| 3,037,704 | 6/1962 | Kinigsberg et al. | 239/63 |
| 3,114,243 | 12/1963 | Winters | 61/12 |
| 3,123,304 | 3/1964 | Sutton | 239/77 |
| 3,200,539 | 8/1965 | Kelly | 47/1 |
| 3,349,794 | 10/1967 | Behlen | 137/344 |
| 3,643,442 | 2/1972 | Houston | 239/177 |
| 3,684,178 | 8/1972 | Friedlander | 239/189 |
| 3,723,753 | 3/1973 | Davis | 307/41 |
| 3,771,720 | 11/1973 | Courtright | 239/189 |
| 3,829,842 | 8/1974 | Langdon et al. | 364/143 |
| 4,007,458 | 2/1977 | Hollabaugh | 340/310 R |
| 4,015,366 | 4/1977 | Hall | 239/69 |
| 4,059,227 | 11/1977 | Hunter | 239/66 |
| 4,061,927 | 12/1977 | Link | 307/41 |
| 4,165,532 | 8/1979 | Kendall et al. | 364/420 |
| 4,176,395 | 11/1979 | Evelyn-Veere et al. | 364/146 |
| 4,189,776 | 2/1979 | Kendall | 364/420 |
| 4,209,131 | 6/1980 | Barash et al. | 364/144 |
| 4,217,646 | 8/1980 | Caltagirone et al. | 364/145 |
| 4,256,133 | 3/1981 | Coward et al. | 239/64 |
| 4,279,012 | 7/1981 | Beckedorff et al. | 364/145 |
| 4,396,149 | 8/1983 | Hirsch | 239/63 |
| 4,471,424 | 9/1984 | Persson | 364/145 |
| 4,522,336 | 6/1985 | Culp | 364/148 |
| 4,548,225 | 10/1985 | Busalacchi | 239/69 |

*Primary Examiner*—Jerry Smith
*Assistant Examiner*—John R. Lastova
*Attorney, Agent, or Firm*—Cushman, Darby & Cushman

[57] ABSTRACT

A sprinkler system including a controller having a manual data entry device, a processor and a sprinkler controller. Data is entered through the data entry means relating to conditions in each of a number of zones in which sprinkling is to occur with respect to the amount of water needed to be applied to that zone and the soil water infiltration rate. Upon receiving this information, the processor determines for each zone the number of cycles and the length of time in each cycle that water is to be applied not only so that the amount of water applied during each cycle does not exceed the amount of water the soil can absorb during that cycle, but also so that the total amount of water needed by that zone is applied. The processor employs the number of cycles and the length of on time per cycle to organize the cycles for all of the zones, creating an application program. The application program is employed by the sprinkler controller to generate control signals for executing the application program on an automatic basis. An operator provides data concerning which days an application is desired, the type of soil in the area to be irrigated, the type of sprinkler for each zone, the water need of the vegetation in each zone and the desired start time. Then, the controller calculates the number of cycles for each zone per application and the length of time in each cycle the sprinkler is to be on.

56 Claims, 39 Drawing Figures

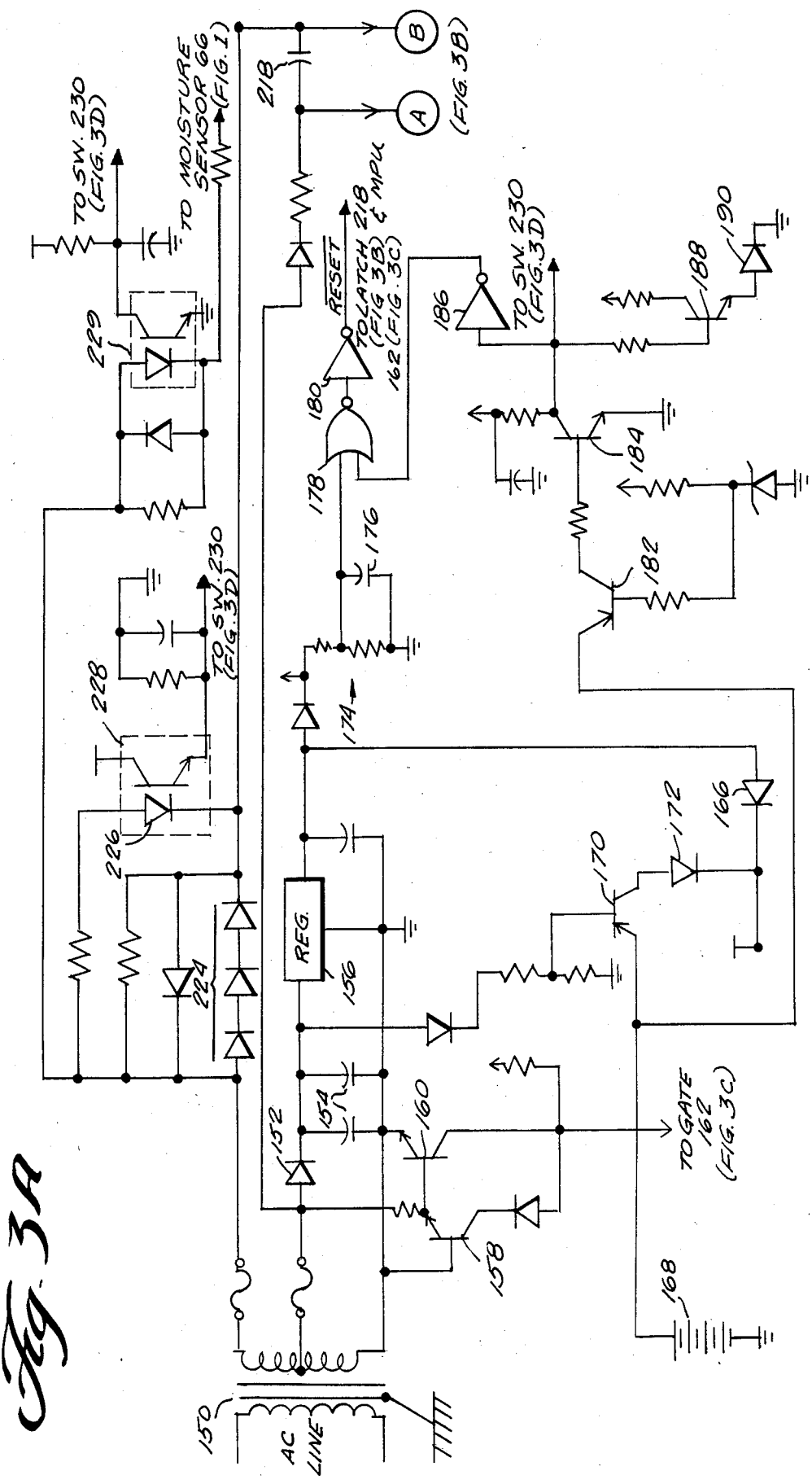

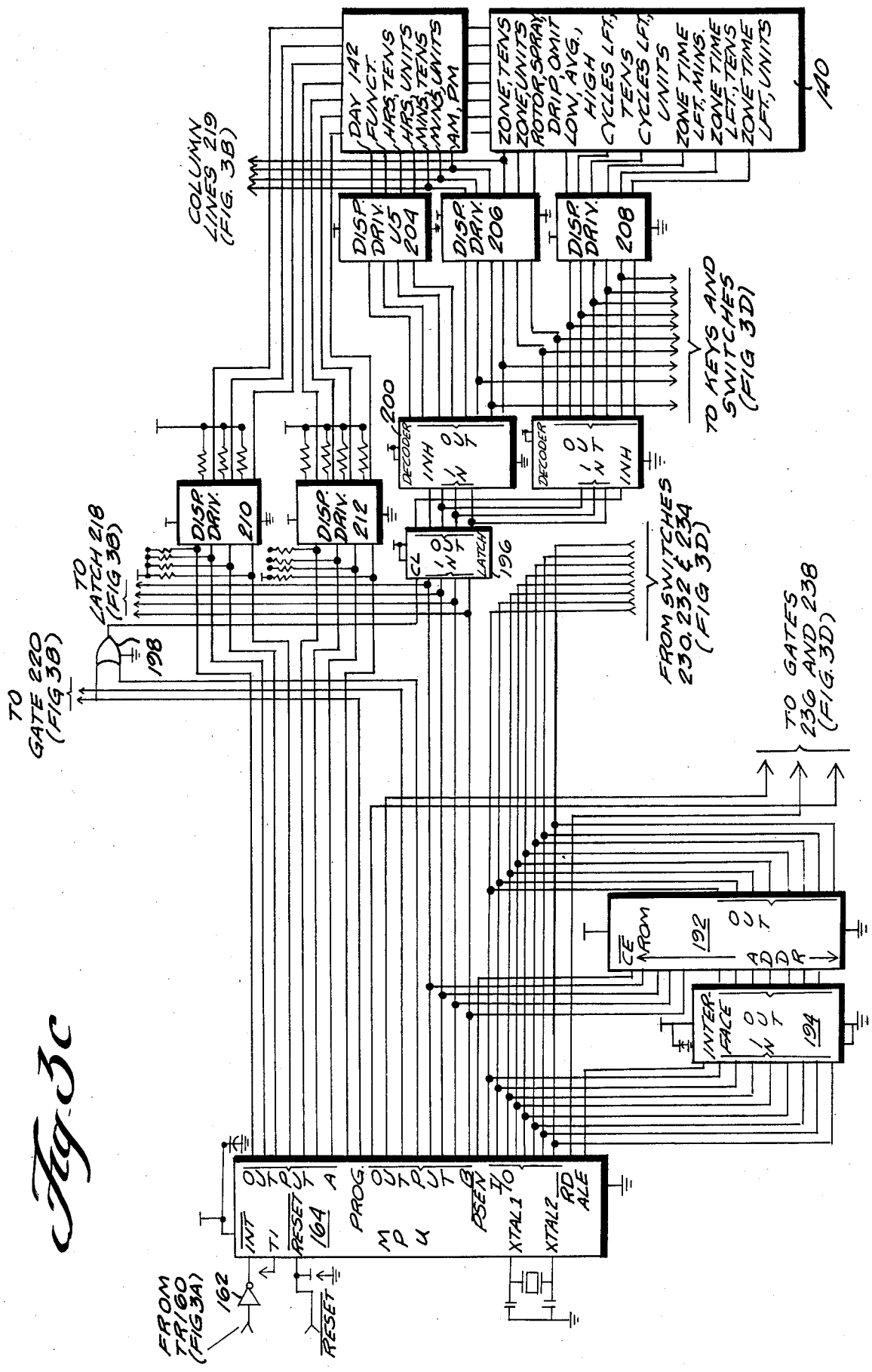

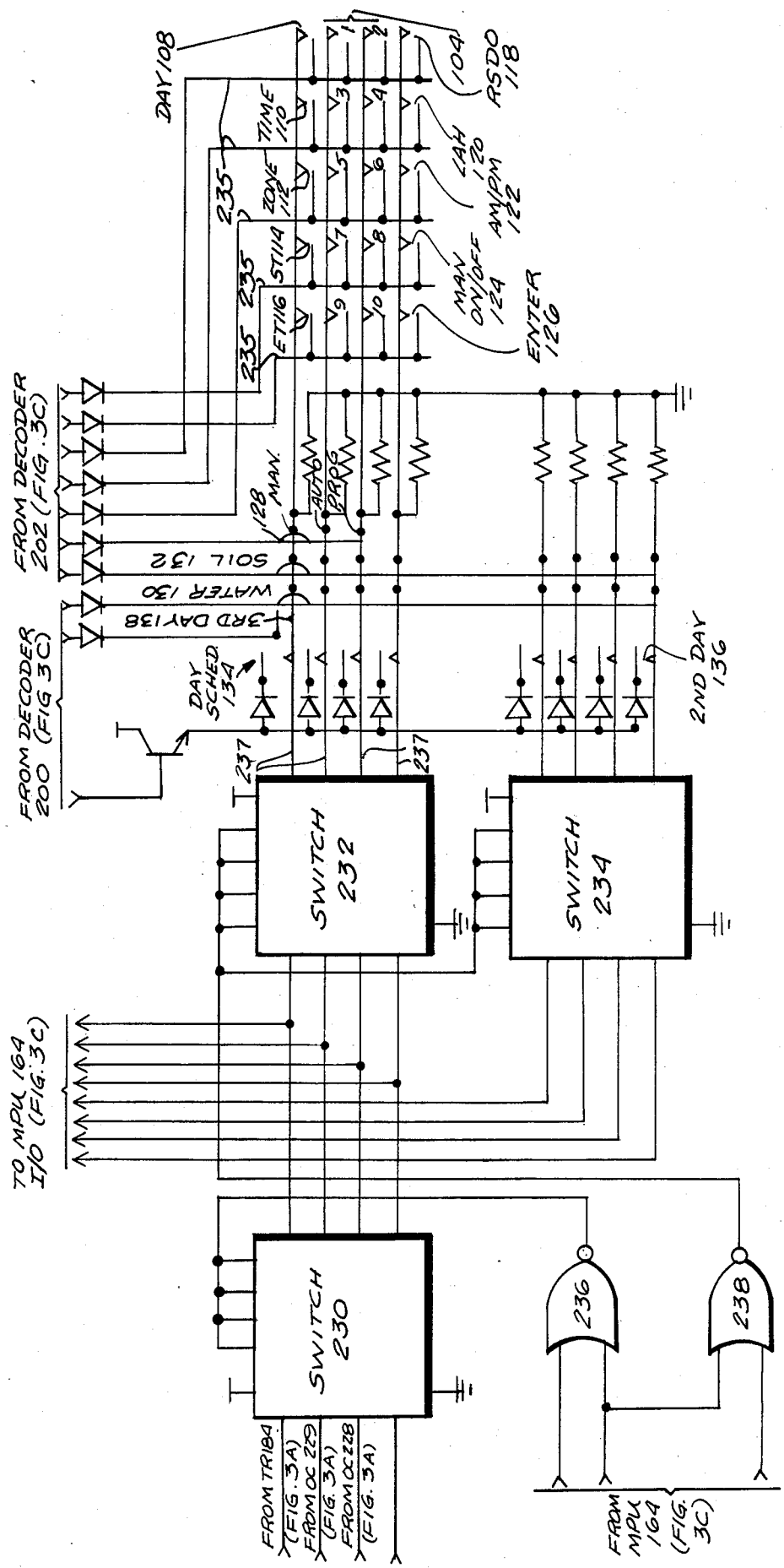

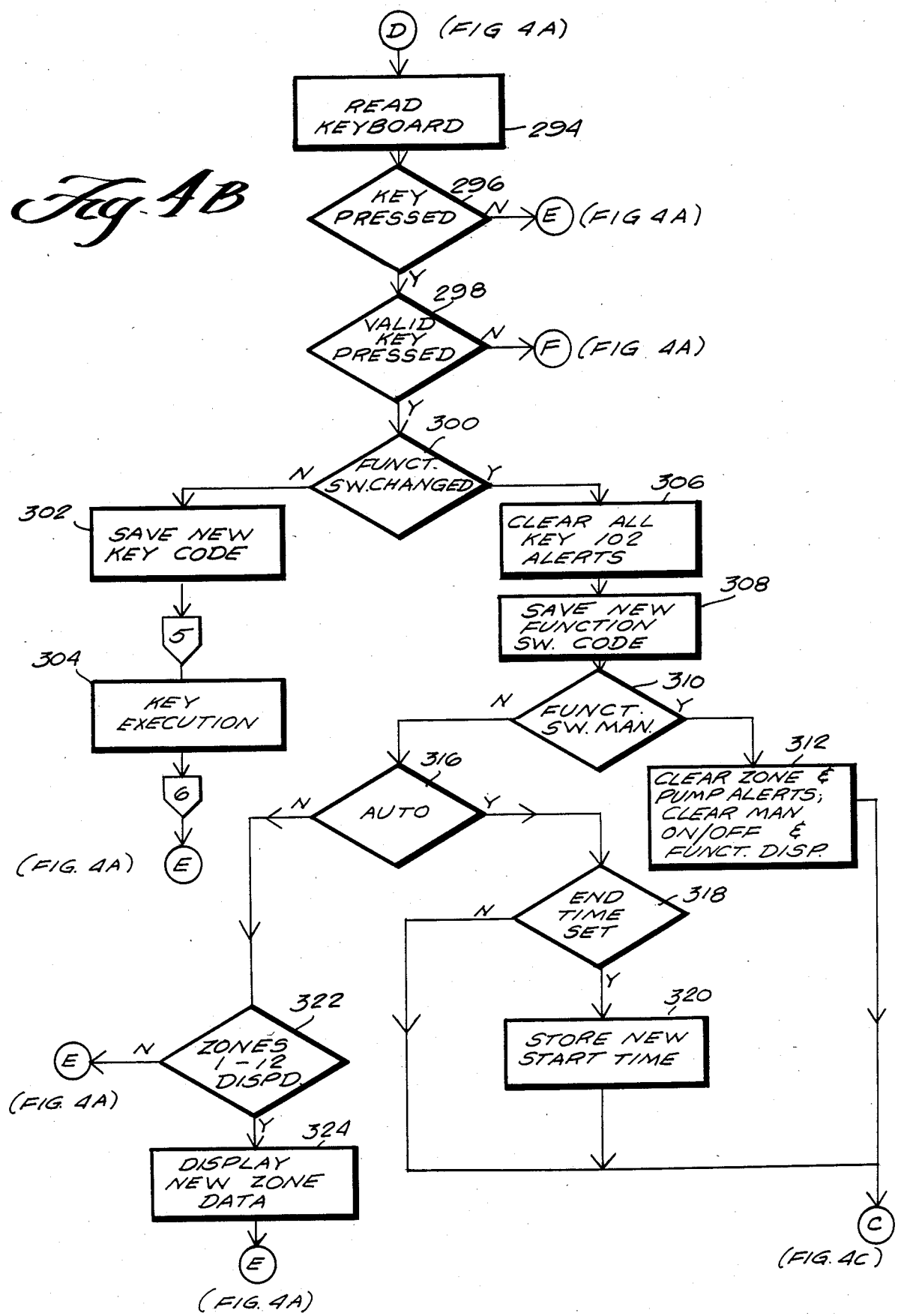

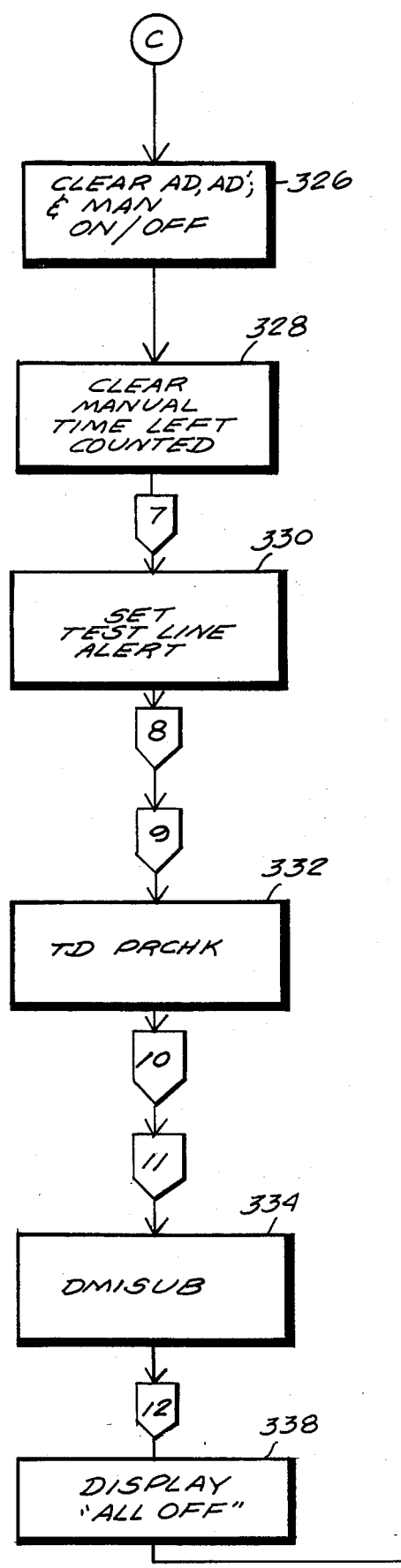
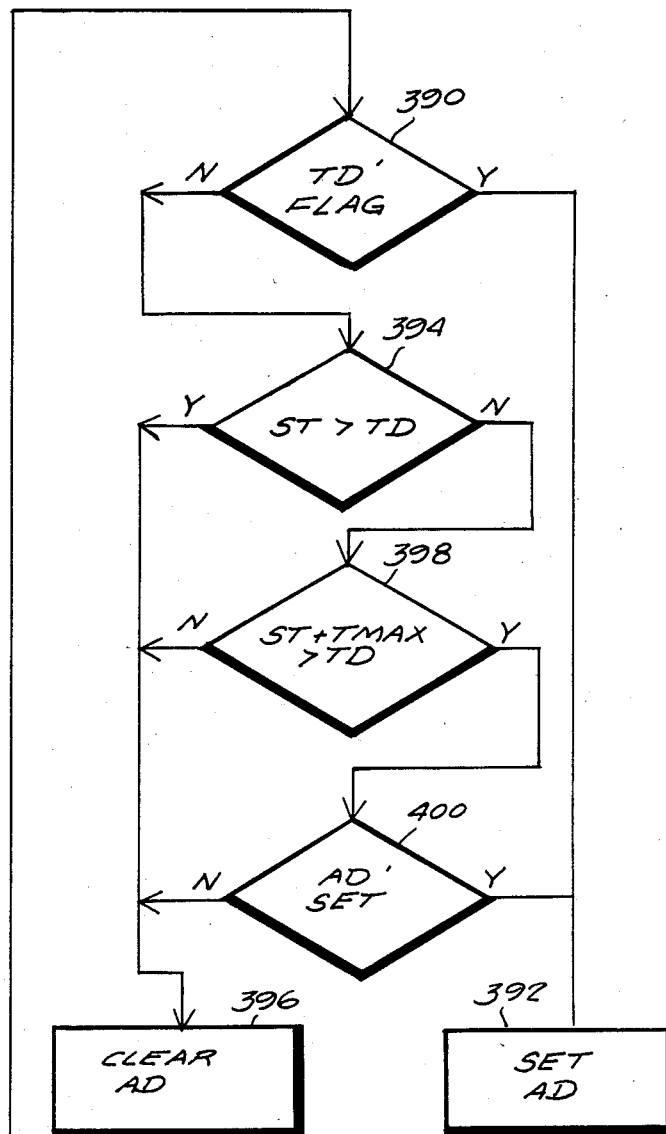
Fig. 4C

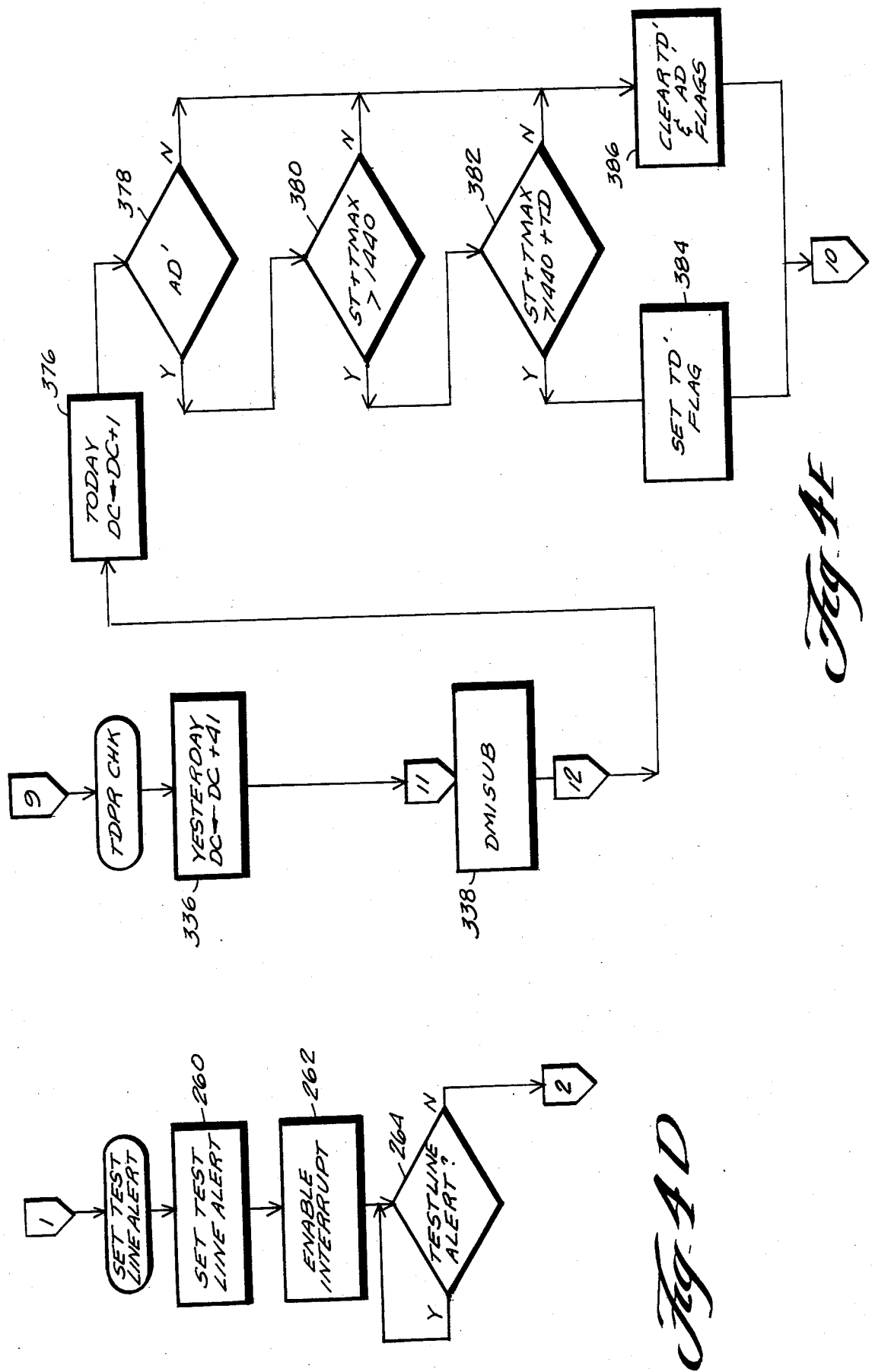

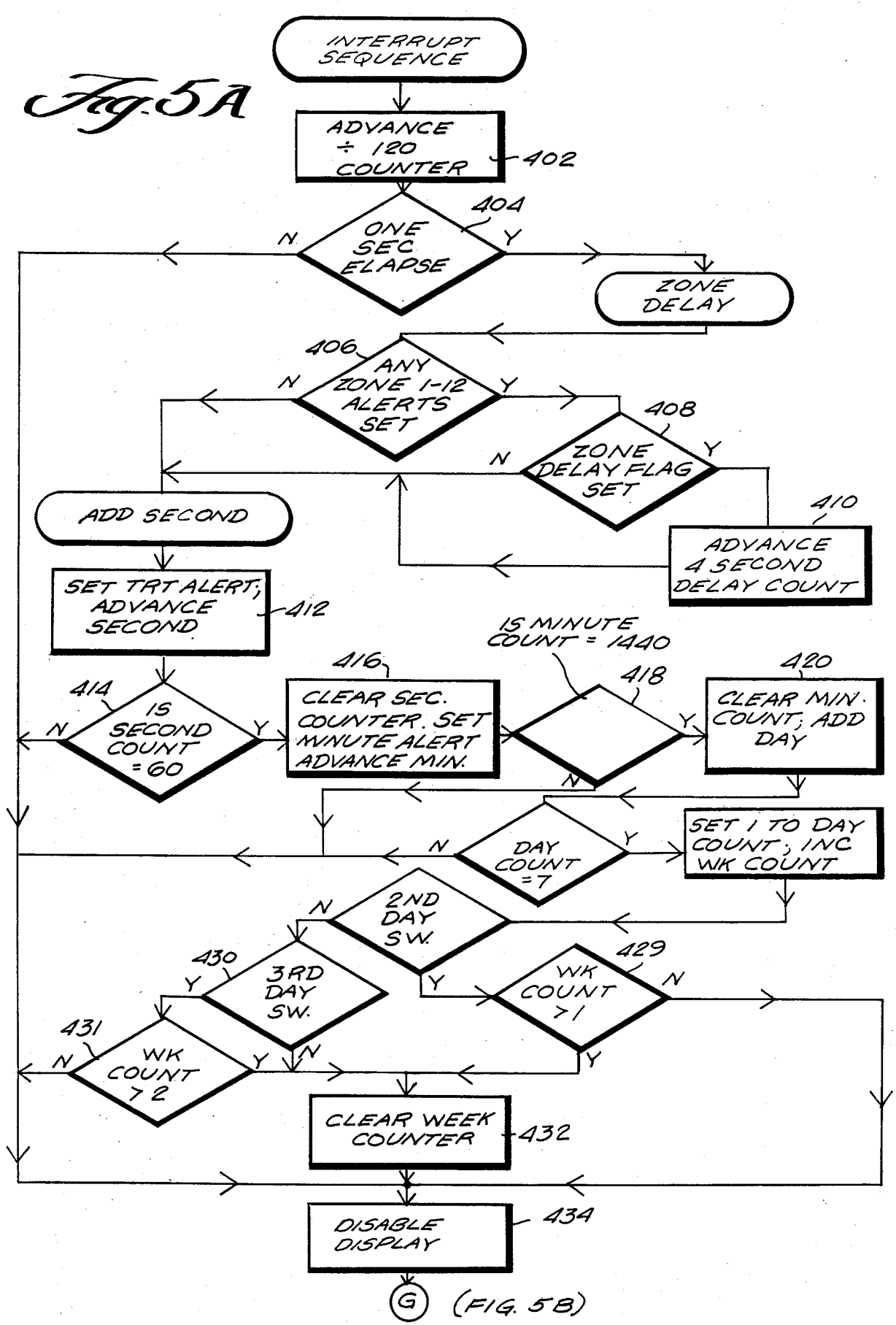

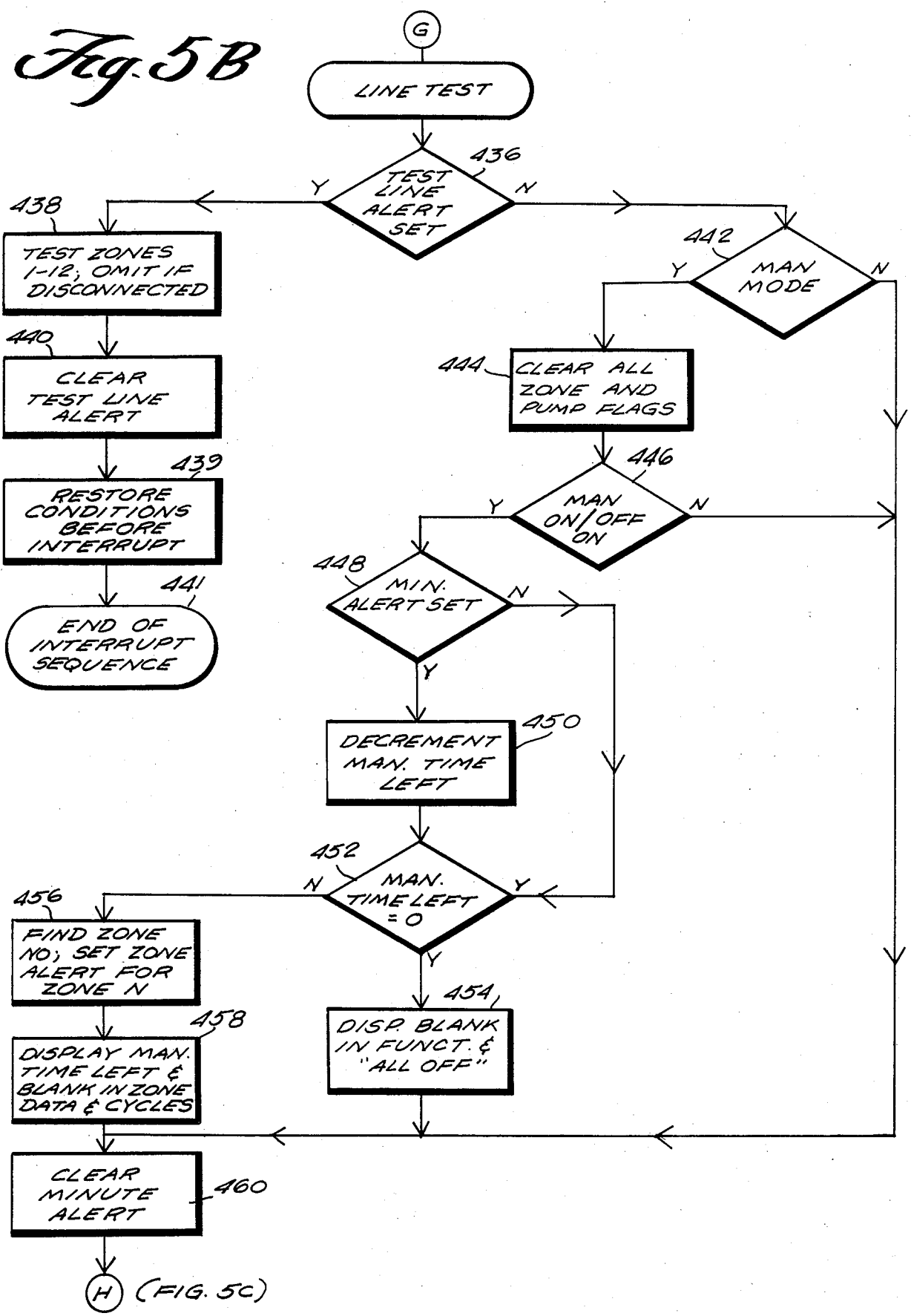

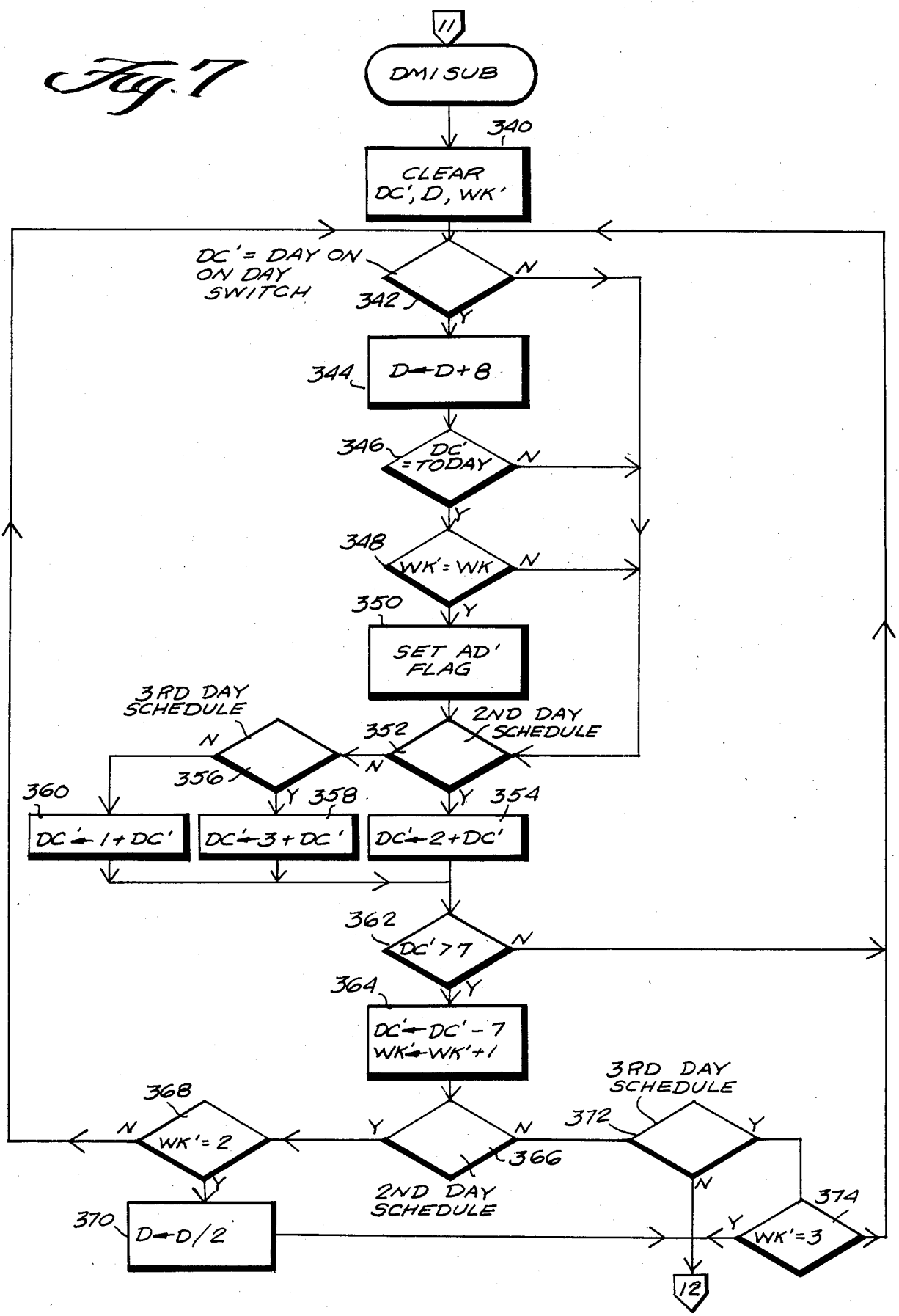

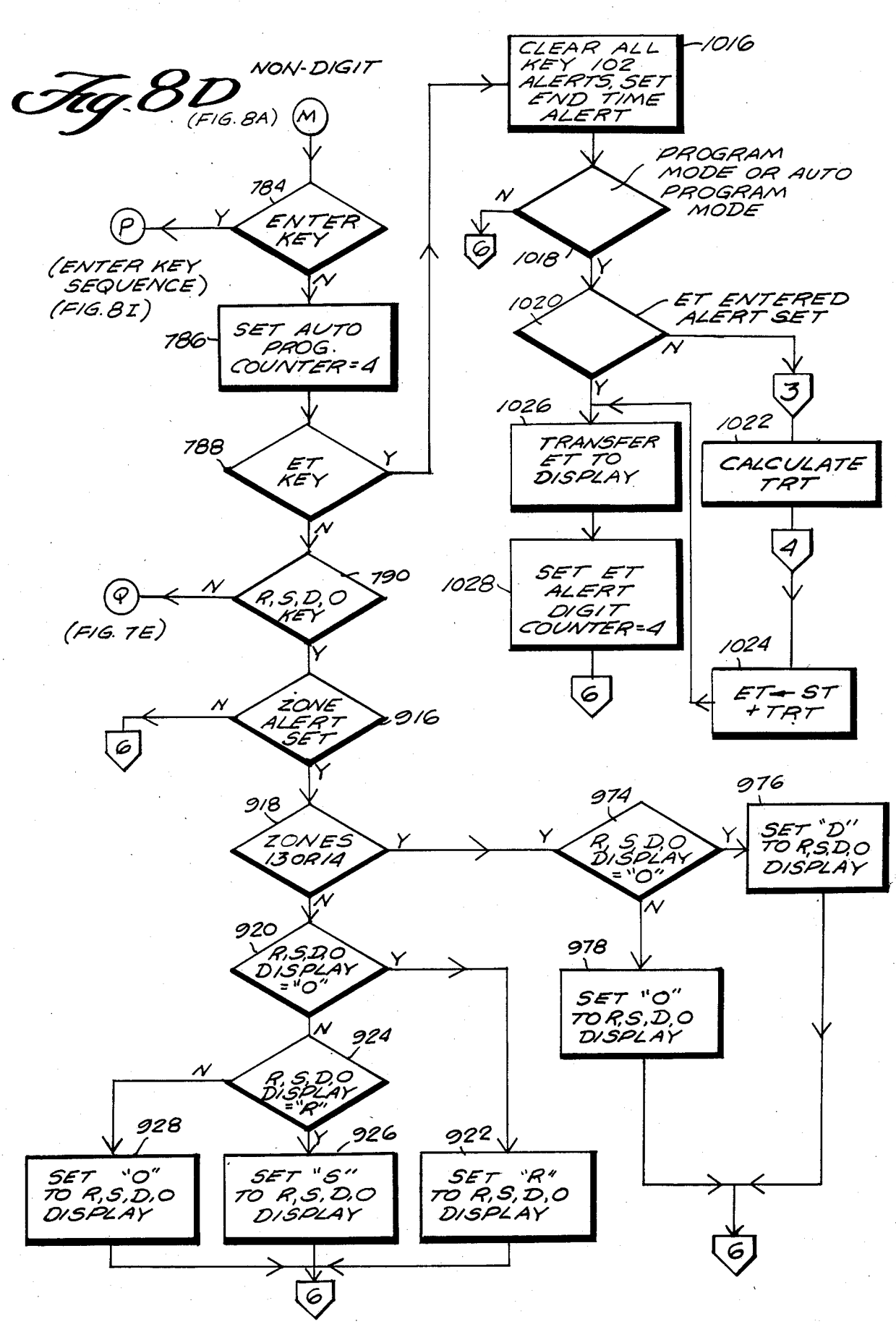

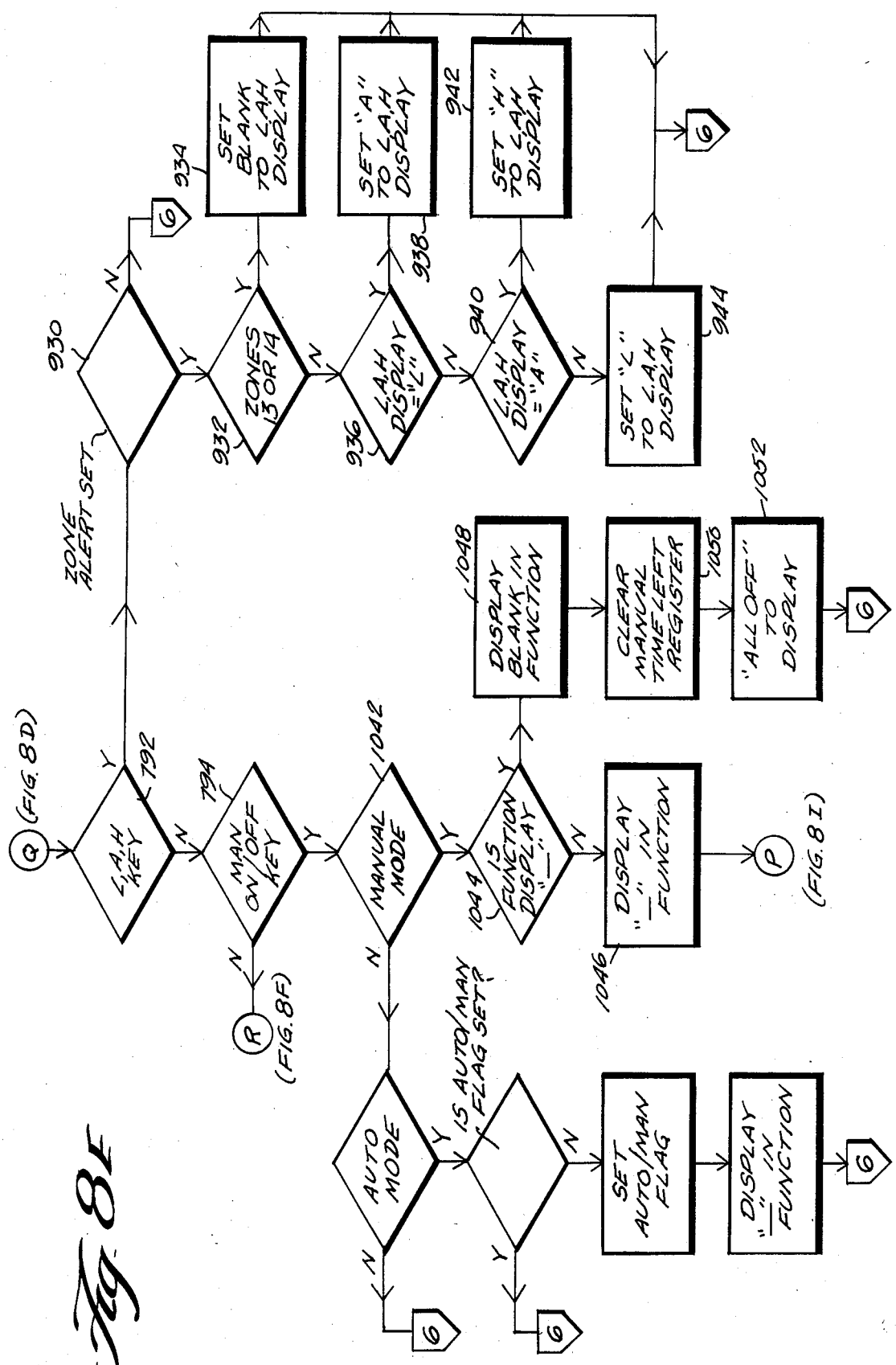

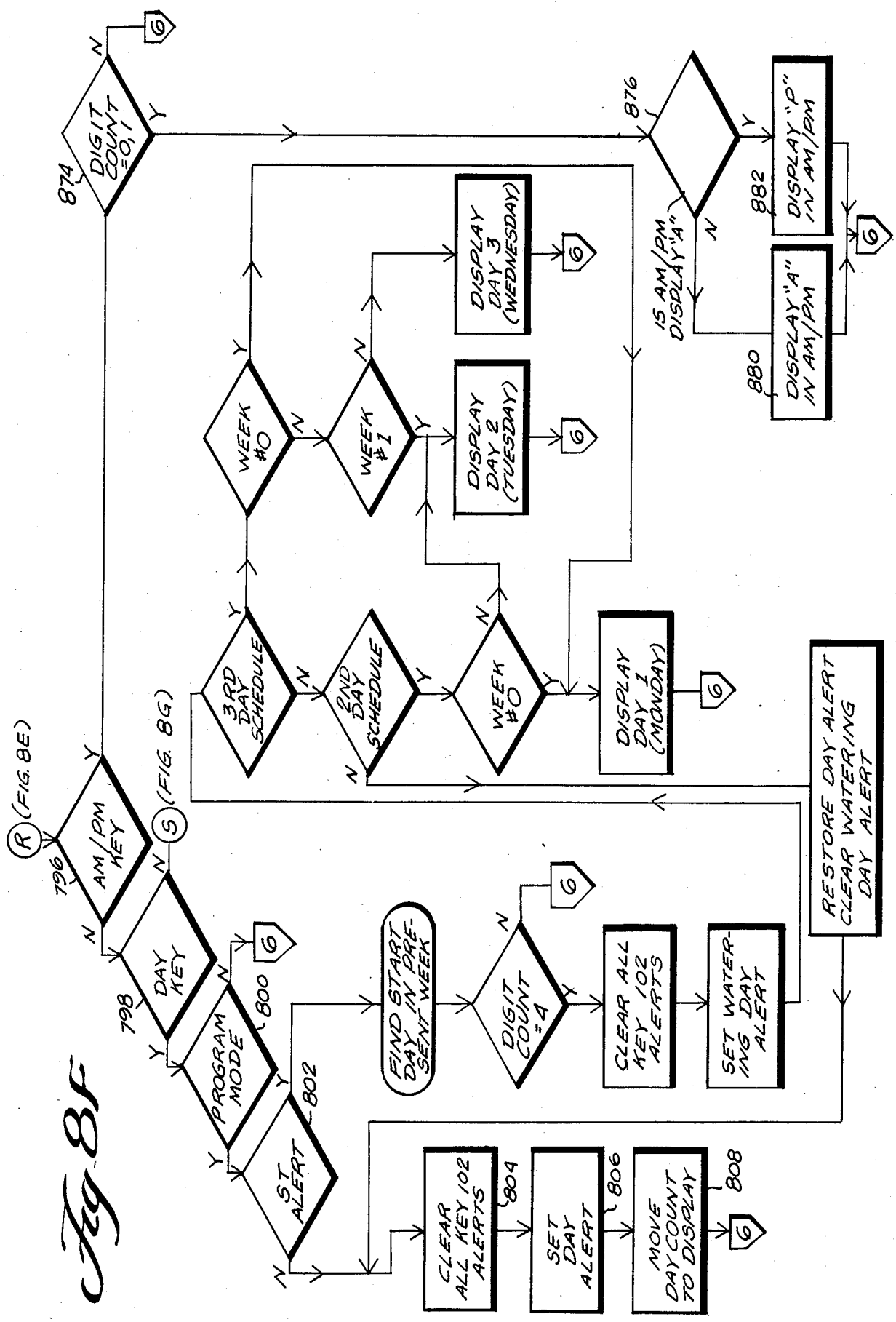

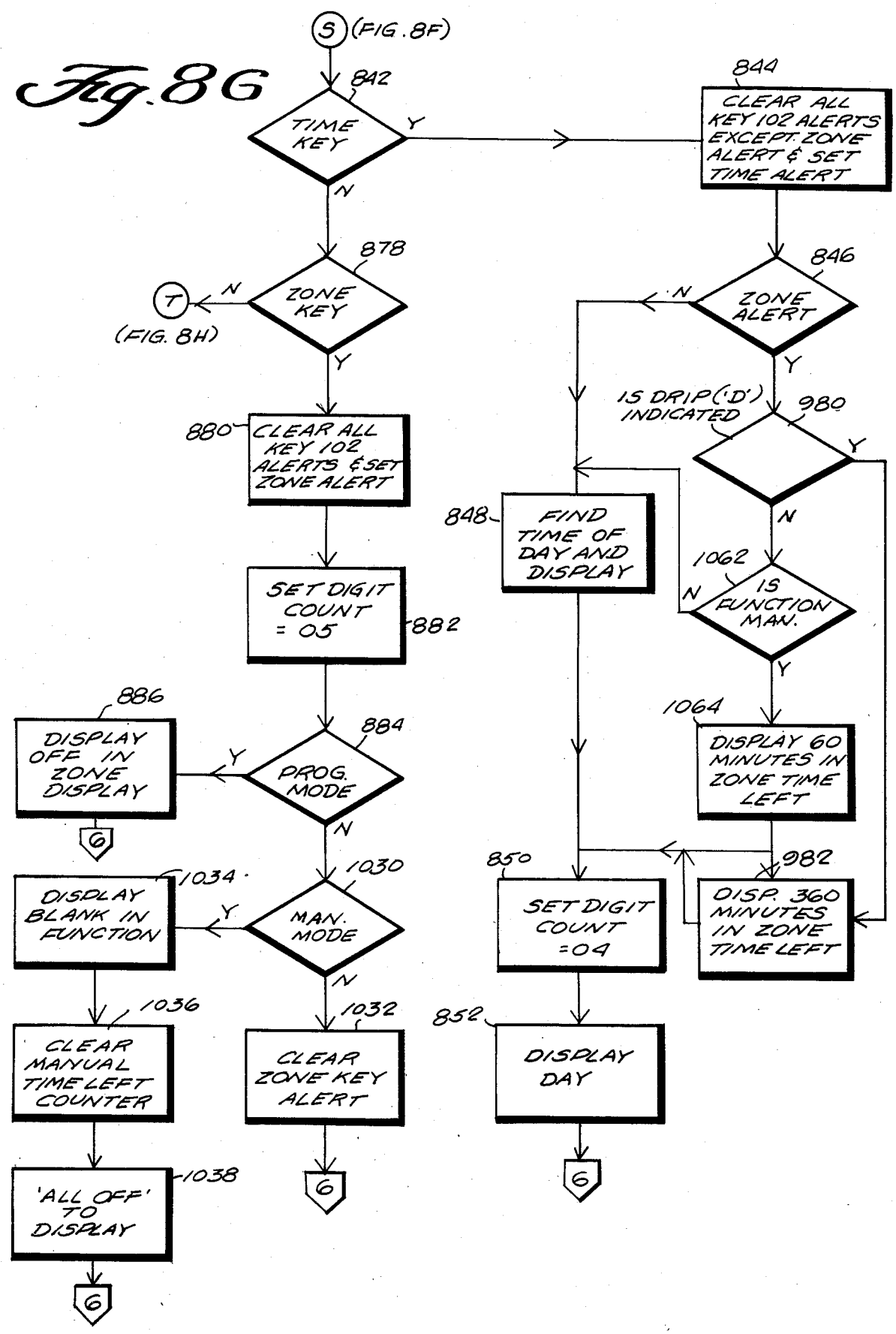

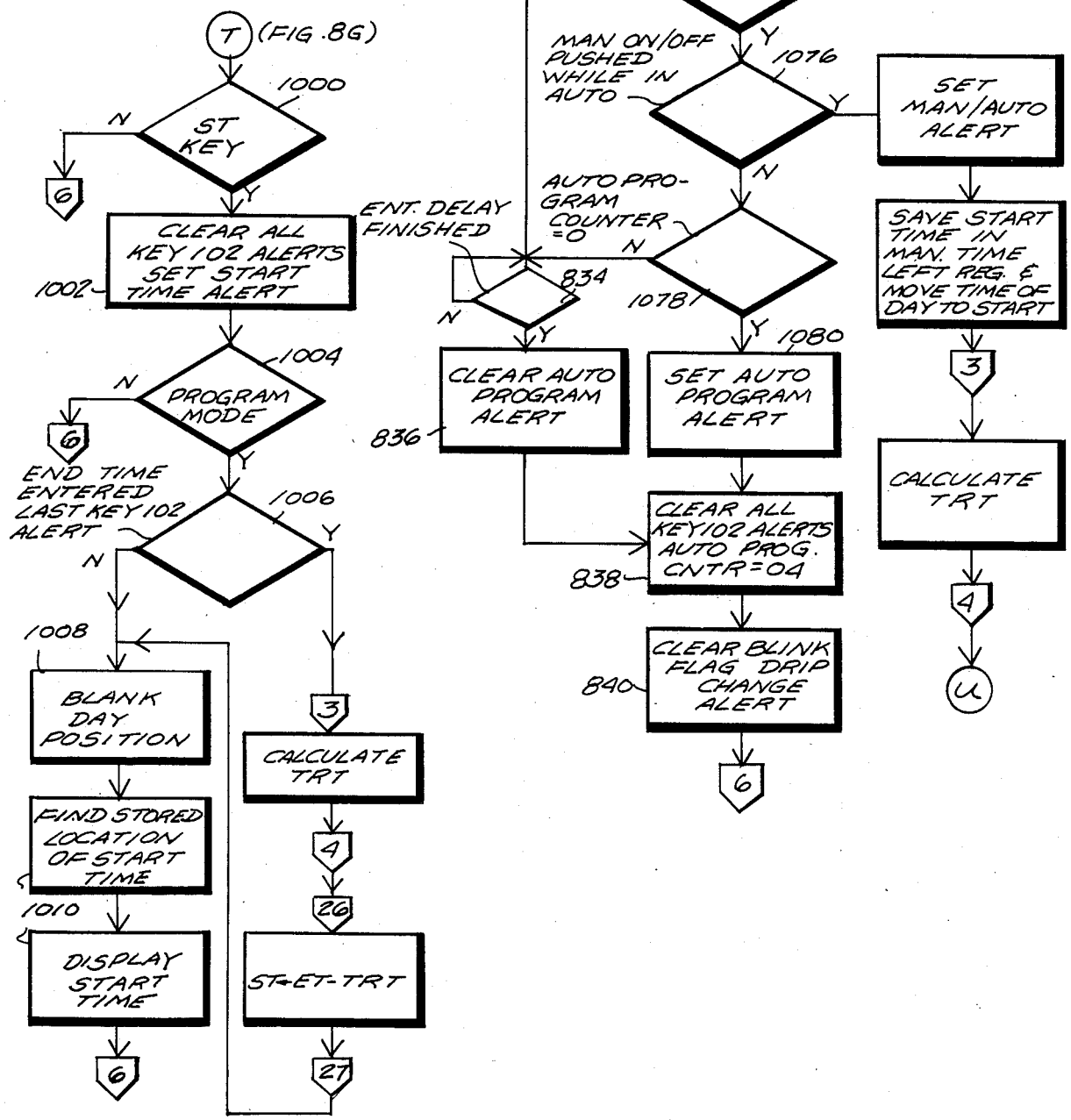

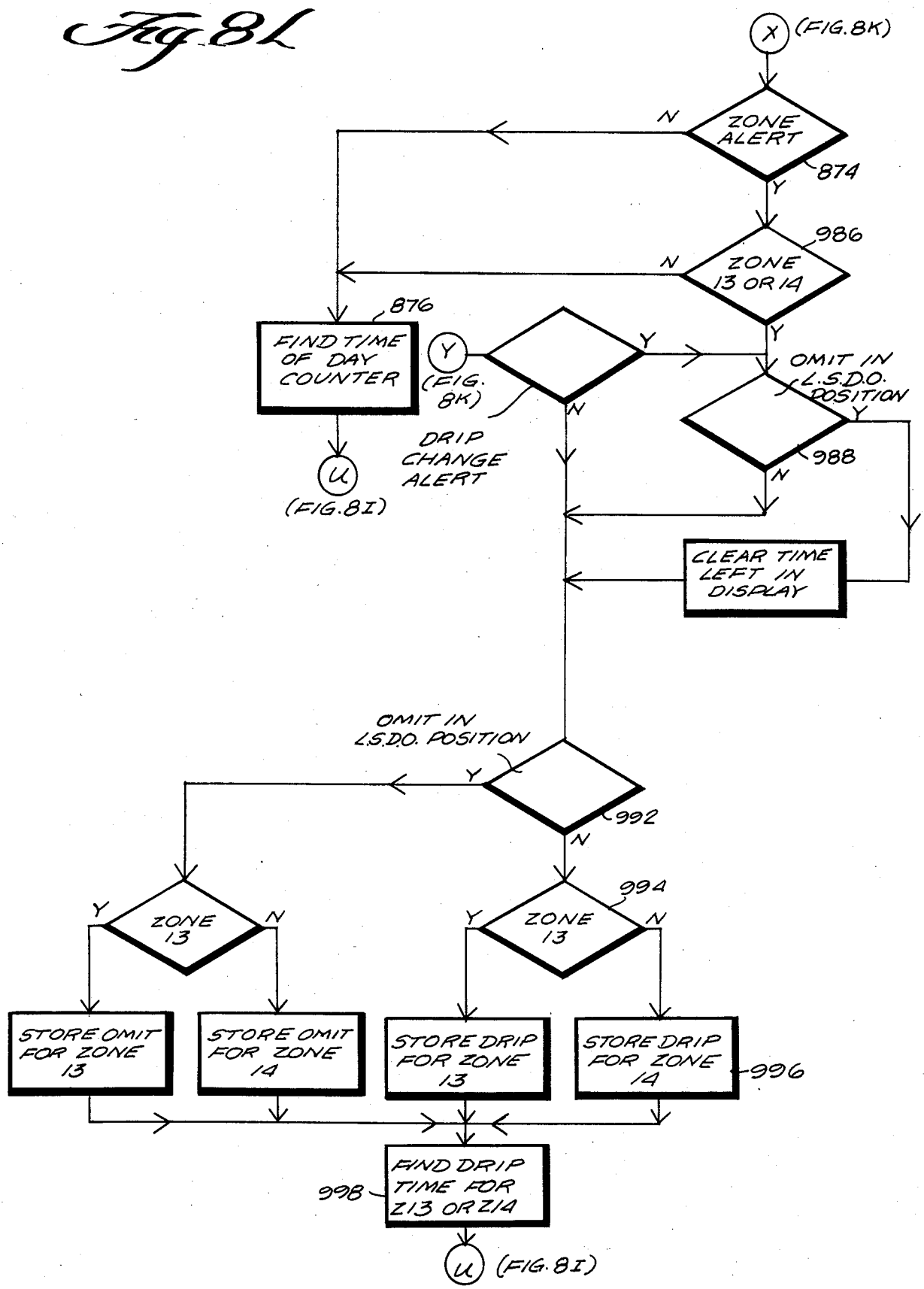

SPRINKLER CONTROLLER WHICH COMPUTES SPRINKLER CYCLES BASED ON INPUTTED DATA

BACKGROUND OF THE INVENTION

1. Field of the Invention

The present invention relates to computer controlled sprinkler irrigation systems.

2. Description of the Prior Art

In general there are two types of sprinkler irrigation. One type is the moving type which is characterized by a continuous operation of a sprinkler head or heads while a movement of the head or heads over the field to be irrigated takes place. The other type is the set type which is characterized by a multiplicity of sprinkler heads mounted in fixed positions throughout the field to be irrigated. The usual set system involves a number of sprinkler heads whose combined capacity greatly exceeds the capacity of the water source. Consequently, in order to operate the sprinkler heads near capacity they are grouped together into a plurality of zones each of which is communicated with the water source while the other zones are turned off. Systems of this type are particularly desirable in irrigating relatively large lawn areas, golf courses, athletic fields, relatively small agricultural fields and the like.

Set systems while obviating the problems incident to moving a sprinkler head or heads while in continuous operation, present the corollary problem of turning on and turning off the various sprinkler zones. A further advantage of set systems is that since each sprinkler head always operates in the same area, it can be sized to accommodate the particular area. Consequently, there remains only one major variable to choose properly in order to achieve the greatest efficiency in the use of the water applied; namely, the time each sprinkler head or sprinkler zone is operated.

It has long been the practice in set systems to use automatic controllers to turn the various sprinkler zones on and off. In general, it can be stated that the prior art controllers have viewed the turn on-turn off procedure simply as a matter of time. Often toward the end of the operation time, the area receiving the water is incapable of receiving any more water resulting in inefficient run off. Examples of typical controllers are found in the following U.S. Pat. Nos.: 3,114,243, 3,123,304, 3,723,753, 4,007,458, 4,061,927, 4,165,532 and 4,189,776.

In general it can be stated that in all of the typical controllers noted above, the operator must select the operating times for each sprinkler zone and feed these actual times into the controller so that the system will be controlled in accordance with the times selected. Whether or not the most efficient times have been selected becomes a matter of trial and error. The problem presented is that the most efficient sprinkling times can vary depending upon various conditions which may change from season to season.

In some of the earlier proposed systems, e.g. U.S. Pat. Nos. 2,578,981 and 2,674,490, a soil moisture sensor was employed to initiate a program. However, the program is a fixed routine that continues independent of soil conditions until the program is completed. It has also been proposed in U.S. Pat. No. 3,037,704 to control the length of an irrigation period based on feedback from a soil moisture sensor. Beyond these early simplistic proposals, there has been only one proposal in the patented literature to utilize a computer capability in the controller to compute an irrigation program based upon more than one single simplistic sensor input.

U.S. Pat. No. 4,015,366 to Hall is directed to a computer controlled agricultural production system. One portion of the overall system relates to a computer controlled irrigation system. The computer monitors soil moisture content by means of a soil moisture sensor. When the computer determines that the soil moisture content is approaching the minimum desirable value, the computer will determine whether irrigation is necessary in view of meteorological data and evapotranspiration data. Assuming that no rain is expected, the computer will then calculate the amount of water needed to bring the water level in the soil to an optimum level.

The Hall patent teaches that the computer may also control the speed of a pump employed with the sprinkling system in accordance with the water absorption rate characteristics of the soil being irrigated. Reference is made in the Hall patent to Jensen et al, "Scheduling Irrigation Using Climate-Crop-Soil Data," Journal of the Irrigation and Drainage Division, I.R.I., March 1970, pages 25 et seq. and Jensen, "Scheduling Irrigations With Computer," Journal of Soil and Water Conservation, Vol. 25, No. 5, September/October 1969, pages 193 et seq. as teaching the use of a programmed computer to determine the amount of water and the rate of applications.

While the computer system of U.S. Pat. No. 4,015,366 deals with more than one variable in order to achieve efficiency, namely water needed and pump speed or application rate, variation of the application rate of the system by varying the pump speed is an expensive proposition. Moreover, it is inapplicable to many systems such as those sometimes utilized in lawns, golf courses and athletic fields where the source of water utilized is the city main. Thus, in systems of this type where high efficiency is at a premium, application rate is constant and cannot be varied. There still exists a need for a computerized system which will secure maximum efficiency based upon plural variables without utilizing application rate as one of the variables.

SUMMARY OF THE INVENTION

It is an object of the present invention to meet that need. In accordance with the principles of the present invention, this objective is obtained basically by utilizing an application period within each zone which may include one or more application cycles in order to prevent the operation of the sprinklers at a time when the soil is temporarily saturated with water so as to prevent the possibility of run off.

In accordance with the principles of the present invention, the controller includes a device for manually entering data related to conditions in each of the zones. These conditions may include one or more of the amount of water needed to be applied to each zone based on vegetation needs, the soil infiltration rate, the days in the week that water is to be applied, the type of dispenser and the seasonal or meteorological variations which affect the overall amount of water needed in all of the zones. A processor accepts conditions from the data entry device and determines for each zone the number of cycles in an application and the length of time in each cycle that the applicators in the zone should be on not only so that the amount of water applied during each cycle does not exceed the amount of water that the soil can absorb during that cycle, but also so that the total amount of water needed in that zone is applied. After determining the number of cycles per application for each zone and the on time in each cycle, the processor also organizes all of the cycles of the zones in a sequence to create an application program. Circuitry is provided responsive to the processor to generate the control signals for the sprinkler system to carry out the application program.

The data entry device may preferably include switches for selecting the soil type (with respect to infiltration rate) and the amount water needed by vegetation in each of the zones. Additional controls may include a series of switches to control the days on which the application program is to be carried out. Also, either the start time or the end time of each application may be designated for the application day. In order to control the amount of water provided in each cycle, data may also be entered related to the type of applicator employed in a particular zone.

The preferred embodiment of the present invention allows the control of fourteen zones of which the first twelve are of the sprinkler type and the last two are of the drip type.

After entering all of the data referred to above, the controller preferably automatically calculates the number of cycles needed for each zone and the time for each cycle. Then, during automatic operation, the controller will turn on zones at appropriate times so as to prevent the amount of water applied during each cycle from exceeding the amount of water the soil can absorb during that cycle.

In the preferred embodiment of the present invention, any of the zones may be controlled manually or an automatic cycle may be manually started or stopped at any time.

Preferably, a water volume switch adjusts the overall amount of water provided to the zones proportionally. Thus, over the seasons, the water volume may be decreased during periods of increased rainfall and the amount of water may be increased during hot, dry periods. In fact, a position is provided on the water volume switch at which all water to the zones is turned off, which is useful to eliminate sprinkling while rain is falling.

A moisture sensor is preferably provided which prevents automatic operation when a predetermined soil moisture level is exceeded.

The controller is preferably programmed in a programming mode during which time all water is shut off. However, a special mode is provided in the preferred embodiment in which programming can occur while the controller remains in an automatic mode of operation.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawing, of which:

FIGS. 3A through 3D are a detailed circuit diagram of the controller;

FIGS. 4A through 4E illustrate a flow diagram of the main program performed by the controller;

FIGS. 5A through 5C illustrate a flow diagram of the interrupt routine performed by the controller;

FIG. 7 illustrates a flow diagram of the DMISUB subroutine of the present invention;

FIGS. 8A through 8L illustrate a flow diagram of the key execution subroutine of the present invention;

DETAILED DESCRIPTION OF THE PRESENTLY PREFERRED EXEMPLARY EMBODIMENT

1. Sprinkling System

Figure 2:
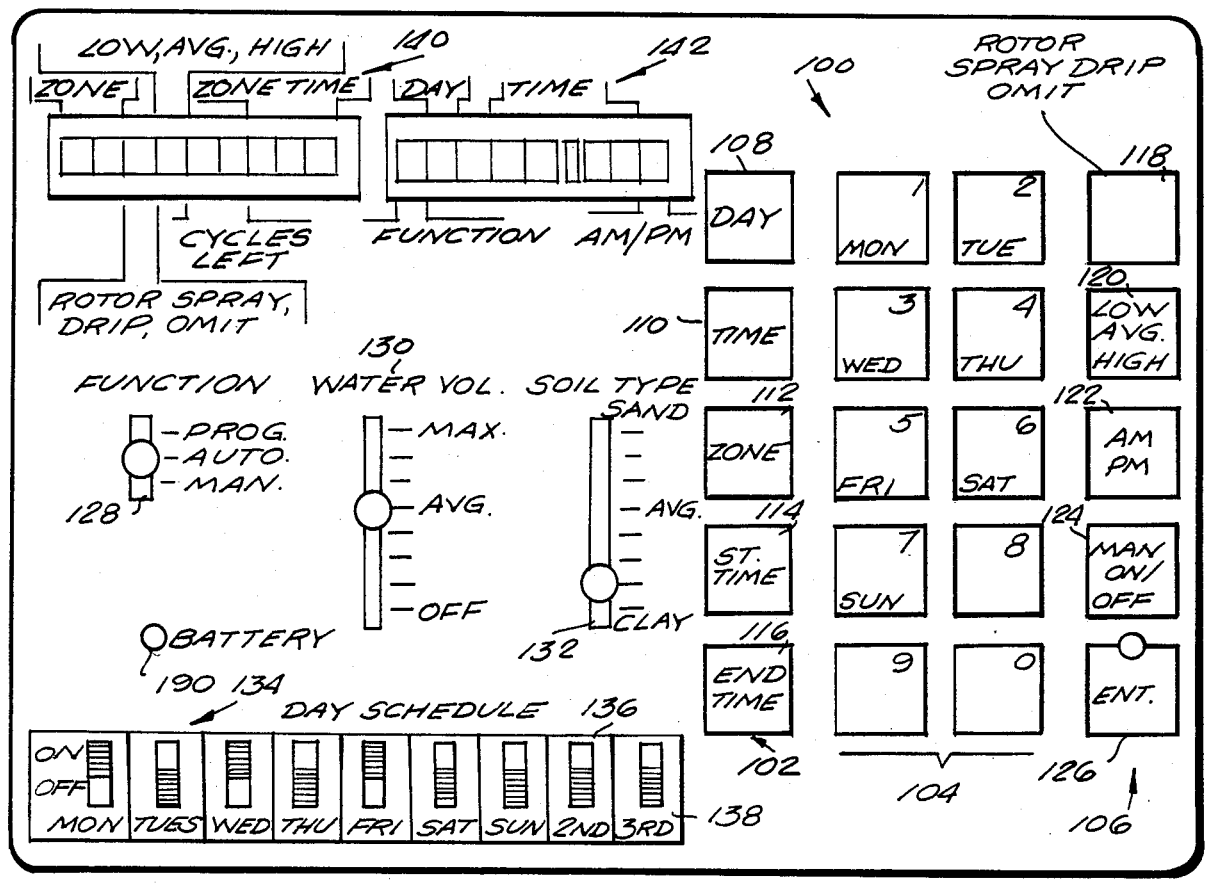
FIG. 2 is a schematic diagram of the manual data entry portion of the controller of the present invention.
Figure 1:
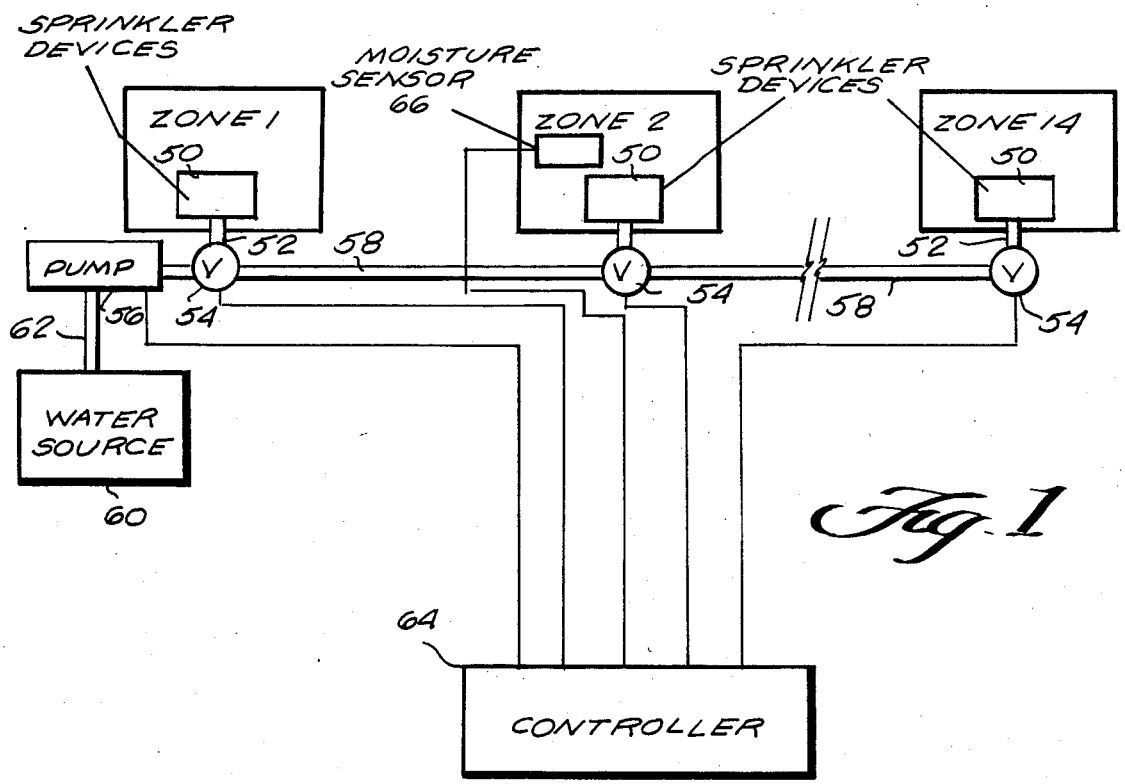
FIG. 1 is a schematic diagram of a sprinkler system according to the present invention.

FIG. 1 illustrates a sprinkling system in accordance with the present invention. The area to be irrigated is divided into a number of zones (labeled zones 1 through 14 in FIG. 1). Each zone includes a set of applicators such as sprinkler devices 50. Pipes 52 connect each set of sprinkler devices 50 with a valve 54 which controls whether water is to be provided to each zone. Valves 54 are connected to a pump 56 through pipes 58. Water is provided to pump 56 from water source 60 through pipe 62. Pump 56 and valves 54 are controlled by controller 64. At some location in the area to be irrigated, moisture sensor 66 is disposed which provides a signal to controller 64.

2. System Operation

Controller 64 can independently control up to 14 zones, two of which (zones 13 and 14) being drip zones (i.e., zones in which water is provided at a very low rate). The front panel of controller 64 is illustrated in FIG. 1. The panel includes a 20 key keyboard 100 having function keys 102, numerical keys 104 and function keys 106. Depression of day key 108, time key 110, zone key 112, start time key 114 or end time key 116 indicates that day information, time information, zone information, application start time information or application end time information is to be entered. Numerical/day data are entered employing keys 104. Key 118 enables the entry of the type of water applicator being employed in a particular zone. Key 120 enables entry of the amount of water vegetation in for a particular zone needs. Key 122 enables selection between a.m and p.m. Key 124 enables the manual starting or stopping of irrigation in any of the zones as will be described in more detail below. Enter key 126 is depressed after a series of keys on keyboard 100 have been actuated to cause the data associated with the depressed keys to be entered into controller 64.

A number of other switches are also provided on controller 64. Function switch 128 enables selection between a programming mode, an automatic irrigation mode and a manual irrigation mode. Switch 130 enables the total amount of water provided to each of the zones to be increased or decreased proportionally with the other zones such as, for example, with the seasons. In its extreme minimum position, the water to all of the zones is shut off. Soil type switch 132 identifies the type of soil that exists in the area to be irrigated. As will be described below, this is employed to control the rate at which water is applied so that it can all be absorbed by that particular soil type.

Switches 134 enable selection of the days on which watering is to occur. For those days on which watering is desired, the corresponding switches are turned to the ON position. Switch 136 enables watering every other day and switch 138 enables watering every third day. To water every second or third day, the Monday through Sunday switches are also turned on. If, on an every other day or every third day schedule, it is desired to omit watering on certain days, any of the Monday through Sunday switches may be turned off.

All data that is entered and all data that is generated during operation may be shown on displays 140 and 142. Display 140 basically provides data concerning zone operation, while display 142 provides time data. Thus, the first two portions of zone display 140 may be employed to display a zone number. The third portion may be employed to indicate the type of water applicators employed in a particular zone. Thus, an "R" appears if it is entered that a rotor type applicator is employed in the zone, an "S" appears if a spray type applicator is employed, a "D" appears if a drip type applicator is employed and an "O" appears if that particular zone is to be omitted by the controller.

The fourth portion of the display may be employed to indicate the amount of water needed by the vegetation in that particular zone taking into account environmental factors (location, amount of light, traffic pattern, etcetera). Thus, either a "L", "A" or "H" will appear depending upon whether data is entered that the vegetation needs low, average or high amounts of water.

The data in the first four portions of display 140 may be set employing keyboard 100. Controller 64 periodically scans all of this data and repeatedly calculates values necessary to carry out irrigation. Thus, based on the day schedule which determines the number of applications that will be made per week, controller 64 determines the number of cycles necessary for each application and the time within each cycle that the applicator will be on. It is well known that each of the types of water applicators employed may output more water than can be absorbed by the soil if the applicators are left on. Therefore, instead of outputting water continuously, water is not applied, in the preferred embodiment, for at least half a hour at the end of each cycle. Thus, controller 64 determines the length of time that the applicator should be left on during a cycle so that no more than the water which can be absorbed during the cycle is applied. Also, the number of cycles necessary to apply the total amount of water needed by the particular vegetation in each zone is determined.

The fifth and sixth portions of display 140 may be employed to indicate the number of cycles remaining in a particular application for a particular zone. The final three portions of display 140 may be employed to indicate the amount of time remaining in a particular cycle for that zone.

Display 142 is employed to generate an indication of the position of function switch 128 and to display various times. Thus, the first portion of display 142 will display either "P", "A" or nothing depending on whether controller 64 is in the prgramming, automatic or manual mode. The second portion of display 142 will generate a number related to a day of the week in the pattern illustrated on keys 104. The two portions on either side of the colon in display 142 may be employed to indicate a time or period in hours and minutes. The last portion of display 142 may indicate either "A" or "P", indicating a.m. or p.m., respectively.

The manner in which controller 64 is employed will now be described with reference to FIG. 1. Before entering data so that controller 64 can generate a water schedule, it is preferable to enter the present day and time. Assume that the program is being entered at 10:45 a.m. on Thursday. Initially, function switch 128 is positioned in the programming mode. To enter the present day, day switch 108 is depressed. As a result, the day number currently being stored in the controller is displayed in display 142. Then, the Thursday/4 key 104 is depressed and day 4 is displayed in place of the previously displayed day number. To cause controller 64 to utilized data that has been entered, enter key 126 is depressed.

To set the real time clock in controller 64, time key 110 is depressed causing the display of the time of day currently stored in controller 64. Then, from keys 104, "1", "0", "4" and then "5" are sequentially pressed causing 10:45 A to be displayed on display 142. If the a.m./p.m. indication is incorrect, a.m./p.m. key 122 may be depressed to change the a.m./p.m. indication on display 142. Upon pressing enter key 126, 10:45 a.m. is stored in controller 64 as the current time of day.

Data concerning irrigation of the various zones may now be entered. For the following example, assume that the overall demand for water is judged to be average, the type of soil (i.e., the soil infiltration rate) is estimated to be average and watering is desired on Monday, Wednesday and Friday. Zone one employs rotor type applicators and the vegetation therein is judged to require a high need for water. Zone 2 has spray type applicators and vegetation therein has an average need for water. Zones 3 through 13 are to be omitted from the watering cycle. Zone 14 is to be programmed for drip operation and is to run for 4 hours. The system is to start watering at 6:00 a.m. on each application day.

To begin programming, water volume switch 130 is moved to an average position as the overall demand for water is judged to be average. Soil type switch 132 is set to average as the soil is estimated to be of average composition. If the soil tended to have more sand or clay, soil type switch 132 could be positioned accordingly. Of day schedule switches 134, Monday, Wednesday and Friday are turned on and all the others are turned off.

Note that in the present invention, the setting of switches 130, 132 and 134 may be made with function switch 128 in any position. Independent of the position of switch 128, program changes will occur when any of the switches 130, 132 and 134 are moved.

With function switch 128 in the program position, data will now be entered for each of the zones. First zone key 112 is depressed, causing display 140 to indicate "OFF". Then, "1" of keys 104 is depressed and all of the current programming for zone 1 is displayed on display 140. If the data displayed is satisfactory, zone key 112 may be pressed as the preliminary step for the next zone to be programmed. To change data either applicator type key 118 or vegetation use key 120 may be repeatedly depressed to cycle the third or fourth portions, respectively, of display 140 through the possible indications until the appropriate indication is reached. After the third and fourth portions of display 140 indicate "R" and "H", respectively, enter key 126 is depressed to enter this data into the controller. The number of cycles per application and the time the applicator will be on per cycle are recalculated for zone one by the controller and displayed in the last five portions of display 140.

If the third and/or fourth portions of display 140 had indicated the appropriate setting initially, obviously it would not be necessary to depress key 118 and/or key 120.

Zone 2 may then be programmed in the same manner as zone 1 except that keys 118 and 120 are depressed until the third and fourth segments of display 140 respectively show "S" and "A".

Zones 3 through 13 are to be omitted from the watering cycle, and each zone must be programmed accordingly. This is accomplished by entering each zone number sequentially, and after entering each zone, depressing key 118 until the third portion of display 140 indicates "0". After this process, when data for each of zones 3 through 13 is displayed, "0" will appear in the third portion of display 140 and zeros will appears in the cycles left and zone time positions. Zone 13, which must be a drip zone, will show "0" in the third portion and "OFF" in the zone time portion of display 140.

To program zone 14, zone key 112 is depressed followed by "1" and then "4" from keys 104. All current programming for zone 14 is displayed. Key 118 is then repeatedly depressed until "D" is displayed. To enter the length of time in minutes that drip zone 14 is on, time key 110 is depressed followed by "240" on keys 104. Enter key 126 is then depressed to enter this data into the processor. If no time is entered for the drip, the program defaults to 360 minutes.

Programming within the controller will not allow zones 1 through 12 to be programmed for drip operation. Similarly, zones 13 and 14 cannot be programmed for rotor or spray type applicators. Vegetation use key 120 will produce meaningful results only for those zones programmed for rotary or spray type applicators.

To set the start time, start time key 114 is depressed, causing the currently stored start time to be displayed. Then, "600" is entered by keys 114, causing 6:00 A to be displayed in display 142. Depression of enter key 126 causes this data to be entered into the controller.

If desired, the controller will now be able to provide an indication of the time at which each application (including the calculated number of cycles) for zones 1–12 will end. This is accomplished by depressing end time key 116, thus causing the time of day to be displayed at which an application will end. The end time ignores drip zones 13 and 14.

To return the time of day to the display, time key 110 is depressed. Changing function switch 128 will also return the time of day.

Although the programming sequence described above may be the most logical, an important aspect of the preferred embodiment of the present invention is that any programming sequence may be employed. Furthermore, any single programming step may be changed without reprogramming all of the other data.

It is also possible to examine the entered program for irrigation at any time. To interrogate the programming, it is necessary to move function switch 128 to the program position. Then by pressing start time key 114, the start time is displayed on display 142, by depressing end time key 116, the end time is displayed and by depressing time key 110, the present time of day returns to the display.

To interrogate for particular zone data, zone key 112 is depressed followed by a particular zone number on keys 104. Display 140 will then display all of the data for that zone. Thus, for the example described above, display 140 for zone 1 will be "1 R H 0 2 0 6 5", indicating that in zone 1, controller 64 has been programmed for a rotor type applicator, the vegetation needs a high amount of water, and controller 64 has determined that each application will include two cycles during which applicators will be on for 65 minutes each. Display 140 will display for zone 2 "2 S A 0 1 0 1 1 ", indicating that zone 2 has been programmed for a spray applicator with vegetation that needs an average amount of water, and controller 64 has determined that each application should include a single cycle during which applicators are on for 11 minutes.

Since zones 4 through 12 are all programmed to be omitted, display 140, for these zones, will indicate 0 cycles and 0 time left. Zone 13 is also omitted, but it is a drip zone. Therefore, the zone time portion of display 140 will indicate "OFF".

For zone 14, display 140 indicates "1 4 D ___2 4 0", indicating that zone 14 is programmed for drip to extend for 240 minutes.

To cause the controller to carry out the programmed schedule, function switch 128 is moved to the automatic position. As a result, display 142 shows the current day, time of day and that the controller is in the automatic mode. Display 140 indicates "ALL-OFF" indicating that all zones are turned off. This display will change when a zone is turned on. Extending the example as set forth above, assume that it is now Monday at 6:14 a.m. Therefore, zone 1 has been running for 14 minutes. Display 140 will then display "1 R H 0 2 0 5 1", indicating that there are 51 minutes left in the on time of the first cycle for zone 1 (one more cycle remains after the first cycle). While a zone is running, the time left to run in that zone and for that cycle is continuously displayed and the time left is decremented down to 0 in one minute increments. The cycles left display also decrements and indicates how many cycles are left to be completed for that zone. Drip zones are not displayed in the automatic cycle until zones 1 through 12 have all been cycled. At the completion of the run time for the last zone, the drip zone programmed for the longest run time will be displayed.

If rain is falling on a particular application day, it may be desired to disable the programmed irrigation for that day. Moving function switch 128 to the manual position shuts off all watering, although the time of day clock continues to run. Also, with function switch 128 in the automatic position, watering may be stopped by moving water volume switch 130 to the OFF position.

As mentioned above, the sprinkler system according to the present invention is also provided with a moisture sensor 66. When properly installed, controller 64 sees moisture sensor 66 as an open switch when the moisture content of the soil reaches a predetermined value. This shuts off all zones. Moisture sensor 66 may influence the zones only when function switch 128 is set to the automatic position.

Manual operation may be accomplished by moving function switch 128 to the manual position. As indicated above, this shuts off all zones so that zone display 140 will indicate "ALL OFF" and the function portion of display 142 will be blanked. If zone 1 is to be manually operated, zone key 112 is depressed followed by the "1" key. The balance of zone display 140 reads "OFF". Depression of manual ON/OFF key 124 then causes a dash to appear in the function portion of display 142. "060" is displayed as the zone time in display 140. Also, zone 1 is turned on and will run for 60 minutes before shutting off automatically, at which time the function portion of display 142 is blanked and zone display 140 reverts to "ALL OFF".

If, while zone 1 is operating, it is desired to program the zone for some finite time other than 60 minutes (and less than 999 minutes), the following sequence of keys are pressed: zone key 112, "1" key, time key 110, "90" on keys 104 (to specify 90 minutes) and manual ON/-OFF key 124. This causes the zone "1" to be displayed, the function is a dash and "90" appears in the zone time left display. Zone 1 is caused to be turned on and will run for 90 minutes before shutting off automatically.

To manually turn off any zone that has been manually activated, manual ON/OFF key 124 is depressed. The appropriate zone is turned off and "ALL OFF" appears on zone display 140.

At times, for example during particularly dry periods, it is desirable to manually actuate an automatic application cycle. To accomplish this function switch 128 is left in the automatic position. Manual ON/OFF key 124 is depressed followed by enter key 126. The complete automatic cycle will initiate even if an automatic cycle is in progress. To cancel the manual actuated automatic cycle, key 124 is depressed.

To cancel a clock started automatic cycle, the manual ON/OFF key 124 is depressed a first time. As a result, a dash appears in the function portion of display 142 and the automatic cycle continues to run. A second depression of key 124 cancels the automatic cycle for that day. "ALL OFF" appears in the display and "A" returns to the function portion of display 142.

If the clock started automatic cycle is to be turned off and later turned back on, this may be accomplished by moving water volume switch 130 to the OFF position. When the water volume switch 130 is later returned to its original position, the appropriate zone will automatically be turned on if the automatic program is still in progress.

A useful feature of the preferred embodiment is the ability to make minor program changes while in the automatic mode as set by function switch 128. As indicated above, if the programming mode is entered by function switch 128, all zones are automatically turned off until the changes have been effected and function switch 128 is moved back to the automatic position.

To avoid the necessity of employing the programming mode, "9999" is typed with keys 104 followed by depression of enter key 126. After this sequence has been entered, one keyed programming sequence can be entered into controller 64. A programming sequence ends with depression of enter key 126. To cause any additional program change with this procedure, the same automatic programming mode sequence "9999 ENTER" must be repeated.

As will be explained below, the controller is powered by the AC line current with a battery backup. In the event of a power failure, the device will continue to operate with the battery. However, the display is turned off, all key depressions are ignored, no zones will be actuated and a timing loop is activated which updates the clock every second. When power resumes, regular operation returns.

In the event of a power failure in which the battery is exhausted or has not been provided, a default program is activated when power is resumed. The display of the clock flashes but will not indicate the actual time of day. A default program is entered in which time display 142 indicates Monday, at midnight. Also in the default mode, the watering application is set to start at 6:00 a.m. on the program days indicated by switches 134 with connected zones preprogrammed for a rotor head and a low water need. This causes the controller to determine that one cycle of 33 minutes is necessary for each application in each zone if soil type and water volume switches 132 and 130, respectively, are set at average and day schedule switches 134 are set at three days on per week. In the default program, drip zones which are connected will run for 3 hours.

Depressing enter key 126 will cancel the flashing display after a power failure.

As indicated above, after entering all of the data for the zones, the end time of the application can be examined by depressing end time key 116.

If an end time other than that internally computed is desired, a selected end time can be entered by depressing end time key 116, followed by the desired end time on keys 104, followed by a.m./p.m. key 122 if necessary, followed by enter key 126. After this sequence, the irrigation program including cycles per application and time on per cycle for each zone will remain the same. The only change will be that the start time will be moved back so that the application ends at the desired end time.

Thus, conceptually, a start time or an end time may be initially entered when an irrigation program is being inputted. Once either the start time or the end time is entered, the other of the two is calculated by controller 64.

The time elapsed from the start time to the end time is defined as the application time. Since there may be multiple applications per week programmed, it is conceivable that the end time of one application may extend beyond the start time of the next application. In the event that the programmed parameters are so selected, it is desirable that any application in progress be allowed to run to completion. Therefore, if an application runs into the time that the next application should occur, that next application is cancelled and the automatic program continues with the application after the by-passed application. This is referred to as cycle completion interlock.

Also, it is obviously necessary to complete a cycle which extends beyond midnight to the following day even though the following day may not be an application day. The preferred embodiment allows this to occur.

There are, however, limits as to the length which an automatic cycle may run. In the preferred embodiment, an automatic cycle may not extend beyond 11:59 p.m. of the day following the initiation of the automatic cycle. Thus, irrigation programs of up to 48 hours are possible. If an automatic program exceeds the allowable length of time, an error message will be displayed when function switch 128 is in the automatic position. Thus, zone display 140 will flash between "ERROR-OFF" and "ALL OFF". No automatic cycle will run when the error message is displayed. The automatic program must be shortened by reducing the water volume, increasing the number of days on, or by changing programming for a specific zone. Nevertheless, manual operation is possible as usual even with a programmed run time exceeding the allowable length of time.

As indicated above, controller 64 itself repeatedly calculates the number of cycles per application and the time on per cycle for each zone based on entered data. This is accomplished by converting switch positions and entered data into values and applying these values to equations.

Thus, in the preferred embodiment, applicator key 118 generates a constant of 0.25 inches per hour when a rotor type applicator is indicated and a constant of 1.50 inches per hour when a spray type applicator is indicated. These constants represent the amount of water produced by each type applicator. Since drip zones are not run on a cycle basis, but instead proceed continuously, no constant corresponds to the drip setting of switch 118.

Key 120 controls the amount of water needed by particular vegetation in that zone. In the preferred embodiment, low use requirements are set at 0.05 inches per day, average use requirements are set at 0.10 inches per day and high use requirements are set at 0.20 inches per day. These constants actually indicate the amount of water that must be applied so that the needs of the vegetation are met on a daily basis.

In the preferred embodiment, soil type switch 132 may assume any one of eight positions. A constant is associated with each of the positions. These constants represent a combination of variables which, simplified, may be considered the average infiltration rate for various types of soil. The units for the constants are inches of water per cycle, and the value corresponds to the inches of water that a given soil can absorb in a cycle. The constants employed in the preferred embodiment are as follows:

| POSITION | PANEL MARKING | MEANINGFUL CONSTANT | INTERNAL CONSTANT |
|---|---|---|---|
| 1 | -SAND | 2.00"/cycle | 200 |
| 2 | - | 1.00 | 100 |
| 3 | - | .50 | 50 |
| 4 | -AVG. | .40 | 40 |
| 5 | - | .25 | 25 |
| 6 | - | .18 | 18 |
| 7 | - | .14 | 14 |
| 8 | -CLAY | .12 | 12 |

Water volume switch 130 is also an eight position switch with each position generating a different constant value. These constants represent multiples of the vegetation need (as selected by key 120) that has been programmed for each zone. The constants employed are as follows:

| POSITION | PANEL MARKING | USE MULTIPLIER | INTERNAL CONSTANT |
|---|---|---|---|
| 1 | -MAX | 16/7 = 2.28 | 128 |
| 2 | - | 13.3/7 = 1.90 | 106 |
| 3 | - | 10.6/7 = 1.51 | 85 |
| 4 | -AVG | 8/7 = 1.14 | 64 |
| 5 | - | 6/7 = .86 | 48 |
| 6 | - | 4/7 = .57 | 32 |
| 7 | - | 2/7 = .28 | 16 |
| 8 | -OFF | 0 = 0 | 0 |

Thus, if zone 1 has been programmed for high need (0.20 inches per day) and zone 2 for average need (0.10 inches per day), then with water volume switch 130 set at position 2, the need for zone 1 will be changed to $(13.3/7) \times 0.20 = 0.38$ inches/day, and zone 2 will be changed to $(13.3/7) \times 0.10 = 0.19$ inches/day.

This control will raise or lower all programmed zones proportionally in accordance with the selected use multiplier. The purpose is to provide a convenient means to adjust the entire watering system to climatic changes without having to reprogram each zone. Drip zones arc unaffected by water volumes switch 130 (except for the "OFF" position of the switch).

The use of day schedule switches 134 has been explained above. When employing every other day and every third day switches 136 and 138, the days on which applications are made change each week. If it is desired to specify the first day that an automatic cycle will start, then the start day desired may be programmed. Assume the programming day is Thursday of the second week. And every other day schedule has been previously selected. The automatic cycle is desired to start Friday (tomorrow) and not run today. By pressing start time key 114 followed by day key 108, a two is displayed in the day position indicating that for the current week, an application would run on the indicated day. The automatic cycles will run on every other day after day "2". If Friday/5 key 104 is then depressed, Friday is set as a day for an automatic cycle to run this week. Thus, for this week, Monday, Wednesday, Friday and Sunday would run. Since today is Thursday, Friday would be the first day with an automatic cycle. Application starts for every third day application are selected in a similar manner.

Calculations to determine cycles per application must take into account applications per week. Accordingly, each possible combination of settings of switches 134 are assigned a particular constant in accordance with the following table:

| Day Schedule Settings Possible | | | Per Week Constant |
|---|---|---|---|
| ALL SWITCHES OFF | | | 0 |
| 1 | day | on; all others off | 1.0 |
| 2 | days | on; all others off | 2.0 |
| 3 | days | on; all others off | 3.0 |
| 4 | days | on; all others off | 4.0 |
| 5 | days | on; all others off | 5.0 |
| 6 | days | on; all others off | 6.0 |
| 7 | days | on; all others off | 7.0 |
| 2nd | day | on; all others on (every other day) | 3.5 |
| 3rd | day | on; all others on (every third day) | 2.33 |
| 2nd | day | on; 1 day selectively omitted | 3.00 |
| 2nd | day | on; 2 days selectively omitted | 2.50 |
| 2nd | day | on; 3 days selectively omitted | 2.00 |
| 2nd | day | on; 4 days selectively omitted | 1.50 |
| 2nd | day | on; 5 days selectively omitted | 1.00 |
| 2nd | day | on; 6 days selectively omitted | .50 |
| 2nd | day | on; 7 days selectively omitted | 0 |
| 3rd | day | on; 1 day selectively omitted | 2.000 |
| 3rd | day | on; 2 days selectively omitted | 1.667 |
| 3rd | day | on; 3 days selectively omitted | 1.333 |
| 3rd | day | on; 4 days selectively omitted | 1.000 |
| 3rd | day | on; 5 days selectively omitted | .667 |
| 3rd | day | on; 6 days selectively omitted | .333 |
| 3rd | day | on; 7 days selectively omitted | 0 |

Conceptually, the controller makes all necessary calculations, based on constants described above, to select run time per cycle and number of cycles per application in accordance with plant needs, type of sprinkler heads, and average infiltration rates of soils. The calculations are in accordance with the following equations:

$$\text{Cycles/Application} = C = \frac{UM}{ID} + 1 \quad (1)$$

$$\text{Time/Cycle} = \frac{60\ UM}{HDC} + 1 \text{ minutes} \quad (2)$$

Where:
D=day schedule constant
I=soil type constant
H=applicator type constant
U=use constant
M=water volume constant Thus, for zone 1 in the above example, where three applications will occur per week, the soil type allows 0.04 inches per cycle, the applicator can generate 0.25 inches per hour, the vegetation will use 0.20 inches per day and water volume switch 130 is set to a constant of 8/7, the calculations are as follows:

$$\text{Cycles/Application} = C = \frac{20 \times 64}{40 \times 24} + 1 = 2.33 \text{ or } 2 \quad (3)$$

(decimal deleted)

$$\text{Time/Cycle} = \frac{60 \times 20 \times 64}{25 \times 24 \times 2} + 1 = 65 \text{ minutes} \quad (4)$$

Note that the internal constant values are employed which are proportional to the meaningful constants in context of the equations employed.

For zone 2, which is to receive three applications per week, has a soil type which can absorb 0.40 inches per cycle, has an applicator which can produce 1.50 inches per hour, has vegetation which needs 0.10 inches per day and for which water volume switch 130 generates a constant of 8/7, the above equations produce an indication that one cycle should occur per application and be on for a period of 11 minutes (deleting the decimal).

Zones 3 through 12 each have been programmed to be omitted from control. Accordingly, cycles per application and time per cycle are both set to 0.

Zones 13 and 14 are reserved for drip zones only. Cycles per application is automatically set to 1 and the time per cycle is entered via the keyboard.

Considering all of the possible variables, combinations of settings exist for which the time per cycle will be less than 1.00 minute. In this event, the controller defaults to a time per cycle of 1 minute to insure operation of all zones programmed into the watering cycle. Similarly, if the programmed settings yield a calculated zone run time greater than 999 minutes, the controller will default to a time per cycle of 999 minutes. These extreme cases are not likely to occur if the controller is programmed correctly.

As can be seen from the above equations, soil type switch 132 generates constants which effect the cycles per application calculation. If it is desired to increase or decrease the watering time per cycle without changing the amount of water being applied per week, the soil type switch 132 may be moved toward "SAND" to increase the time on per cycle or toward "CLAY" to decrease the time on per cycle. Controller 64 recalculates the number of cycles and the on time per cycle based on changes in soil type switch 132 regardless of the position of function switch 128.

After the setting of soil type switch 132 has been changed, the controller recalculates the cycles per application and the on time per cycle for each zone based on the new constants selected for soil infiltration. For example, in the previous example, if switch 132 is moved toward "CLAY" to position 6, the infiltration rate constant is changed to 0.18 inches per cycle. Controller 64 recalculates the cycles per application for zone 1 to be 3 and the on time per cycle to be 43 minutes. Zone 2 is recalculated to run for 2 cycles per application with applicators on 6 minutes per cycle.

As previously mentioned, the purpose of water volume switch 130 is to adjust the overall system to changes in the climate without having to change the program entries for each zone.

Thus, during dry months, water volume switch 130 may be shifted toward "MAX" to increase the amount of water applied per week. During wet seasons, water volume switch 130 may be shifted in the opposite direction to decrease the amount of water applied.

After the setting of water volume switch 130 has been changed, the controller recalculates the cycles per application and the on time per cycle for each zone based on the new multiple for each usage selected. For example, in the previous example, if the switch is changed from "AVERAGE" to "MAX", the use multiplier is effectively changed by a factor of 2. Recalculation for zone 1 will cause three cycles to occur per application, with applicators on 86 minutes per cycle. For zone 2, two cycles will occur per application with applicators on 11 minutes for each cycle. Note that for each zone the total run has doubled.

Changes to any of switches 130, 132 and 134 always cause some change to the automatic program. Therefore, upon detecting a change in position, the controller performs a special calculation. First, any cycle running is turned off. Then, the new irrigation program is calculated. If any zones are disconnected, they are omitted. Then the controller checks to see if any program started yesterday should be running now. If not, the controller then checks if a program started today should still be running. If the controller is in the automatic mode as controlled by function switch 128, the controller jumps into the automatic program in the proper time position as newly determined.

In carrying out the programmed irrigation schedule, on an application day, the controller will execute one cycle in turn for each zone sequentially before returning to the first zone for a second cycle. Remember that a certain minimum OFF period is necessary in a cycle for a particular zone in order to permit that zone to absorb all of the water that had been applied at the beginning of the cycle. In the preferred embodiment, that time period between the ending of one cycle and the beginning of the next cycle for a zone is selected to be at least 30 minutes. By sequentially performing cycles for each of the other zones before returning to the first zone, the 30 minute rest period may be at least partially filled with productive activity.

However, consider the example as set forth above in which the zone 1 on time extends for 65 minutes while the zone 2 on time extends for 11 minutes. If the zone 1 cycle begins at 6:00 a.m., applicators will turn off at 7:05 a.m. Then, the first cycle of zone 2 will begin and applicators will run until 7:16 a.m. Since zones 3 through 12 are shut off, controller 64 then returns to zone 1. However, at that point, only 11 minutes have elapsed since the end of the first on time for zone 1. Therefore, controller 64 waits 19 additional minutes before turning on zone 1 for its second cycle. Thus, zone 1 will turn again at 7:35 a.m. and applicators will run until 8:40 a.m. Then any second cycle for zone 2 would immediately begin since more than 30 minutes would have elapsed since the end of the first on time for zone 2.

As explained above, drip zones are turned simultaneously with the controlled zones. Thus, in the example as set forth above, drip zone 14 will be turned on at 6:00 a.m. and will run until 10:00 a.m. However, if the end time is interrogated at any point, it will display 8:40 a.m.

The key point is that despite whatever combination of keyed inputs in switch dial settings, the controller must insure that at least 30 minutes passes between the turning off of any zone in one cycle and the turning on of that zone in the next cycle.

3. System Hardware

Figure 3B:
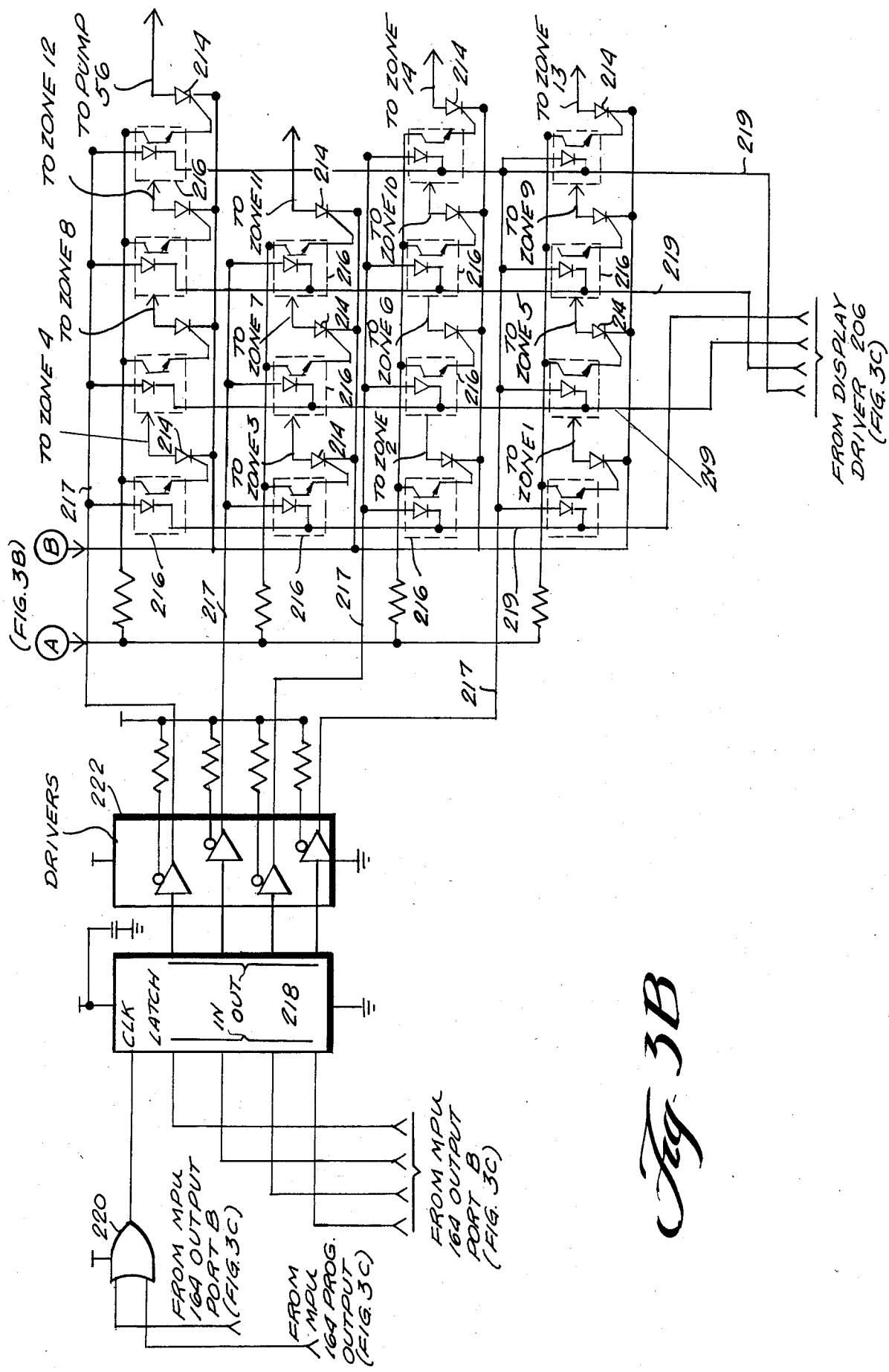

The hardware within controller 64 is illustrated with FIGS. 3A through 3D. Circuitry for providing power to controller 64, valves 54 and a relay for controlling system pump 56 is illustrated in FIG. 3A. The primary source of energy is from the AC line through transformer 150. Transformer 150 produces 24 volts across the outer terminals of the secondary and 12 volts between the center tap of the secondary and either outer terminal. The bottom line from the secondary as illustrated in FIG. 3A is considered as ground. The center tap will be referred to as the 12 volt line and the upper terminal will be referred to as the 24 volt line. The AC signal on the 12 volt line is half-wave rectified by diode 152 and filtered by capacitors 154. The rectified and smoothed waveform is applied to regulator 156 which generates a constant 6.0 volts. This voltage is applied to those elements in FIGS. 3A–3D which have arrow shaped symbols at their power inputs.

The unrectified 12 volt AC signal is applied to a zero crossing detector composed of transistors 158 and 160. As illustrated in FIG. 3C, the output from the zero crossing detector, in the form of pulses noting zero crossings of the 12 volt AC signal is applied through inverter 162 to the interrupt input of microprocessor 164 which is the heart of the control circuitry. Thus, with each zero crossing of the AC waveform (120 times per second) microprocessor 164 performs an interrupt.

The power for microprocessor 164 is provided by regulator 156 through diode 166 (FIG. 3A).

As indicated above, a backup energy source may be provided in the form of battery 168 (FIG. 3A). Power from battery 168 passes through the power terminals of transistor 170 and diode 172 to microprocessor 164 and selected components of the remainder of the circuit. Thus, the voltage at the junction of diodes 166 and 172 is provided to other components of the circuit which have a "T" shape symbol at their power inputs. These components receive power even when an interruption occurs in the AC line current.

The base of transistor 170 is connected to the rectified and smoothed AC signal. As long as an adequate AC line voltage is received, transistor 170 does not conduct, disconnecting battery 168 from the circuit. However, if the AC line voltage should drop, transistor 170 is biased into conduction to provide energy from battery 168 to selected components of controller 64.

The output of regulator 156 is also applied to a network including voltage divider 174 and capacitor 176. The center tap of voltage divider 174 is connected through line 177 to one input of NOR gate 178, the output of which is applied to inverter 180. When AC power is turned on so that regulator 156 begins to produce an output, capacitor 176 causes the voltage on line 177 to lag the voltage at the output of regulator 156. The low level at the input of NOR gate 178 generates a low level at the output of inverter 180 which is applied to the reset terminal of microprocessor 164 to maintain the microprocessor in a reset condition until power to microprocessor 164 has been positively established. Once the voltage on line 177 becomes high, the reset may then be released to allow microprocessor 164 to carry out its functions.

However, due to the battery backup, a reset should not be generated unless both the battery backup and the AC line fail. Transistor 182 is provided having a power terminal connected directly to battery 168. The base of transistor 182 is biased so that transistor 182 is off when the battery is generating 5 volts or less. When the battery is operating normally, the voltage from the battery turns on transistors 182 and 184 so that a low voltage is applied to inverter 186. This provides a high input to NOR gate 178 which maintains the output of NOR gate 178 low and the output of inverter 180 high, thereby prohibiting any resetting independent of the state of the AC line voltage. Thus, as long as the battery is operating, no reset will occur whether or not the AC power becomes disrupted or reestablishes itself. However, when battery 168 produces a low voltage, transistors 182 and 184 turn off, generating a high signal at the input of inverter 186 and a low signal at the input of NOR gate 178. If, at this time, AC power is turned on, a reset will be generated. The output of transistor 184 is also provided to transistor 188 which drives LED 190. Transistor 188 and LED 190 will turn on only when the voltage from battery 168 is low.

The heart of the controller is microprocessor 164 illustrated in FIG. 3C. Connected to microprocessor 164 is read only memory (ROM) 192 which stores the program to be executed by microprocessor 164. In order to permit the same input/output port of microprocessor 164 to be employed for both providing an address to ROM 192 and to receive data from ROM 192, interface 194 is connected between a portion of the address input of ROM 192 and microprocessor 164. Thus, in a conventional manner, interface 194 receives and stores an address designation provided by microprocessor 164. Then, when interface 194 provides the address to ROM 192 and ROM 192 outputs data, that data may be read by microprocessor 164 through the same input/output port. Obviously, ROM 192 and the function of interface 194 may be incorporated within microprocessor 164.

Microprocessor 164 also monitors the state of the AC line voltage. Thus its T1 input receives the output of regulator 156.

Another function of microprocessor 164 is to provide data to be displayed. Displays 140 and 142 are arranged on a matrix basis. Thus, one set of inputs for displays 140 and 142 selects the particular portion of the displays that will be updated, and another set of inputs controls which segments of that portion should be illuminated to generate the desired character.

Data concerning which portion to be updated is provided by microprocessor 164 through latch 196. Latch 196 is clocked by a signal from OR gate 198 which receives two signals from microprocessor 164. One signal from the microprocessor selects gate 198 to be enabled while the other line connected to the PROG output of microprocessor 164 acts as a strobe signal to actually cause data appearing on the input of latch 196 to be stored in and outputted from latch 196. Of the four data lines which latch 196 receives and outputs, three of the lines are connected to both of decoders 200 and 202. The fourth line from latch 196, connected to decoder 202, and the inverse of the fourth line, connected to decoder 200, determines which of decoders 200 and 202 are enabled. Decoders 200 and 202 convert a three-bit signal into an eight-bit signal in a preprogrammed manner which is applied to display drivers 204, 206 and 208. The drivers, in turn, are connected to displays 140 and 142 to provide an indication of which portion of the displays is to be updated.

Data concerning which segments of the selected portion are to be illuminated are provided from a different I/O port of microprocessor 164 through display drivers 210 and 212.

The circuitry for controlling each of the zones and the pump for the system is illustrated in FIG. 3B. One of triacs 214 is employed to provide power to each zone valve 54, respectively. Thus, each of triacs 214 has one power terminal connected to the 24 volt AC line. The other power terminal is connected to one of valves 54. The other terminal of valve 54 is connected to ground. Each of triacs 214 is triggered through a corresponding one of optical couplers 216. The voltage necessary to power the phototransistor of each optical coupler 216 and trigger each triac 214 is provided by the phase difference between the 24 volt and 12 volt AC lines created by capacitor 218.

Which light emitting diode of optical couplers 216 is energized to trigger the corresponding triac 214 is controlled by microprocessor 164. Again, this is accomplished on a matrix basis in which microprocessor 164 causes a first signal to appear on one of row anode lines 217 and a second signal to appear on one of column cathode lines 219 to uniquely connect one of the light emitting diodes of optical couplers 216 in a circuit. Thus, with respect to row anode lines 217, latch 218 receives the same signals from microcomputer 164 as latch 196 (FIG. 3C). At times, these signals contain row data for optical couplers 216. Latch 218 is enabled by microprocessor 164 through OR gate 220 when optical coupler row data is being generated by microprocessor 164. One input of gate 220 provides a general indication that row data is being output by microprocessor 164 and the input of gate 220 which is common with gate 198 provides a strobe signal indicating precisely when latch 218 should accept data at its input. Thus, the signals provided to OR gates 198 and 220 control which of latches 196 and 218 are to accept data from the same output port of microprocessor 164.

The output terminals of latch 218 are connected to drivers 222. Each driver is connected to a different row of light emitting diode anodes of optical couplers 216 through a row line 217.

Data for selecting a column of optical coupler cathodes is provided by display driver 206 from decoder 200 and latch 196 (FIG. 3C). Thus, to energize a particular triac 214, microprocessor 164 generates a column signal which is accepted by latch 196 when enabled by gate 198, which signal causes one column of cathodes of optical couplers 216 to be connected to a voltage source. At the same port, microprocessor 164 generates, at a different time, an indication of the particular row of optical coupler anodes to be energized. This data is received by latch 218 (FIG. 3B) when enabled by gate 220. Only the selected one of the light emitting diodes of optical couplers 216 will be connected in a complete circuit to enable the corresponding triac 214 to be actuated.

Circuitry is also provided for testing whether the lines to each of valves 54 and pump 56 in the zone forms a complete circuit. Accordingly, diodes 224 (FIG. 3A) are provided in the 24 volt line. When current is flowing, diodes 224 develop a sufficient voltage drop to cause current to flow through light emitting diode 226 of optical coupler 228. As a result, optical coupler 228 generates a signal which is applied to switch 230 (see FIG. 3D) which provides an input to microprocessor 164. As long as a selected zone circuit (one of triacs 214 must be energized) is complete, current will flow through optical coupler 228, and the resulting signal can be monitored by microprocessor 164. If the line to a particular actuated zone is broken, no current will flow through optical coupler 228 so that no signal is applied to switch 230. As will be described below, microprocessor 164 then takes steps so that the disconnected zone is never instructed to be actuated. This provides advantages with respect to system pump 56 which can be damaged by being actuated when no zones are turned on.

As mentioned above, the system includes moisture sensor 66. The 24 volt signal is applied to the light emitting diode of optical coupler 229 (FIG. 3A). The cathode of the light emitting diode in optical coupler 229 is connected to a terminal of moisture sensor 66 which has another terminal connected to ground. When moisture sensor 66 is conducting, indicating a flooded condition, current flows through the diode of optical coupler 229 creating a signal at the output of optical coupler 229. This signal is applied to switch 230 (FIG. 3D). When moisture sensor 66 is open, indicating that the water content of the soil around sensor 66 is excessive, no current flows through the diode of optical coupler 229 so that no output is generated. This state is also monitored by microprocessor 164 through switch 230.

The last function of microprocessor 164 is to accept data input through the keys and switches of controller 64. Thus, all data for controller 64 is applied to microprocessor 164 through switches 230, 232 and 234 (FIG. 3D). NOR gates 236 and 238 provide signals to enable either switch 230 or switches 232 and 234 at the precise time when data is to be transferred to microprocessor 164. NOR gates 236 and 238 are controlled by microprocessor 164 in a manner similar to OR gates 198 and 220 with respect to control being provided by two signals.

All of the keys and manually operable switches on controller 64 are interconnected to be read in a matrix manner. That is, one terminal of each key and switch is connected to one of a plurality of column lines 235. The other terminal of each key and switch is connected to one of a plurality of row lines 237. When a signal is provided on a particular column line 235, row lines 237 are monitored to determine if any of the switches connected to the energized column line 235 are closed. In this manner, any closed switches can be determined.

In the preferred embodiment, one terminal of the keys in each row across keyboard 100 are connected to one of column lines 235. Also, each of soil type switch 132, water volume switch 130, function switch 128 and day schedule switches 134 except third day switch 138 have one terminal connected to a separate column line 235. Third day switch 138 forms a separate column. Selected column lines 235 are energized by signals from microprocessor 164 through latch 196 (FIG. 3C) and decoders 200 and 202.

Another terminal of the keys in each column of keyboard 100 are connected to one of row lines 237. Also, one position of each of switches 128, 130, 132 and 134 is also connected to each of row lines 237, respectively. Row data from the keys and switches pass through switches 232 and 234 at the appropriate moment as controlled by microprocessor 164 via NOR gate 238 and are received by microprocessor 164.

System conditions which microprocessor 164 must monitor are received by microprocessor 164 through switch 230. Thus, one input of switch 230 receives battery condition information from transistor 184 (FIG. 3A). The output of moisture sensor 66, as sensed by optical coupler 229, is connected to another input of switch 230. Finally, a line test signal from optical coupler 228 is also applied to switch 230.

4. Main Program

The manner in which microprocessor 164 operates will now be described with respect to FIGS. 4A through 14. FIGS. 4A through 4E illustrate the main program executed by microprocessor 164. When a reset is released at step 250 (FIG. 4A) after power after power is first applied, microprocessor 164 carries out the previously described default irrigation program at step 252 and causes the display to blink at step 254. Then, a determination is made at step 256 whether AC power is on as sensed by the T1 input of microprocessor 164. When power is on, the program proceeds to the set test line alert subroutine at step 258. This subroutine prohibits any zones from being actuated until the lines to the zones are checked during an interrupt sequence as described below.

Figure 4A:
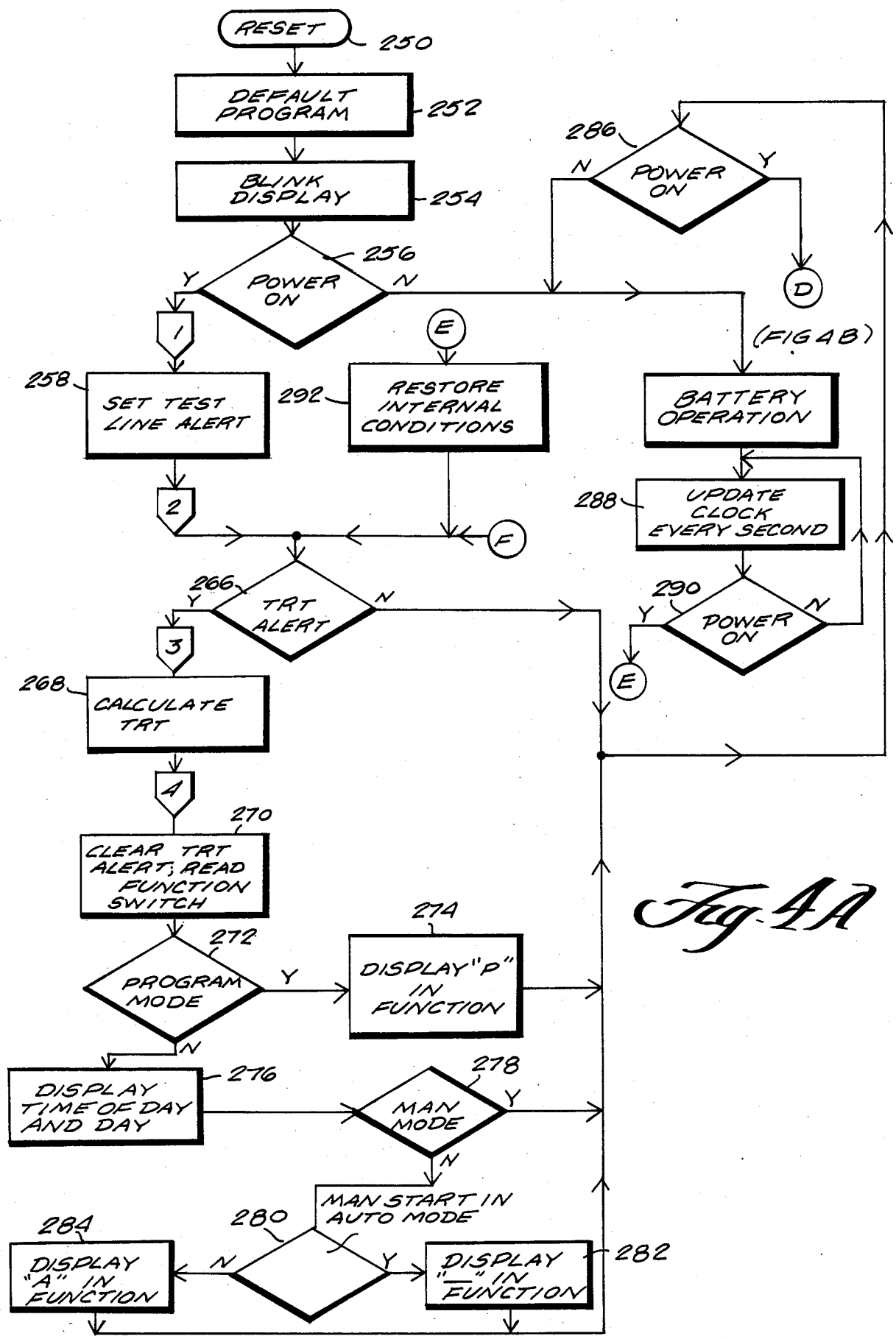

The set test line alert subroutine is illustrated in FIG. 4D. At step 260, a flag entitled "test line alert" is set. Step 262 enables any interrupt command so that at an appropriate time, the interrupt sequence can be performed. At step 264, the test line alert is monitored as to whether it is set. Since it has been set in step 260, the program repeatedly performs this step. The only place in the program at which the test line alert is cleared is in the interrupt sequence. Thus, step 264 causes microprocessor 164 to wait for the next interrupt. Upon receiving an interrupt command, microprocessor 164 immediately jumps to the interrupt sequence, during which the test line alert is cleared after line testing so that upon returning to the main program, microprocessor 164 will pass from step 264 in FIG. 4D to step 266 in FIG. 4A.

At step 266 microprocessor 164 determines whether the TRT alert has been set. This is an alert (i.e. flag) that is set once every second in the interrupt sequence. If it has been set, it is time to again perform the cycles per application and the time per cycle calculations. Thus, processing proceeds to step 268 at which the calculate TRT subroutine is performed. This subroutine may be considered the heart of the program in that it performs the cycle calculations for each zone and determines whether any zone should be turned on. The calculate TRT subroutine is illustrated in FIGS. 6A through 6F and will be described in detail below. Note that all of the calculations are performed once every second whether or not any of the switches on the controller have been changed or any keys depressed.

After performing the calculate TRT subroutine in step 268, the TRT alert is cleared and function switch 128 is read at step 270. Based on the position of function switch 128, the program then determines what should be displayed. Accordingly, at step 272, microprocessor 164 determines whether function switch 128 indicates the programming mode. If it is, "P" is displayed in the function portion of display 142. If switch 128 is not in the programming position (i.e., it is in either the automatic or manual position), the day and the time of day is displayed at step 276.

At step 278, it is determined whether switch 128 is in the manual position. If it is not, then the switch must be in the automatic position. The indication provided in the function portion of display 142 depends on whether manual ON/OFF key 124 has been depressed. If it has been depressed, a dash is displayed at step 282. If key 124 has not been depressed, then the controller is operating in the automatic mode so that an "A" is displayed at step 284.

After step 274, 282 or 284, and after it is determined at step 278 that controller 64 is in the manual mode, processing proceeds to step 286. Also, if at step 266 it is determined that a second has not passed since the previous setting of the TRT alert, processing proceeds to step 286 at which it is determined whether AC power is on. If it is determined in either step 256 or 286 that AC power is not on, microprocessor 164 enters a battery mode of operation in which only the real time clock is updated in accordance with the oscillator associated with microprocessor 164. Accordingly, at step 288 the clock is updated every second. Then, at step 290, it is again determined whether AC power has been turned on. Microprocessor 264 repeatedly performs step 288 until AC power is restored. Then, processing proceeds from step 290 to step 292 at which internal conditions are restored before microprocessor 164 determines whether the TRT alert has been set at step 266.

If it is determined at step 286 that power is on, microprocessor 264 then reads the keyboard and all switches at step 294 (FIG. 4B). At step 296, it is determined whether or not a key has been depressed. If not, microprocessor 164 proceeds to step 292 (FIG. 4A). If a key has been depressed, it is determined at step 298 whether that key is valid (e.g., whether or not two keys have been depressed simultaneously). If a valid entry has not been made, processing returns to step 266 (FIG. 4A).

If a valid key has been pressed, it is determined at step 300 whether function switch 128 has been changed since the previous determination at step 300. If function switch 128 has not been changed, the new key code is saved at step 302. Then, the key execution sequence is performed at step 304 which is illustrated in FIGS. 8A through 8L and will be described in detail below. Basically, the key execution sequence performs all steps necessary upon depression of a key including appropriate storage, calculation and display functions. Upon completion of the key execution subroutine at step 304, processing returns to step 292 in FIG. 4A.

If function switch 128 has been changed as detected at step 300, all alert associated with depression of keys 102 (set in the key execution subroutine) are cleared at step 306 and a code associated with the new position of function switch 128 is saved at step 308.

At step 310, it is determined whether function switch 128 has been moved to the manual position. If it has, all zone and pump alerts are cleared, so that in the next execution of the interrupt sequence, all zones and pump 56 will be turned off. Also at step 312, the manual ON/-OFF flag, indicating that manual ON/OFF key 124 has been depressed and the function portion of display 142 is cleared.

If at step 310 it is determined that function switch 128 has not been switched to manual operation, controller 64 is in either the programming or automatic mode. At step 316, it is determined whether function switch 128 is in the automatic position.

If the determination at step 316 is positive, microprocessor 164 then determines whether an end time has been set at step 318. If it has, the new start time is stored at step 320.

If, at step 316, it is determined that controller 64 is not in the automatic mode, then it must be in the program mode. Internal, to controller 64, the actual mode can be changed without the position of function switch 128 having changed. For example, as will be described below, the execution of the calculate TRT subroutine after any of switches 130 through 134 have been changed, causes the internal mode designation to change to manual so that the new data can be entered. Then, almost instantly, the internal mode designation changes back to program.

Steps 322 and 324 are employed to cause any changes associated with changes in switches 130 and 132 to be displayed. Thus, in step 322 it is determined whether any number appears in the zone portion of display 140. If so, at step 324, new zone data for that zone is displayed. After step 324 or after a negative determination as step 322, the program returns to step 292 in FIG. 4A.

After step 312 or 320, or after a negative determination as step 318, the remaining portion of the main program determines if the present time of the present day falls within the start and stop times of an application. Also, the remainder of the program clears the display. Thus, at step 326 (FIG. 4C) the AD, AD' and manual ON/OFF flags are cleared. The AD flag provides an indication that the present day is, in fact, an application day, and furthermore that an application is in progress. The AD' flag indicates that today is an application day although an application may or may not be in progress. The manual ON/OFF flag indicates that the manual ON/OFF key 124 has been depressed.

Then, at step 328, the manual time left counter, indicating the length of time that a zone will run under manual control is cleared. This clearing step is important if the function switch change noted in step 300 (FIG. 4B) is from the manual to automatic mode. It should be noted that steps 326 et seq. will be executed only if function switch 128 has been changed into either the automatic or manual mode.

Since a zone may be about to be turned on, the lines should be tested. Accordingly, the set test line alert subroutine will be executed at step 330 (FIG. 4D) so that the program advances no further until the lines are tested in the next interrupt sequence as described above with respect to the set test line alert subroutine.

Next, at step 332, the TD' check subroutine illustrated in FIG. 4E is executed. The remainder of the main program is to determine whether an application is in progress. The TD' check subroutine determines whether an application is in progress which began the previous day. Contrast this with the DMISUB subroutine, executed at step 334 (FIG. 4C) which determines whether an application is in progress which began today.

Turning now to the TD' check subroutine in FIG. 4D, the day count (DC), a number corresponding to the present day, is incremented by one day less than six weeks. This effectively sets the day count back to the previous day. It is necessary to increment the day count by six weeks in that if every other day switch 136 is set, controller 64 operates in two week cycles whereas if every third day switch 138 is set, controller 64 operates in three week cycles. Accordingly, the earliest that any day can be guaranteed to have the same application schedule is six weeks later. That the day count is advanced by one day less than the six weeks effectively causes the day count to indicate the previous day.

Once the day count has been backed to the previous day, the DMISUB subroutine, illustrated in FIG. 7, is executed at step 338 for the previous day. At step 340, registers DC', D and WK' are cleared. DC' and WK' are artificial indications of day and week numbers, respectively, being processed. In effect, DC' and WK' represent days and weeks, respectively, that will be looked at on a sequential basis. The register D stores values employed to generate the constant corresponding to the setting of day schedule switches 134. The DMISUB subroutine calculates the constant D and determines whether a watering application should occur the day designated by DC.

At step 342, it is determined whether the present value of DC' represents a day which is switched on among day schedule switches 134. If it is, the register D is incremented by eight at step 344. Then, at step 346, it is determined whether the day represented by DC' is in fact the day indicated by DC. If it is, then at step 348 it is determined whether the week indicated by WK' is in fact the present week. Since none of these steps would occur unless the present value of DC' corresponds to an ON switch among day schedule switches 134 (see step 342) if the determinations at steps 346 and 348 are positive, a watering application should occur on the day designated by DC. However, keep in mind that at step 336 (FIG. 4E) the day count (DC) was set to indicate the previous day, so that at step 346, (FIG. 7) DC' is actually compared to yesterday. Thus, if steps 346 and 348 produce positive comparisons, then yesterday was a day on which a watering application should have occured. This is so indicated by setting AD' alert at step 350.

The counter DC' is then incremented by means of steps 352 through 360 and processing returns to step 342. Thus, at step 352, if it is determined whether every other day switch 136 is set. If so, DC' is incremented by two at step 54. If the determination at step 352 is negative, it is next determined whether every third day switch 38 is set. If it is, DC' is incremented by three. If switch 138 is not set, it means that an application may occur on the next day so that DC' is incremented by one at step 360. Then, at step 362, it is determined whether DC' has been advanced through an entire week. If it has not, processing returns to step 342. If it has, step 364 decrements DC' by a week (7) and increments WK' by a week (1).

When control passes to step 364, one week of applications has been processed by incrementing DC'. The remainder of the DMISUB subroutine determines whether an application program should repeat every week, every other week or every third week. This depends upon the setting of second and third day switches 136 and 138. Thus, as step 366, it is determined whether second day switch 136 has been set. If it has, at 368 it is determined whether two weeks have been processed by the preceding loops through the DMISUB subroutine. If it has not, processing returns so that the second week of the application program may be completed. If the second week has just been completed, then at step 370, D is decremented by a factor of 2 to properly reflect the effect on constant D caused by setting every other day switch 135. Then, processing returns step 338 in FIG. 4E.

If at step 366 it is determined that every other day switch 136 has not been set, it is determined at step 372 whether every third day switch 138 has been set. If it has not been set, then it is known that the application program repeats every week so that no further passes through DMISUB subroutine are necessary. However, if every third day switch 138 is set, at step 374 it is determined whether 3 weeks have been processed by the DMISUB subroutine. If not, processing returns to step 342 so that at least one more week can be processed. Eventually, three weeks are processed at which time the subroutine ends.

Recall that DMISUB subroutine was accessed from step 338 of the TD' check subroutine illustrated in FIG. 4E. Next, at step 376 in FIG. 4E, the day count is incremented by one so that it again indicates the present day. Then, at step 378 it is determined whether the AD' flag has been set. The DMISUB subroutine executed at step 338 set the AD' flag if an application began the previous day. If an application did begin yesterday steps 380 and 382 determine whether that application which began the previous day is still in progress. Thus, at step 380 the start time for that application is added to TMAX. TMAX represents the greater of: (1) the total run time for zones 1 through 12, (2) the run time for zone 13 or (3) the run time for zone 14. Thus, TMAX represents the maximum time that water will be applied to any zone in an application. Thus, the sum of the start time and TMAX represents the time at which the application ends. This value is compared to 1440 which is the number of minutes in 24 hours. If the comparison is positive, it means that the application extends from yesterday into today. At step 382, it is determined whether the application is still progress. Accordingly, the present time of day is added to 1440 and this is compared to the sum of the start time and TMAX. If the comparison is positive, then the TD' flag is set, indicating that an application is presently in progress which began the previous day.

If any of the determinations in steps 378, 380 and 382 are negative, an application is not presently in progress which was started the previous day. Accordingly, at step 386, the TD' and AD' flags are cleared. This ends the TD' check subroutine and processing returns to step 332 in FIG. 4C.

Then, processing proceeds to step 334 in which the DMISUB subroutine (FIG. 7) is again executed. However, keep in mind that it will be executed with the day count register indicating the present day. Therefore, as a result of execution of the DMISUB subroutine at step 334, the AD' flag will be set if today is a day on which an application begins.

Then, at step 388, microprocessor 164 causes display 140 to indicate "ALL OFF". This is to clear stale information from the display. If a zone is presently on, the next pass through calculate TRT subroutine (to be performed within one second) will cause appropriate data to be displayed.

The remainder of the main program determines whether an application is presently in progress or not. Thus, at step 390, it is determined whether the TD' flag has been set. Recall that this flag is set only if an application is presently in progress which started the previous day. Accordingly, if step 390 produces a positive determination, at step 392 the AD flag is set, indicating that an application is presently in progess.

If the TD' flag has not been set at step 390, processing proceeds to step 394 at which the starting time for the application is compared to the time of day. If the starting time is later than the time of day, it is not yet time for an application so that at step 396, the AD flag is cleared.

However, if the time of day is after the starting time, it is possible that an application may be in progress. Accordingly, at step 398, it is determined whether the present time of day is less than the end time of the entire application represented by the sum of the start time and TMAX. If the determination is negative, any possible application is over so that the AD flag is cleared at step 396. If the determination at step 398 indicates that the present time is between the starting and the ending time of an application, step 400 determines whether the AD' flag is set. It should be recalled that the AD' flag is set only during a day on which an application is to occur. Therefore, if the AD' flag is set, today is an application day and steps 394 and 398 have determined that the present time of day is between the starting time and the ending time. Accordingly, at step 392, the AD flag is set. If today is not an application day then the determination at step 400 is negative so that the AD flag is cleared at step 396. Processing then returns to step 292 in FIG. 4A so that the main program can be repeated.

5. Interrupt Sequence

As mentioned above with respect to FIGS. 3A and 3C, every time the AC waveform crosses zero volts, a pulse is applied to the interrupt input of microprocessor 164, to cause initiation of an interrupt sequence. At that time, microprocessor 164 stops whatever it has been doing to complete the interrupt sequence. Since the interrupt sequence occurs with every zero crossing, it is performed 120 times every second.

The interrupt sequence performs four primary functions. First, it updates the pump delay. Second, it updates the present time status including time of day, day count and week. Third, it tests the lines to the zones for discontinuity. Fourth, it controls the operation of displays 140 and 142.

Figure 5C:
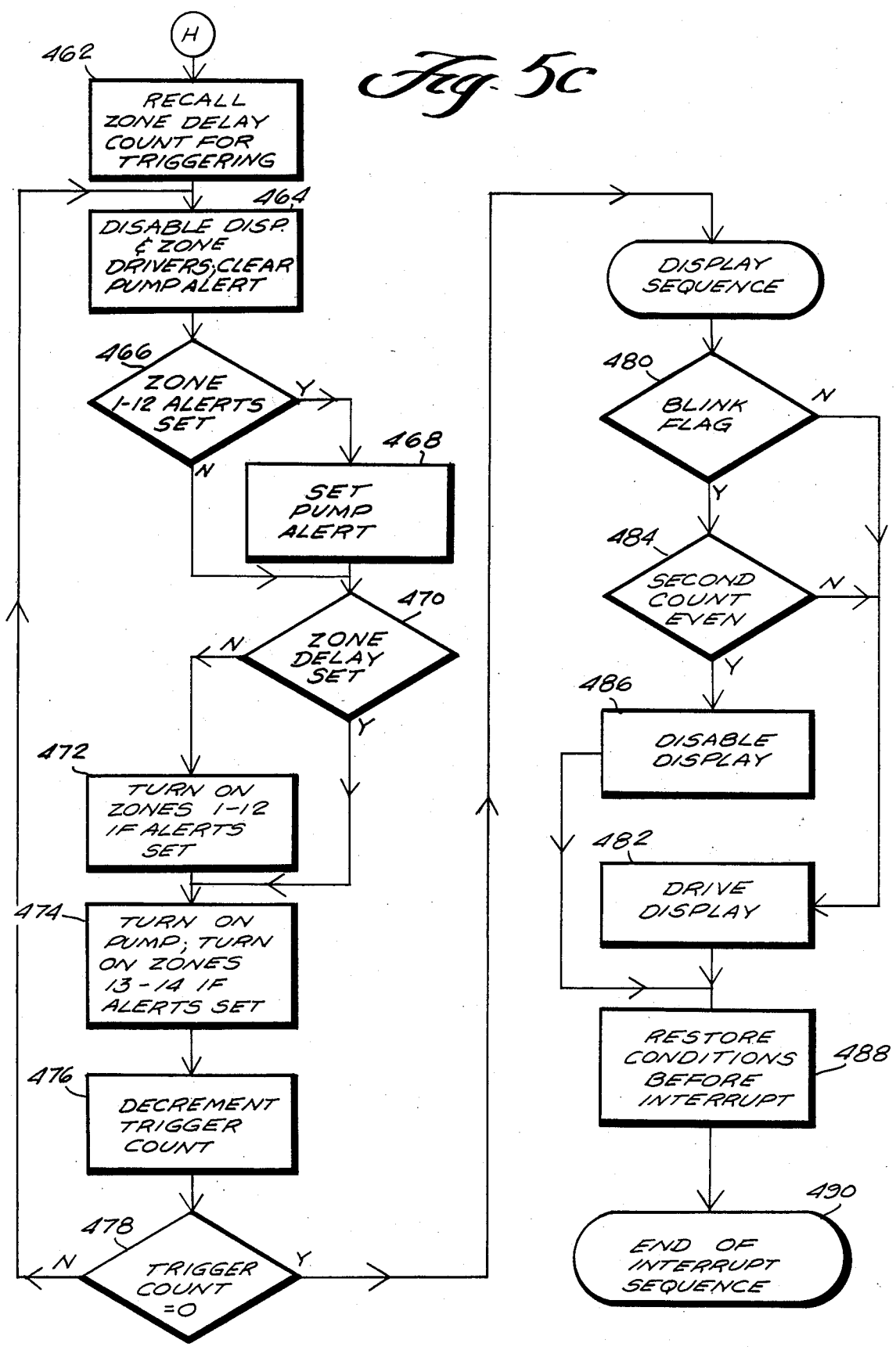

Upon entering the interrupt sequence as illustrated in FIGS. 5A through 5C, a divide by 120 counter is incremented at step 402 (FIG. 5A). This counter counts up to 120 and then resets. When it reaches 120, it indicates that one second has passed from the previous time that it reached 120. Whether or not a second has elapsed is determined at step 404. If one second has elapsed at step 404, it is necessary to update the pump delay and increment the time of day.

When a zone is to be turned on, pump 56 is turned on four seconds before the zone to enable water in pipes 52 and 58 connecting pump 56 and the zone to develop pressure before the zone is turned on. The pump delay portion of the interrupt sequence controls this four second delay. Accordingly, at step 406, it is determined whether any alerts for zones 1 through 12 have been set. Any zone with an alert is to be turned on. However, the pump must be on for four seconds prior to the zone. Therefore, as soon as the controller determines that a zone is to be turned on in the calculate TRT subroutine to be described below, a zone delay flag is set. At step 408, it is determined whether this flag has, in fact been set. If it has been set, the four second delay is advanced by one. If the zone delay flag is not set, the four second period is already expired. When the four second delay count measures four seconds, the zone delay flag is cleared.

If no zone alerts are set as determined in step 406, if the zone delay flag is not set as determined in step 408 or if step 410 is executed, the interrupt sequence then increments the time of day data. Thus, at step 412, the second count is advanced. Also, since one second has elapsed as determined step 404, the TRT alert is set so that when processing returns to step 266 (FIG. 4A) of the main program, all calculations for the zones are repeated.

At step 414 it is determined whether the second count equals 60, indicating that a minute has expired. If so, the second counter is cleared, a minute alert is set and the minute counter is advanced at step 416.

Then, at step 418 it is determined whether the minute count has reached 1440 minutes, the number of minutes in a day. If so, the minute counter is cleared and the day counter is advanced at step 420.

At step 424, it is determined whether the day count has reached seven. If so, at step 426, the day counter is reset to one and the week counter is incremented.

As suggested above, the week count is allowed to increment only to the number of weeks necessary before the application schedule repeats itself. If neither every other day switch 136 nor every third day switch 138 are set, the determination at steps 428 and 430 are negative. Since the watering program repeats itself every week, step 432 clears the week counter. If every other day switch 136 is set as determined by step 428, the application program will repeat itself every two weeks. Accordingly, at step 429, it is determined whether the week counter has just been incremented to the second week, suggesting that the second week has just been completed. If so, the week counter is cleared at 432. If not, then the incremented week count will be maintained for the second week.

If step 430 determines that every third day switch 138 is set, the application program will repeat itself every three weeks. Step 431 determines whether three weeks have been completed. If they have been, step 432 resets the week counter.

After the present time of day has been updated, microprocessor 164 executes step 434 in which the display is disabled. As will be described below it remains disabled for a very brief period while lines are tested and any indicated triacs are turned on.

Microprocessor 164 then determines at step 436 of FIG. 5B whether the test line alert has been set. Recall that the test line alert is set at step 260 in FIG. 4D when the test line alert subroutine is executed. This subroutine is called at step 258 in FIG. 4A and 330 in FIG. 4C. The test line alert is set at step 260 (FIG. 4D) to cause the program to repeatedly loop at step 264 until the next interrupt sequence occurs. As a result, no zone can be turned on until the lines to the zones have been tested.

The testing of the lines occurs at step 438. The triac for each zone and the pump is turned on for approximately 1/60 of a second to see if any current will flow through the triac. If current does flow, it suggests that the zone line is functioning properly. If the test fails, that zone is omitted from further calculations, so that it will never be turned on. After testing each zone at step 438, the test line alert is cleared at step 440, conditions before the interrupt are restored at step 488 and the interrupt sequence ends at 490.

If the test line alert has not been set as determined in step 436, it is necessary to turn on a selected zone when operating in either the manual or automatic modes. Accordingly, at step 442, it is determined whether function switch 128 is in the manual position. If it is, then the alert flags for the zones and the pump flag are cleared in step 444. As will be developed below, if any of the zones should be manuallly operated, then those zones will have their alerts reset in a later part of the program.

Next, microprocessor 164 determines whether manual ON/OFF key 124 was depressed to enter the manual on mode at step 446. If not, then no zones need to be turned on. However, if a manual operation is in progress, it is next determined whether the minute alert is set at step 448. Note that the minute alert was set at step 416 in FIG. 5A when the minute count is incremented. Thus, when the minute alert flag is set, a minute has passed since the previous minute alert flag. Accordingly, at step 450, the time left for manual operation is decremented by one minute. If the minute alert flag has not been set, indicating that a minute has not passed, or after decrementation at step 450, it is determined at step 452 whether the manual time left has decreased to zero, indicating that the manually operated zone should be turned off. If the manual time left is zero, then at step 454, the function portion of display 142 is made blank and "ALL OFF" is displayed in display 140. If, at step 452, it is determined that there is some time remaining for manual operation, the manually operated zone is determined at step 456 and an alert is set for that zone. At step 458, the zone number and the manual time left for that zone are displayed, but the rest of display 140 is deleted.

After processing a manual operation in progress, or after a negative determination at step 442 or 446, the minute alert is cleared at step 460 since all decrementation in response to the minute change has been performed.

Microprocessor 164 then proceeds to turn on the triacs for the pump and a selected zone. Accordingly, a zone delay count is retrieved for triggering the triacs at step 462 in FIG. 5C. Triacs can only be triggered when the AC waveform applied to the power terminals is crossing zero. As a result of the voltage lags inherent with connecting the triacs to inductive loads, it is impossible to predict when a zero crossing will occur. Accordingly, triggering is repeatedly attempted a number of times equal to the zone delay count number. Thus, step 462 initializes a counter which will be decremented each repeated attempt to turn on the triacs.

At step 464, displays 140 and 142 and the zone drivers are disabled and the pump alert is cleared. At step 466, it is determined whether the alerts for any of the zones have been set. A zone alert is set when that zone should be turned on. If any of the zone alerts have been set, the pump alert is set at step 468 which cause the pump to be turned on. After step 466 determines that no zone alerts have been set or after step 468, it is next determined at step 470 whether the zone delay has been set. Recall that the zone delay flag will be set to permit the pump to operate for four seconds before any zone is turned on. The delay count is advanced at step 410 in FIG. 5A and when the delay count has advanced four seconds, the delay flag is cleared. Thus, if the zone delay is set, the zones are not ready to be turned on. On the other hand, if the zone delay is not set, it is possible that the zones should be turned on. Accordingly, if at step 470, it is determined that the zone delay is not set, at step 472 any of zones 1 through 12 is turned on if an alert is set. However, if at step 70 it is determined that the zone delay is set, then step 472 is skipped. Whether or not step 472 is executed, step 474 turns on pump 56 if the pump alert is set, and turns on zones 13 and 14, the drip zones, if alerts for these zones are set.

The first attempt to turn on selected triacs 214 having been completed, the trigger count is decremented at step 476 and at step 478, it is determined whether the trigger count has been decremented to zero. If not, processing returns to step 464 and another attempt is made to turn on the selected triacs.

After a number of attempts have been made to turn on triacs 214 corresponding to the zone delay count, any triacs which should be on will be turned on. Accordingly, once the trigger count does equal zero in step 478, control passes to step 480 which begins the sequence for controlling the display.

Recall that the display should blink when controller 64 is first energized. Thus, at step 254 in FIG. 4A, a blink flag is set upon the release of the master reset for microprocessor 164. The blink flag is cleared once enter key 126 is depressed.

If, at step 480, it is determined that the blink flag is not set, then at step 482, the display is driven. If the blink flag is set at step 480, then the display will be turned on for a second and turned off for a second. This turning on and turning off is controlled by whether the second count is even or odd. The display is turned off when the count is even and turned on when the display is odd. Accordingly, at step 484, the second count is examined. If it is even, then the display is disabled at step 486. If the count is odd, then the display is driven at step 482.

The execution of either step 482 or step 486 ends the interrupt sequence. Accordingly, at step 488, conditions before the interrupt are restored and at step 490, microprocessor 164 returns to the place in the program at which the interrupt occurred.

6. TRT Calculate Subroutine

FIGS. 6A through 6F illustrate the TRT calculate subroutine which performs all calculations for the number of cycles per application and time per cycle for each of the zones, and relates the cycles to the starting or ending time to determine when zones should be turned on and turned off. Recall that the calculate TRT subroutine was called at step 268 in FIG. 4A in the main program.

Figure 6A:
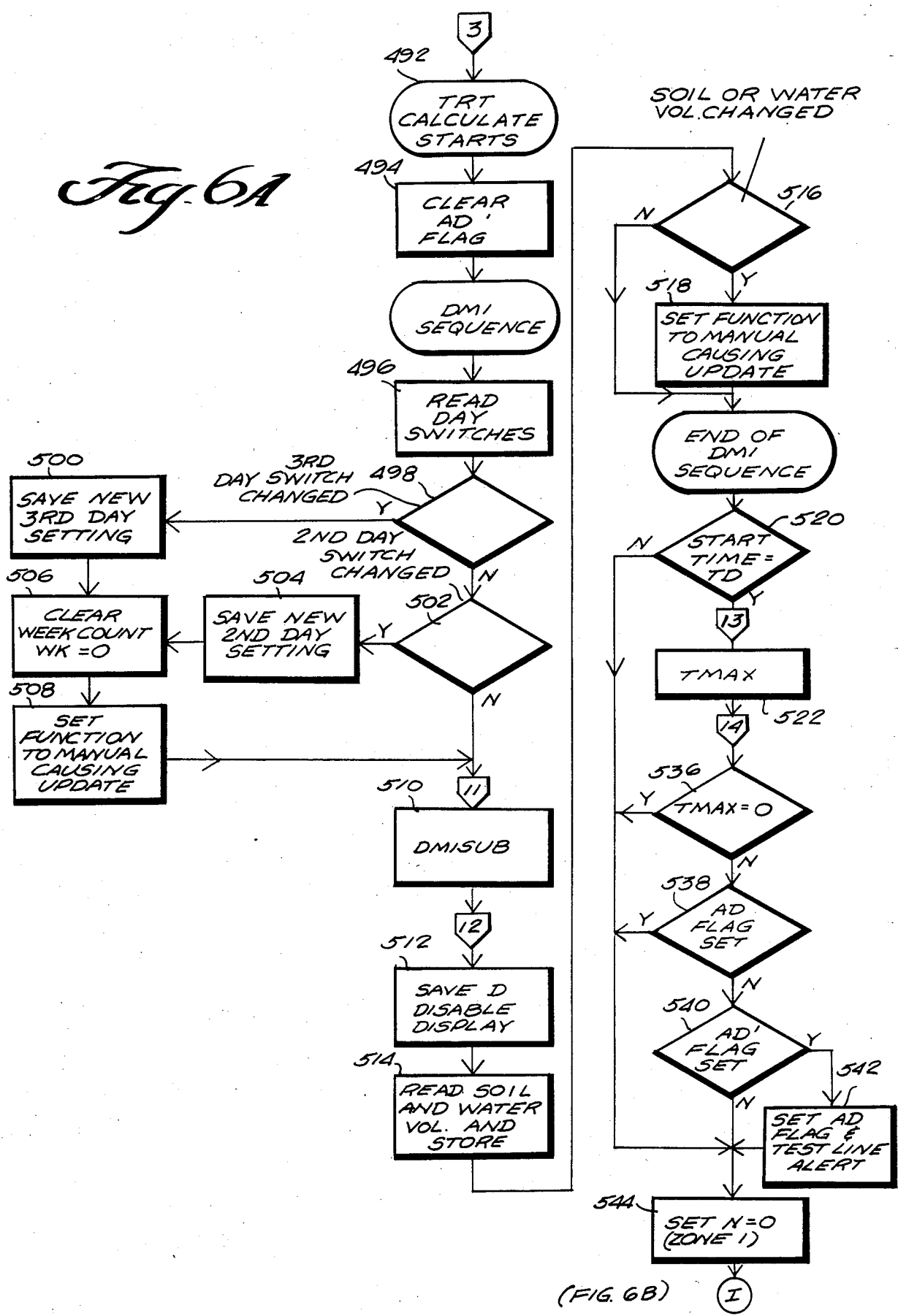
FIGS. 6A through 6F illustrate a flow diagram of the TRT calculate subroutine of the present invention.

After the TRT subroutine starts at step 492 in FIG. 6A, step 494 clears the AD' flag. It should be recalled that the AD' flag is set when the present day is a day on which an application is to occur. This flag is cleared at this point in order to eliminate what may be old information. If the present day is in fact an application day, the AD' flag will be set at a later point.

With step 496, the DMI sequence begins. This sequence is designed to read day schedule switches 134 and process accordingly. Thus, at step 496, day schedule switches 134 are read. At step 498, it is determined whether third day switch 138 has changed since the previous reading. If so, the new third day setting is saved at step 500. If the third day switch has not changed, then at step 502, it is determined whether every other day switch 136 has been changed. If it has been changed, the new setting is saved at step 504.

If either third day switch 138 or every other day switch 136 have been changed, it is necessary to restart the application program with the present week. This is accomplished by resetting the week counter to zero at step 506. Also, at step 508 the functional status of controller 64 is internally changed to manual which causes an update in the controller 64 when the function switch 128 is next read. Thereafter, the internal function status is changed back to that indicated by function switch 128. After step 508, or if neither third day switch 138 nor every other day switch 136 has been changed as determined by step 502, the DMISUB subroutine is executed at step 510. A description of this subroutine has already been provided since this subroutine was called at step 334 of the main program in FIG. 4C. As explained previously, the purpose of the DMISUB subroutine is to calculate a constant to be used in the determination of cycles per application and time per cycle related to the positions of day schedule switches 134. Also, the DMISUB subroutine determines whether the present day is an application day. If it is, the AD' flag is set at step 350 (see FIG. 7).

After the DMISUB subroutine is executed at step 510, the constant D is saved at step 512 and the display is disabled to enable data to be read from soil type switch 132 and water volume switch 130 at step 514. If either of these switches have changed as determined by step 516, the functional status of the controller is internally set to manual in step 518 to cause an update when the switches are next read.

Figure 13:
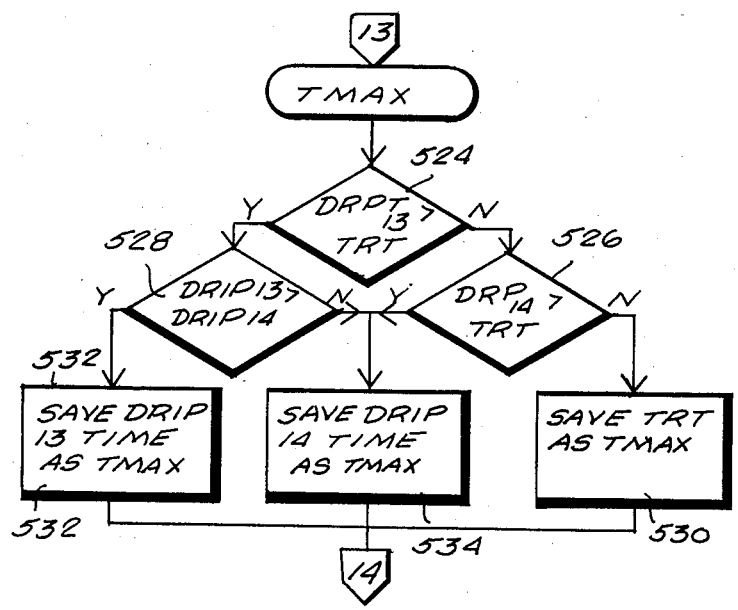
FIG. 13 illustrates a flow diagram of the TMAX subroutine of the present invention.

The next function of the TRT calculate subroutine is to set the AD flag on an application day when the present time reaches the start time for the application. Thus, at step 520, it is determined whether the start time and the time of day correspond. If they do not correspond, then either the AD flag has already been set or it should not be set. If the start time and the time of day do correspond, a possibility exists that the AD flag should be set, indicating that an application is to begin. First, at step 522, the TMAX subroutine is called which is illustrated in FIG. 13. The purpose of the TMAX subroutine is to determine the greatest value between: (1) the total run time for zones 1 through 12, (2) the total time that drip zone 13 is to be one, and (3) the total time that drip zone 14 is to be on. Thus, steps 524, 526 and 528 compare one of the three variables specified above with another. If the total run time for zones 1 through 12 is the greatest value of the three, then at step 530, the total run time for zone 1 through 12 is saved as TMAX. If the time for drip zone 13 is the greatest, then at step 532, that time is saved as TMAX. If the time for drip zone 14 is the greatest, then at step 534 that time is saved as TMAX.

Upon completion of the TMAX subroutine, processing proceeds to step 536 in FIG. 6A. As indicated above, the overall purpose of this portion of the TRT calculate subroutine is to set the AD flag if today is an application day and the start time is the same as the time of day. However, suppose that water volume switch 130 is in the OFF position. Then, none of the zones should be turned on. However, for the one minute that the start time is the same as the time of day, the fact that that day is an application day will cause the AD flag to be set so that at least the system pump will turn on for that minute. This may, over time, damage the pump. Accordingly, at step 536, it is determined whether TMAX equals zero (as it is if water volume switch 130 is off). If it is, then the AD flag will not be set, thus saving the pump.

At step 538, it is determined whether the AD flag is, in fact, set. As will be discussed below, when the AD flag is set in step 542, the test line alert is set, causing all the lines to be tested. As mentioned above, for one minute the start time will be the same as the time of day. During one minute, microprocessor 164 would pass through step 542 7200 times if step 538 were not there. Accordingly, the lines would be repeatedly tested, which is unnecessary. Accordingly, after the AD flag has been set, step 538 will cause microprocessor 164 to skip steps 540 and 542.

However, the first time that microprocessor 164 determines that the start time is the same as the time of day at step 520, the determination at step 538 will be negative so that at step 540, it will be determined whether the AD' flag is set, indicating that the present day is an application day. If today is not an application day, then the AD flag should not be set. However, if the AD' flag is set, then it is an application day, and since the start time and the time of day are the same, an application should begin. Accordingly, at step 542, the AD flag and the test line alert are set so that the lines will be tested prior to turning on any of the zones.

The next portion of the TRT calculate subroutine actually arranges the particular pattern in which each of the zones should be actuated. In practice, as described above, one cycle for each zone is completed before the second cycle of the first zone is begun. Similarly, the second cycle for each of the zones is completed before the third cycle for the first zone, if any, is completed.

The calculations for the zone cycles are performed in a similar order. Thus, the number of cycles per application for each zone is calculated. Then, the first cycle of each zone is considered and the time for that cycle is determined. Then the process is repeated for the second, etc. cycles for the zones.

This process begins at step 544 in which N, a variable related to the zone number, is set to zero. When N equals zero, reference is to zone 1. Then, at step 546 in FIG. 6B, the CN sequence subroutine is performed. This subroutine determines the number of cycles per application necessary for zone N. The first time this subroutine is executed, the number of cycles per application for zone 1 is determined.

Figure 9:
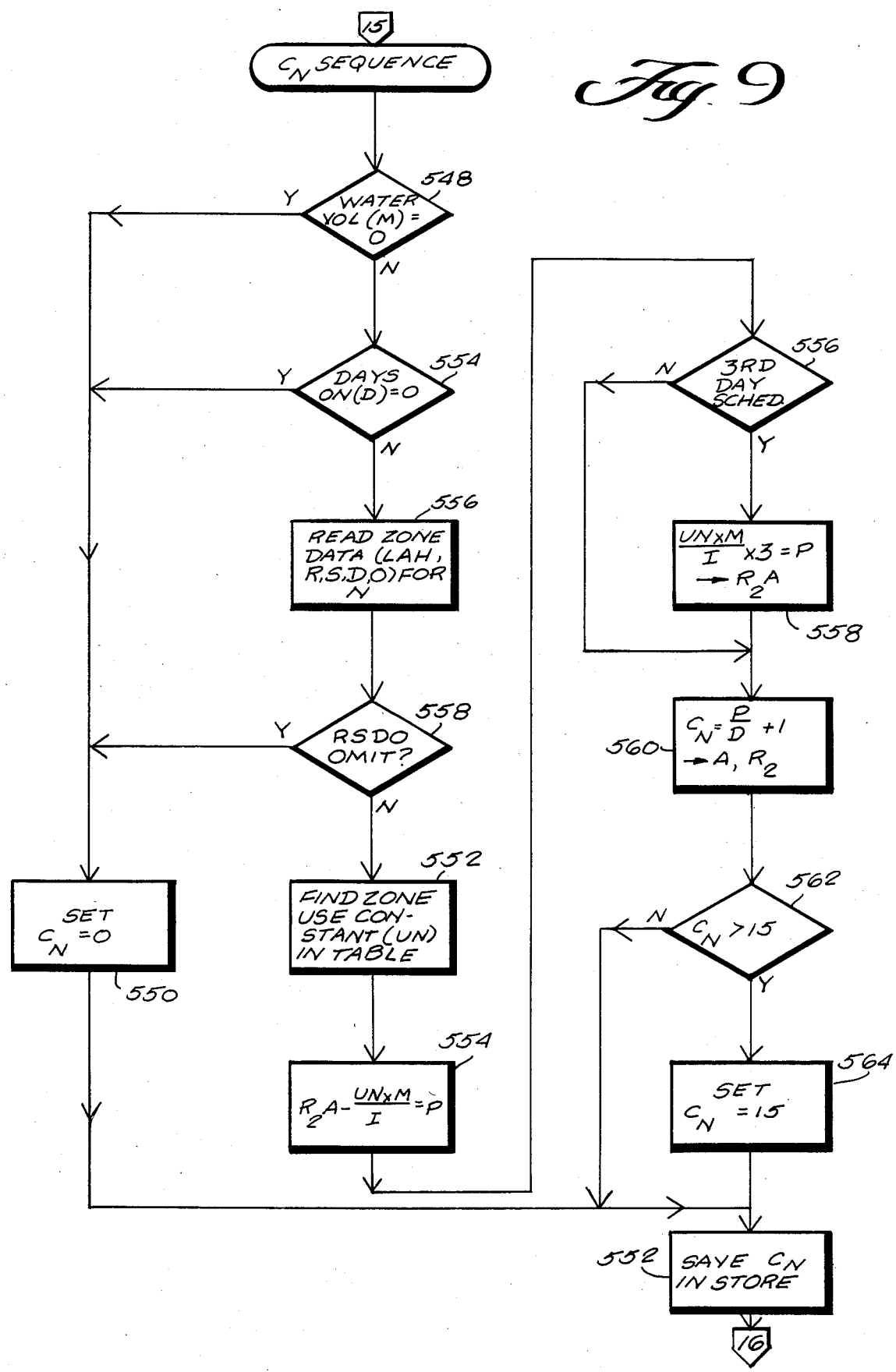
FIGURE 9 illustrates a flow diagram of the $C_N$ sequence subroutine of the present invention.
Figure 10:
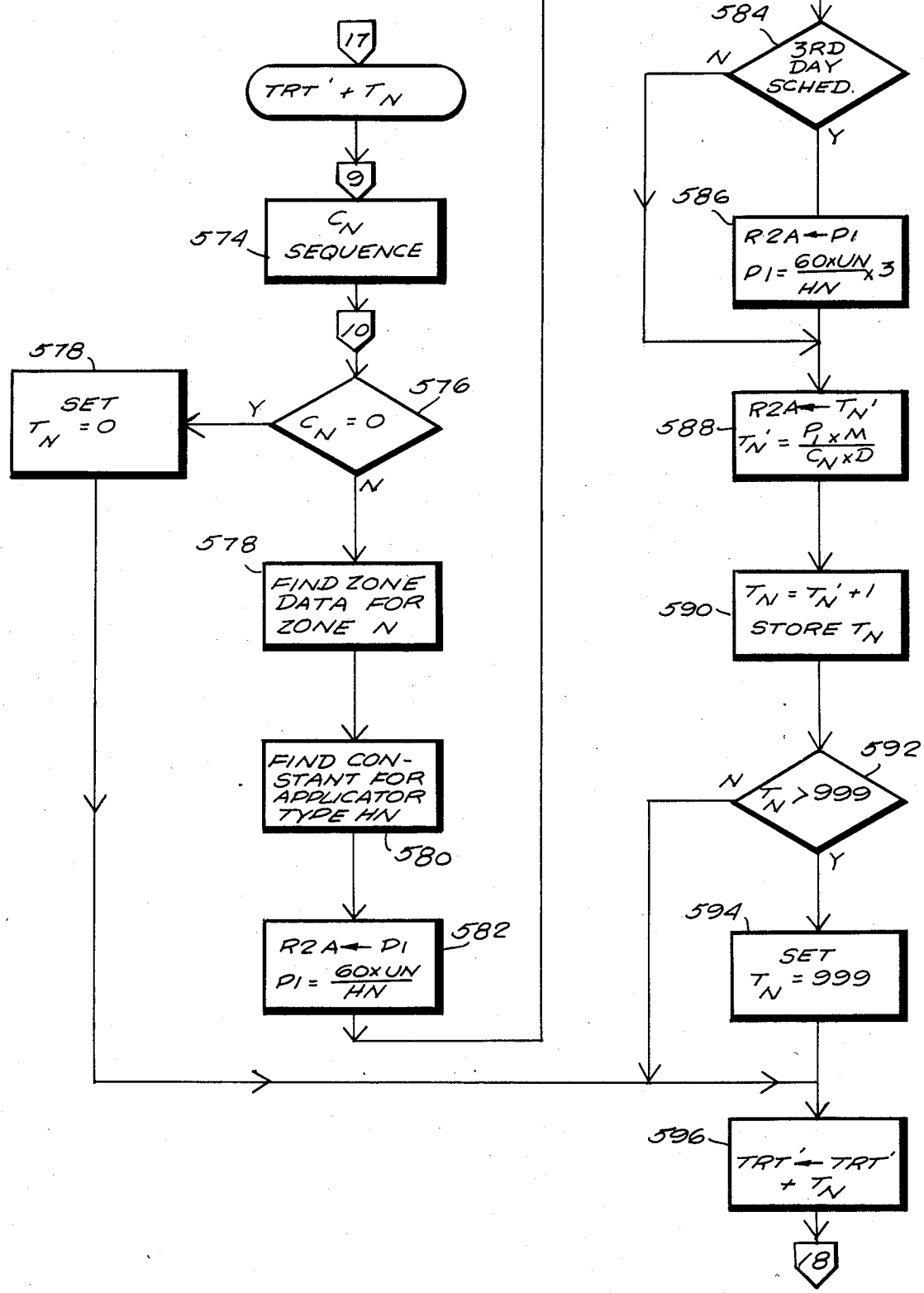
FIG. 10 illustrates a flow diagram of the $TRT' + T_N$ subroutine of the present invention.

This subroutine is illustrated in FIG. 9. At step 548, it is determined whether the water volume variable M is zero. This occurs when water volume switch 130 is in the OFF position. If the water volume variable is zero, then there will be no cycles for the application so that at step 550, the number of cycles for zone 1 is set to zero. This is saved at step 552 before processing returns to step 546 in FIG. 6B.

Typically, water volume switch 130 will be at some position other than OFF so that processing passes from step 548 to step 554 which considers the value of the constant D related to the position of day schedule switches 134 calculated in the DMISUB subroutine illustrated in FIG. 7. If all of day schedule switches 134 are off, then the calculated value of D is zero. In this instance, no cycles will exist for the application. Accordingly, the number of cycles per application is set to zero in step 550.

Next, data for the particular zone, in this case zone 1, is read with respect to the vegetation need (low, average or high) and applicator type (rotor, spray, drip or omit) at step 556. If the applicator type has been set to omit, then there should be no cycles for that zone in an application. Accordingly, processing proceeds from step 558 at which it is determined whether the applicator type is set to omit to 550 where the number of cycles per application for that zone is set to zero.

If the determination at step 558 is negative, then there will be at least one cycle for the zone under consideration. Accordingly, the constant relating to the selected vegetation need for that zone is obtained from ROM 192 at step 552. Then, at step 554 a portion of the equation for determining the number of cycles per application is performed by multiplying the vegetation use constant by the constant selected by water volume switch 130 and dividing that product by constant I related to the position of soil type switch 132. Next, if third day switch 138 is set as determined by step 556, the value determined in step 554 is multiplied by a factor of three in step 558. Then, at step 560, the remainder of the calculation necessary to determine the number of cycles per application for the appropriate zone is completed by dividing the result from step 554 or 558 by the constant D, related to the position of day schedule switches 134, and then adding one. It will be seen that the combination of calculations in steps 554 and 560 correspond to the equation for determining the number of cycles per application set forth above.

The reason why a factor of three must be included in step 558 when third day switch 138 is on may be realized by considering the DMISUB subroutine illustrated in FIG. 7. If second day schedule switch 136 is on as determined in step 366, then the constant D is divided by two at step 370 so that D assumes an appropriate value. However, if, at step 372, it is determined that third day switch 138 is on, no similar correction is made in the DMISUB subroutine. Instead, the value of D is corrected by a factor of a third in step 558.

After the number of cycles per application for zone 1 has been determined in step 560 in FIG. 9, step 562 determines whether the number of cycles is greater than 15. If the number of cycles is not greater than 15, this number is accepted and stored at step 552. If step 562 determines that the number of cycles calculated is over 15, then the number of cycles is set to 15 at step 564 and this value is saved at step 552. This ends the $C_N$ sequence subroutine for zone 1.

Figure 6B:
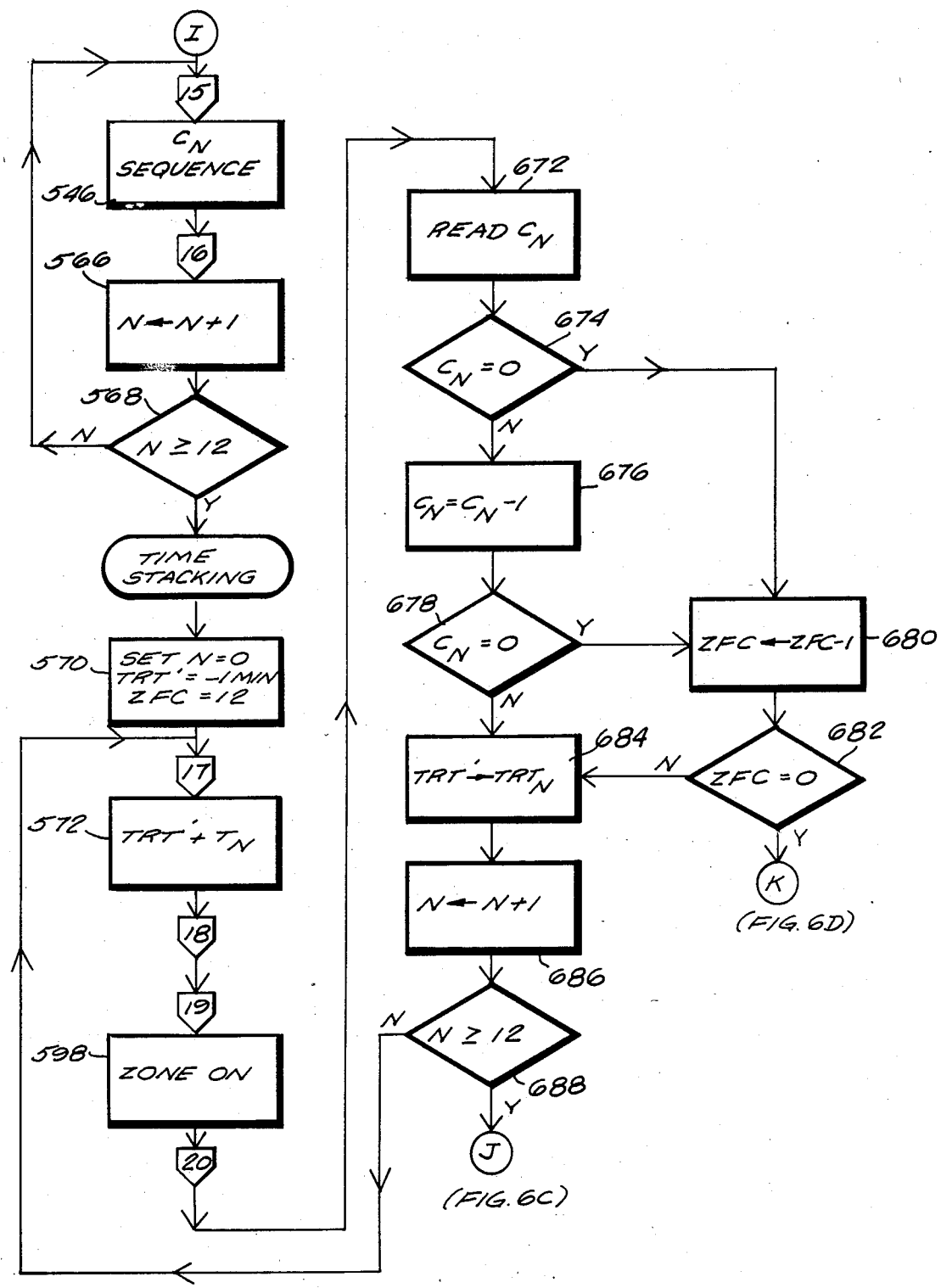

Processing then passes from step 546 in FIG. 6B to step 566 where the variable N, indicative of the zone being processed, is incremented by 1. At step 568 it is determined whether the number of cycles has been determined for all zones. If not, processing returns to step 546 so that the number of cycles for the next zone can be calculated.

Once the number of cycles per application for all of the zones has been determined, processing passes from 568 to 570 which begins the process of assembling cycles to form an entire application. At step 570, variables for this process are initialized. Thus, variable N, a number corresponding to a zone being processed, is set to zero to indicate zone 1. A variable TRT' is set to −1 minute for timing purposes. As will develop below, the variable TRT' represents the period extending from the beginning of the application to the time that the last cycle processed in any zone ends. A variable ZFC is set to 12. This variable represents the number of zones with cycles that have not yet been processed. When ZFC is decremented to zero, it means that processing for all of the zones has been completed.

At step 572, the TRT'+$T_N$ subroutine is executed. The subroutine determines the length of time that an applicator should be on in each cycle for a particular zone N and adds that time for the cycle being processed to the total running time determined to date, TRT', to generate a new value for TRT'.

This subroutine is illustrated in FIG. 9. Thus, at step 574, the $C_N$ sequence subroutine illustrated in FIG. 9 is performed to determine the number of cycles per application for each of the zones. Then, at step 576 it is determined whether the number of cycles per application for the zone being considered (presently N=0 so zone 1 is being processed) is zero. If so, it means that there are no cycles for that zone in the application so that at step 578, the cycle on time for that zone is set to zero.

If a cycle is to occur for that zone, control passes from step 576 to step 578 wherein all data for that zone (vegetation need and applicator type) are obtained. Then, at step 580, a constant related to the applicator type is determined. With this value and the other values already obtained, a calculation is made at step 582 that will be used to determine the on time per cycle for zone N. The constant UN, as indicated above, is related to the vegetation need in zone N.

As with the calculation of the number of cycles per application at steps 556 and 558 in FIG. 9, if third day switch 138 is on then the value determined in step 582 must be corrected by a factor of 3. This occurs at steps 584 and 586. Then, at steps 588 and 590, the on time per cycle for the zone under consideration is completed. It will be noted that the calculations performed by steps 582, 588 and 590 correspond to the on time per cycle calculation as set forth previously.

The calculated on time per cycle, in the preferred embodiment, cannot exceed 999 minutes. If this limit has been exceeded as determined by step 592, the on time per cycle is set to 999 minutes in step 594. Then, at step 596, TRT', representing the time period between the beginning of an application and the ending of the last cycle processed in any zone is updating by adding the newly determined value for $T_N$ for the zone under consideration to the previous value of TRT' in step 596.

Figure 6C:
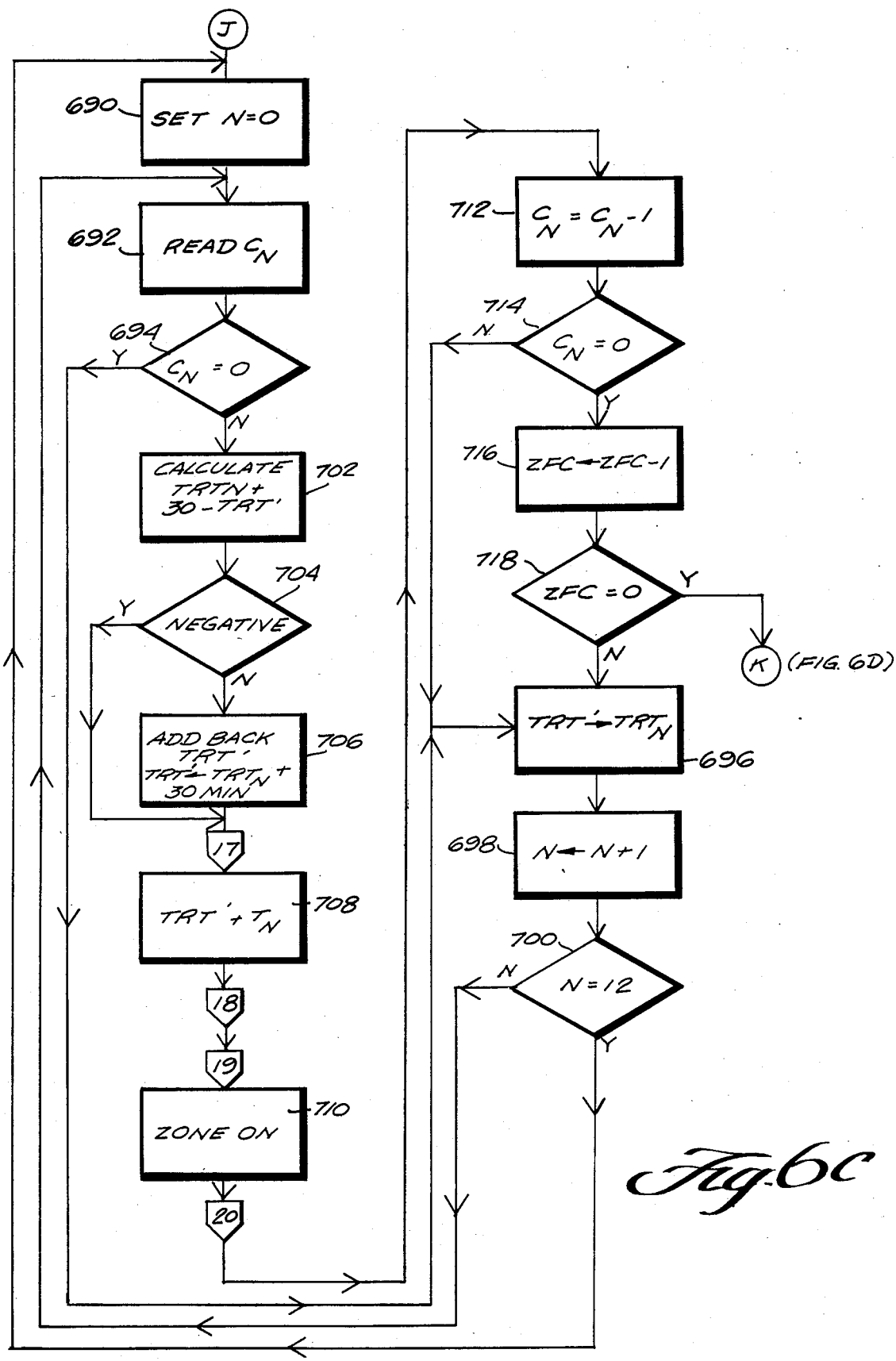
Figure 6D:
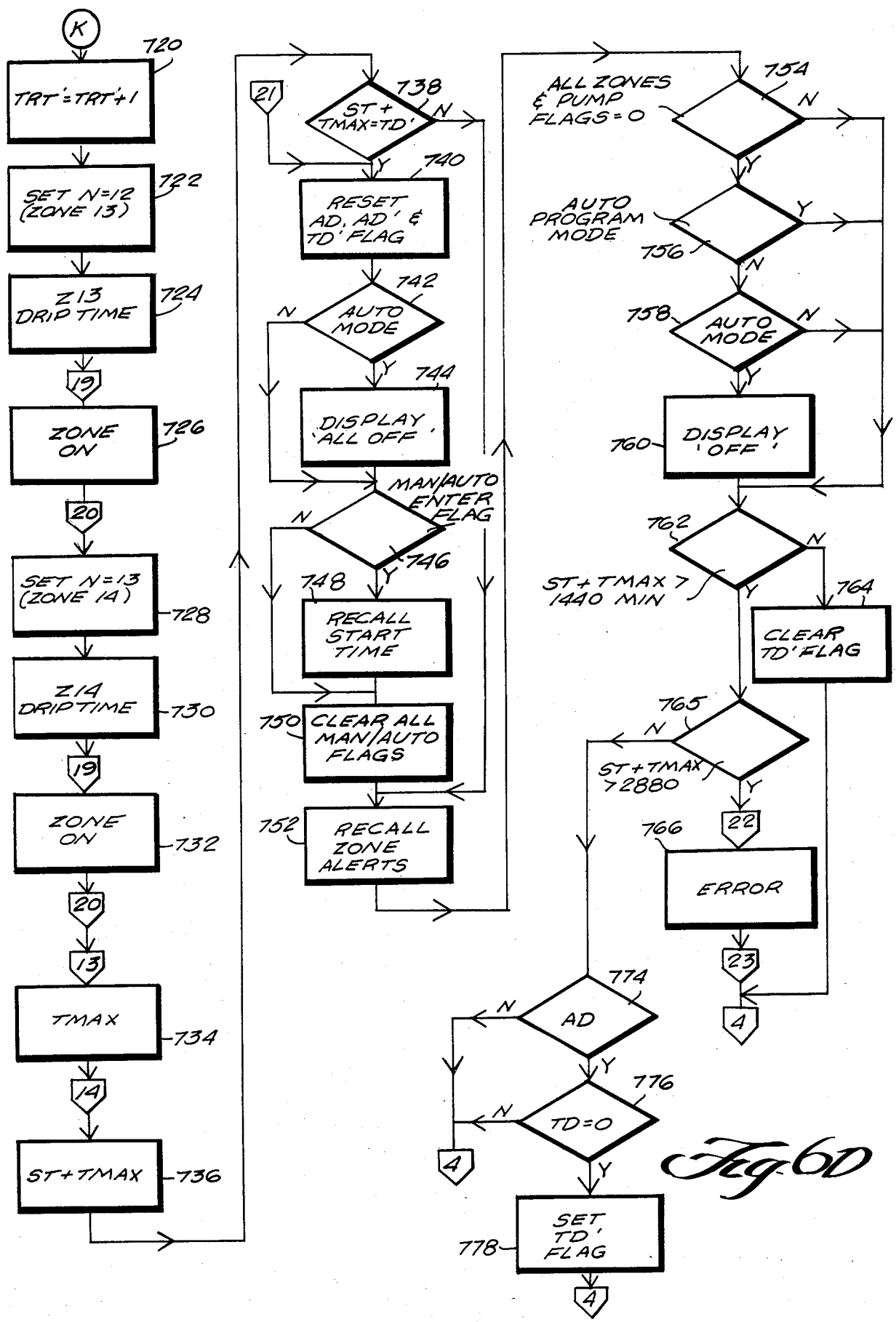
Figure 6E:
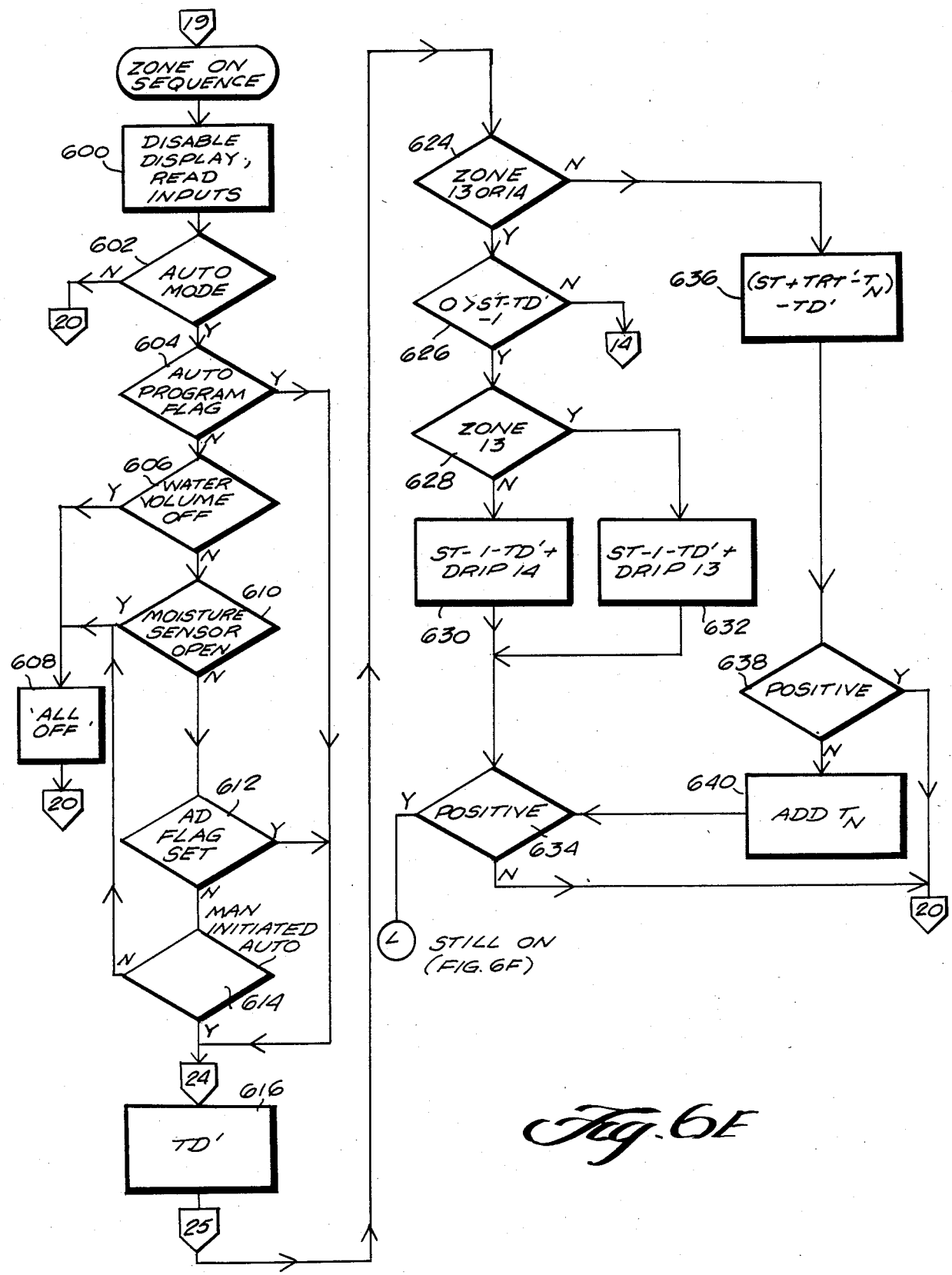

With the completion of the TRT'+$T_N$ subroutine, processing passes from step 572 in FIG. 6B to step 598 during which the zone on subroutine illustrated in FIG. 6E is performed. This subroutine determines whether the particular cycle of the particular zone whose time period has just been calculated is being executed or should presently be executed by turning on that particular zone.

Turning now to FIG. 6E, at step 600, the display is disabled. As described above, common hardware is employed to both update and read all of the inputs to the controller. Therefore, before any reading can occur, it is necessary to disable the display. Also in step 600, the inputs are read. At step 602, if function switch 128 is not in the automatic mode, no zones will be turned on automatically so that the subroutine ends. However, if function switch 128 is in the automatic position, it may be that a zone should automatically turned on so processing continues. Thus, at step 604, it is determined whether the controller is in the auto program mode. As explained above, it is possible to program the device while it is in the automatic mode by entering the sequence "9999 ENTER". If controller 64 is in the auto programming mode, microprocessor 164 will proceed to determine whether the present time of day does lie within the cycle just calculated.

If at step 604 it is determined that the controller is not in the auto programming mode, at step 606, microprocessor 164 determines whether water volume switch 130 is in the OFF position. If it is in the OFF position, then no zones are going to be turned on so "ALL OFF" is displayed in display 140 at step 608 and the subroutine ends.

If it was determined that water volume switch 130 is not off, then moisture sensor switch 66 is considered at step 610. If moisture sensor 66 is open, it means that the water content of the soil exceeds a threshold. Again, "ALL OFF" is displayed in display 140 at step 608 and the subroutine.

If the moisture sensor is closed, indicating that further water can be applied, it is next determined at step 612 whether the AD flag is set, indicating that an application is in progress. If the AD flag is set, processing continues to determine which zone should be turned on. If the AD flag is not set, a zone may still be turned on if an automatic application was manually initiated by depression of key 124 while in the automatic mode. Whether this has occurred is determined at step 614. If it has not occurred then no zone should be actuated so processing proceeds to step 608 before the subroutine ends.

Figure 11:
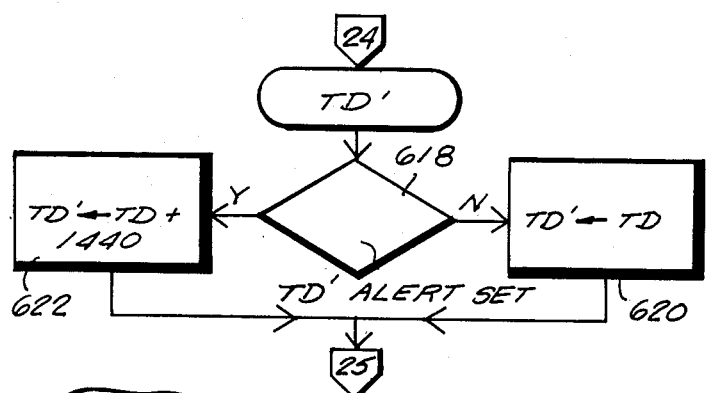
FIG. 11 illustrates a flow diagram of the TD' subroutine of the present invention.
Figure 12:
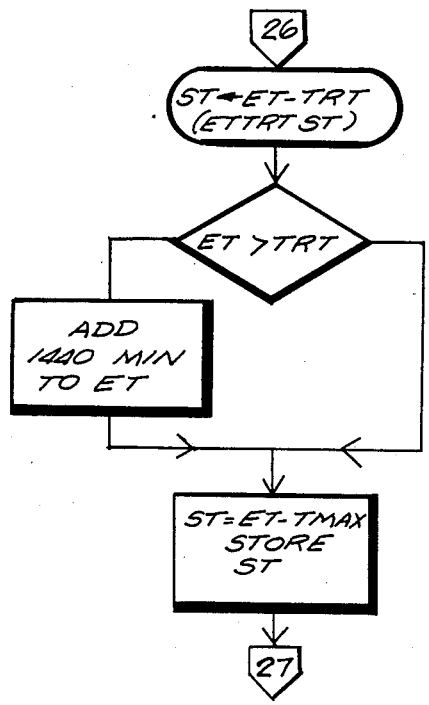
FIG. 12 illustrates a flow diagram of the start time subroutine of the present invention.

If any determination at step 604, 612 or 614 is positive, it means that a zone should be turned on. Processing continues to determine whether the cycle presently being processed should be executed. The TD' subroutine, illustrated in FIG. 11, is performed at step 616. This subroutine determines whether an application which began the previous day has run over into the present day. If it has run over, then, in effect, the day is extended beyond 24 hours so the time of day, in the form of TD', is increased by 24 hours to indicate the time from the begining of the previous day. Thus, in FIG. 11, step 618 determines whether the TD' flag has been set. This is set at step 384 in FIG. 4E when an application extends beyond midnight. If it has not been set, then the actual time of day is used as TD' in step 620. If the TD' flag has been set, then the sum of the present time of day and 1440 minutes is employed for TD'. There are 1440 minutes in a day. This ends the TD' subroutine.

Then, processing proceeds from step 616 in FIG. 6E to step 624 at which it is determined whether the variable N contains a number corresponding to zone 13 or 14. The first time through this subroutine, the determination will be negative. However, assuming that variable N does contain a number corresponding to zone 13 or 14, processing will pass to step 626 where the starting time less TD' less one is compared with zero. If this comparison is negative, it means that the present time of day has not yet reached the starting time so that the application has not yet begun. Since this zone would not be turned on, the subroutine ends. If the determination at step 626 is positive, it means that the starting time has already passed. At step 628, it is determined whether it is zone 13 or zone 14 which the variable N is indicating. At steps 630 and 632, a value is calculated related to the start time minus TD' minus one plus the length of time that either zone 13 or zone 14 is to run. If this value is positive, it indicates that zone 13 or zone 14 should be turned on or should still be on. If either of these values are negative, it means that the time for zones 13 and 14 to be on has expired, i.e., the time of day is after the end times for zones 13 and 14. The positive/negative determination is made at step 634. If the determination is negative, the subroutine ends since zones 13 and 14 should be off.

Consider now the case where the variable N is a value not related zones 13 or 14. Accordingly, the determination at step 624 will be negative. At step 636, a value is generated related to the start time plus TRT' minus TN minus TD'. Recall that TRT' relates to the time period between the beginning of an application, i.e., the start time, and the time of the last cycle processed in any zone. Thus, the sum of the start time and TRT' represents the actual time that the last processed cycle in any zone will turn off. When the on time for that cycle is subtracted, the remainder represents the actual time that the last process cycle began. From this time is subtracted TD' related to the time of day. If the result is positive, the time at which that cycle is to begin is after the present time, thus that zone is not yet ready to be turned on for that cycle so the subroutine ends. If microprocessor 164 determines at step 638 that the calculation in step 636 is negative, it means that that cycle should have started before the present time. Accordingly, that cycle may still be on. At step 640, the on time for that cycle is added to the value calculated in step 636 so that the present time of day is compared with the off time for that cycle. If the result is positive as determined at step 634, that cycle is still being executed. However, if the result is negative, it means that the cycle has already been completed so that the subroutine ends.

Figure 6F:
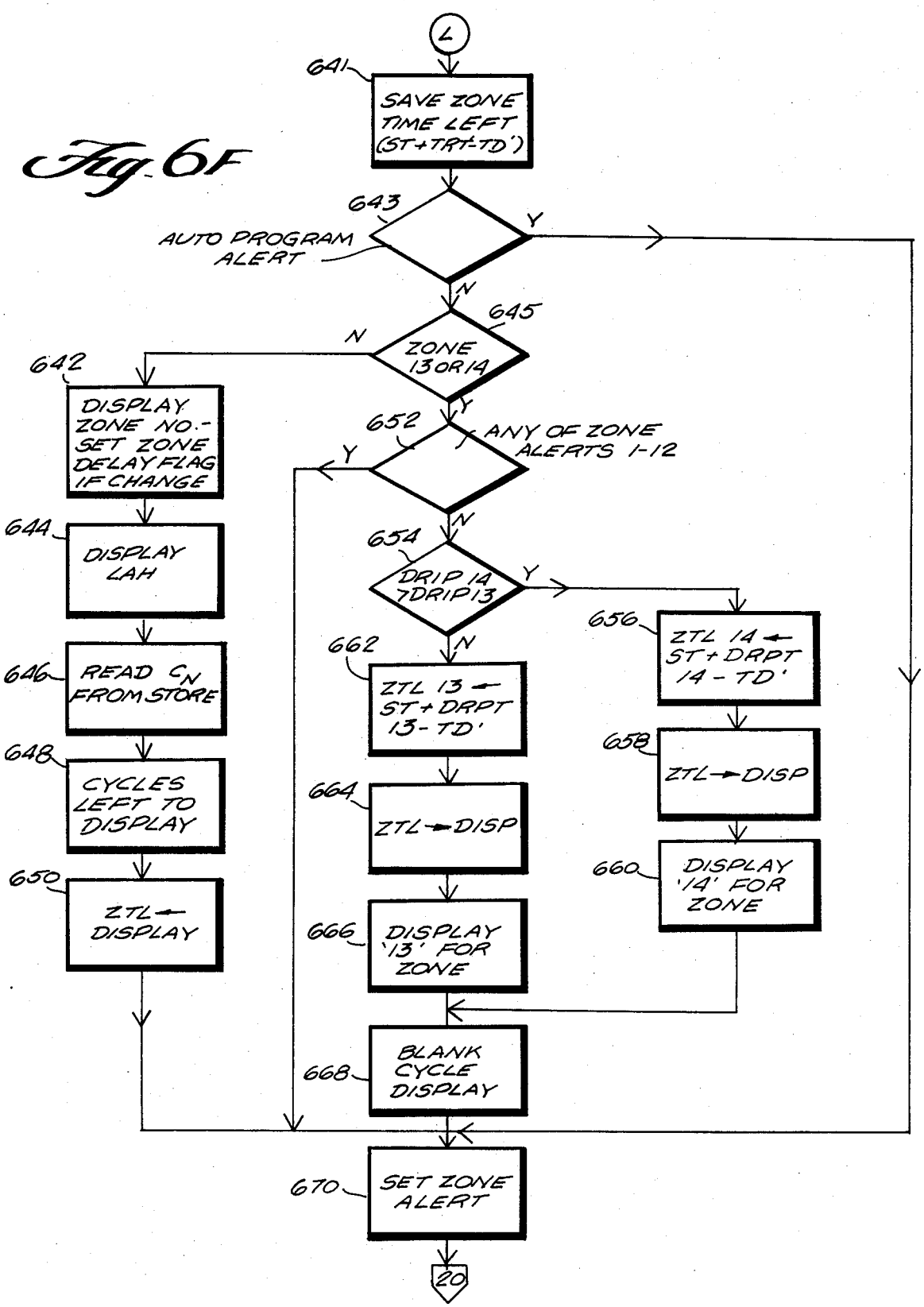

If the cycle is still in progress, step 641 in FIG. 6F saves the time left in that cycle (start time plus TRT' minus TD'). At step 643, it is determined whether the auto programming mode has been entered. If not, processing passes to step 645 in which it is determined whether the value of N corresponds to either zone 13 or zone 14. If not, then N corresponds to one of zones 1 through 12. At step 642, this zone number is displayed in the zone portion of display 140. At the same time, if the displayed zone number has just changed, it means that a new zone has just been turned on. Accordingly, the zone delay flag, referred to with respect to steps 408 and 410 in FIG. 5A is set. The zone delay flag is set for four seconds after a zone is indicated to be turned on. During this time, the pump is turned on and is permitted to build up pressure in the pipes.

At step 644, the vegetation need (low, average or high) and the applicator type (rotor, spray, drip or omit) are displayed on appropriate portions of display 140.

Then, at step 646, the number of cycles per application for that particular zone is obtained. As will be described below, the number of cycles per application is decremented as processing progresses to indicate the number of cycles yet to be processed, corresponding to the number of cycles yet to be turned on. Accordingly, from this value of the number of cycles, step 648 causes the number of cycles left to be displayed in an appropriate portion of display 140. At step 650, the zone time left is displayed corresponding to the determination in step 636.

If it is determined at step 645 that the value of N corresponds to either zone 13 or zone 14, processing proceeds to step 652 at which it is determined whether any alerts for zones 1 through 12 are set. If no alerts are set, none of zones 1-12 will be turned on. All that remains for this portion of the program is to display data if zone 13 or zone 14 is turned on. However, as described, if any of zones 1 through 12 are on, no data is displayed with respect to zones 13 and 14. Accordingly, only if no zone alerts are set for zones 1 through 12 does processing proceed to step 654 where the run time for zone 14 is compared with the run time for zone 13. It will be recalled that data concerning only the longer run time will be displayed. Accordingly, if the run time for zone 14 is longer, step 656 through step 660 are performed. If the run time for zone 13 is longer than the run time for zone 14, steps 626 through 666 are performed. These steps calculate the length of time left for the appropriate zone to run, display the zone time left and also display the zone to which the time corresponds. Then, at step 668, the cycles left portion of display 140 is blanked.

If the determination at step 643 or step 652 is positive or after steps 650 and 668, processing proceeds to step 670 at which zone alerts are set for those zones which should be on. This ends the zone on subroutine.

Upon completion of the zone on subroutine at step 598 in FIG. 6B, the number of cycles per application for the zone being processed is read at step 672 and it is determined at 674 whether the number of cycles is zero. This value will be zero at this step only if it was initially determined that no cycle should occur for this particular zone.

If at least one cycle is to be carried out for that zone, the determination at step 674 will be negative. Since one cycle for that zone has now been processed, at step 676, the cycle number count is decremented so that the cycle number count corresponds to the number of cycles yet to be processed for that particular zone. At step 678, it is determined whether the decremented cycle number count for that zone is equal to zero. If it is, it means that the last cycle for that zone has been processed. Accordingly, ZFC, representing the number of zones with cycles yet to processed is decremented by one at step 680 and this value is compared with zero at step 682. If ZFC equals zero, it means that none of the zones have any cycles left, indicating that the processing is over.

However, if a particular zone has at least one more cycle left as determined by step 678 or there is at least one other zone with a cycle left to be processed as determined at step 682, processing proceeds to step 684 at which the value of TRT' is employed for the value of $TRT_N$. Recall that TRT' represents the period between the start of the cycle and the off time for the last cycle processed in any zone. $TRT_N$ represents the period between the start of an application and the off time of the last cycle to be processed in zone N. Since the same zone N is still being processed, the value of TRT' updated in the subroutine at step 572 also represents the length of time between the start of the application and the off time of the last processed cycle in zone N.

At step 686, N is incremented and at step 688 it is determined whether N has been incremented to 12. If it has, one cycle for each of zones 1 through 12 has been processed. If N has not been incremented to 12, then processing returns to step 572 so that one cycle for the remaining zones may be processed.

When the determination at step 688 becomes positive, processing passes to the steps illustrated in FIG. 6C. Essentially, the steps in this figure perform processing for the remaining cycles of the zones. An additional complication is introduced in that at least 30 minutes must pass between the off time in the previous cycle in each zone and the on time in the next cycle in that zone. The steps of FIG. 5C perform this spacing.

At step 690, N is set to zero so that processing begins with zone 1. Then, at 692, the number of cycles per application for zone 1 is read. Note that $C_1$ actually represents the number of cycles for zone 1 yet to be processed since at step 676 in FIG. 6B, the cycle number was decremented by one after the first cycle was processed. At step 694, the cycle number is compared with zero. If the cycle number is zero, the variable N represents a zone with no remaining cycles to be processed. A positive determination at step 694 causes processing to pass through step 696, at which $TRT_N$ is updated with the latest value of TRT', to step 698 at which N is incremented. At step 700, it is determined whether N equals 12. If not, the second cycles of more zones need to be processed so microprocessor 164 returns to step 692. If, at step 700, N does equal 12, the second cycles of all of the zones have been processed so that microprocessor 164 returns to step 690 to begin processing the third cycle for each of the zones in sequence.

If a cycle remains to be processed for a given zone, the determination at step 694 will be negative. At steps 702 and 704, $TRT_N$ augmented by 30 minutes is compared to TRT'. Recall that $TRT_N$ represents the period of time between the beginning of an application and the off time of the last processed cycle in zone N. By adding 30 minutes to this, a time is defined from the start time representing the earliest that the next cycle for zone N may begin. TRT' represents the time period from the start time that the last processed cycle in any of the zones turned off. Thus, if $TRT_N$ plus 30 minutes is greater than TRT', a dead period will have to exist for the interim until the full 30 minutes has passed. Thus, the value considered at step 704 will be negative so that the new TRT' is defined to be the off time of the previous cycle in zone N ($TRT_N$) plus 30 minutes (see step 706).

At step 708, TRT' is updated by the actual time that the cycle presently being processed will run. This is accomplished by the TRT'+$T_N$ subroutine illustrated in FIG. 10. Once TRT' is updated at step 708, microprocessor 164 next determines whether the cycle just processed should be in progress at step 710. This is accomplished by the zone on subroutine illustrated in FIGS. 6E and 6F.

At step 712, the number of cycles for the zone being processed is decremented by one since one more cycle in that zone has now been processed. At step 714, it is again determined whether the decremented $C_N$ is equal to zero. Thus, steps 714, 716, 718, 696, 698 and 700 are identical to steps 678 through 688 described with respect to FIG. 6B.

Processing will continue with the steps illustrated in FIG. 6C until all of the cycles for each of the zones has been processed. After the last cycle has been processed, as determined by either step 682 in FIG. 6B or 718 in FIG. 6C, processing proceeds to step 720 in FIG. 6D. There, TRT' is incremented for one to compensate for the fact that TRT' was inititally set to −1 minute in step 570 in FIG. 6B. The next portion of the program determines whether drip zones 13 and/or 14 should be on. Thus, in step 722, N is set to 12 to indicate zone 13. Then, the run time for zone 13 is retrieved at step 724. At step 726, the zone on subroutine illustrated in FIGS. 6E and 6F is performed to determine whether zone 13 should be on. Thus, at this stage, the determination at step 624 in FIG. 6E will be positive, as will the determination at step 628. If zone 13 should be on, a zone alert for zone 13 will be generated in the zone on subroutine.

Zone 14 is similarly processed in steps 728 through 732.

The next portion of the TRT calculate subroutine determines whether an application has ended. Accordingly, at step 734, the TMAX subroutine illustrated in FIG. 13 is performed. It should be recalled that the value TMAX represents the length of time of the application. At step 736, TMAX is added to the start time to produce the time at which the application is to end.

If this application end time is the same as TD', the time of day modified to take into consideration applications which started the previous day, then the application is over. Accordingly, at step 740, the AD flag, AD' flag and TD' flag are reset. At step 742, microprocessor 164 determines whether function switch 128 is in the automatic position. If so, "ALL OFF" is generated on display 140 at step 744. At step 746, it is determined whether the manual/automatic enter flag has been set. This flag is set when an automatic cycle has been manually actuated. When manual ON/OFF switch 124 is depressed while the controller is in automatic mode to manually start an automatic application, the entered start time is stored and a start time register is loaded with the actual time of day. Since the application has ended, step 748 loads the entered start time back in the start time register. Then, at step 750, all auto/manual flags are cleared.

Then, whether or not the end of the application has been reached, all zone alerts are recalled at step 752. At step 754 it is determined whether all of the zone flags and the pump flag are cleared. If they are not cleared, then an application is in progress. If all of the flags have been cleared, an application is not in progress and microprocessor 164 next determines at step 756 whether the controller is in the autoprogram mode in which the controller can be programmed while in the automatic mode. If the controller is not in the automatic program mode, it is next determined whether the controller is in the automatic mode at step 758. If it is, "OFF" is generated on display 140 at step 760. If the determination at step 754 or step 758 was negative or the determination at step 756 was positive, the display is not changed.

At step 762 it is determined whether the application extends beyond the day it was started. If it does not extend beyond the day it was started, the TD' flag is cleared at step 764 and the TRT calculate subroutine ends. If it was determined at step 762 that the application extends beyond the day it started, it is determined at step 765 whether the application extends beyond the day after the day it was started. As explained previously, this is not permitted. Accordingly, if the determination at step 765 is positive, the error routine illustrated in FIG. 13, is performed at step 766.

Figure 14:
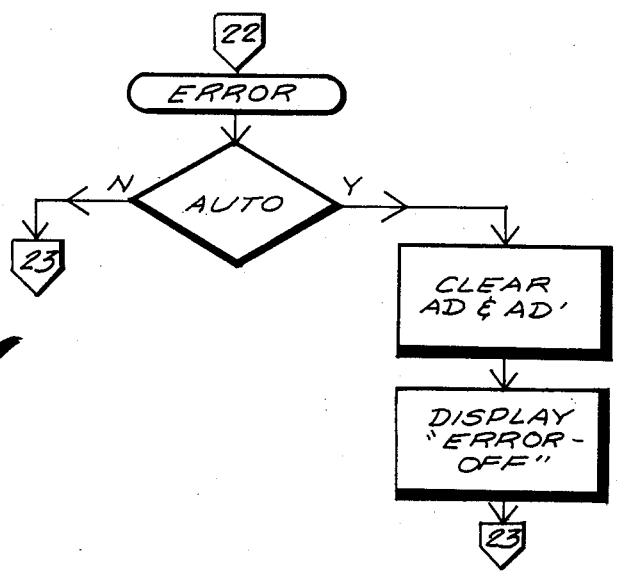
FIG. 14 illustrates a flow diagram of the ERROR subroutine of the present invention.

Turning to FIG. 14, step 768 determines whether the controller is in the automatic mode. Since exceeding the application time limit is a concern only in the automatic mode, a negative determination at step 768 ends the subroutine. If controller 64 is in the automatic mode, the AD and AD' flags are cleared at step 770 and "ERROR-OFF" is displayed on display 140 at step 772 before the subroutine ends. The end of the error subroutine also represents the end of the TRT calculate subroutine.

If step 762 determines that the application extends beyond the day in which it started, but step 765 determines that the application does not extend beyond the day after the day the application was started, step 774 determines whether an application is in progress by checking the AD flag. If an application is not in progress, the TRT calculate subroutine ends. If an application is in progress, step 776 determines whether the time of day is zero, indicating that it is midnight. If it is midnight, the TD' flag is set indicating that an application is in progress the day after it was started. With that the TRT calculate subroutine ends.

7. Key Execution Subroutine

The last subroutine to be described is the key execution subroutine called up at step 304 in FIG. 4A and illustrated in FIGS. 8A through 8L. This subroutine processes key entries to set appropriate flags, display appropriate values and perform other functions. The extent of this subroutine results from the fact that the actions taken in response to the detection of a key depression depends to a large degree upon keys depressed before that key. Thus, a certain portion of this subroutine deals with the manner in which unacceptable key combinations are handled.

Although this subroutine is extensive, it is believed easy to understand from FIGS. 8A through 8L if followed in a systematic manner. Therefore, instead of describing each possible sequence of keys dealt with in this subroutine, a description will now be provided of the steps executed when the example set forth in the beginning of this detailed description is entered. Based on this description and the detail of FIGS. 8A through 8L, those skilled in the art would readily be able to create a program to perform all of the steps illustrated in the flow chart for the key execution subroutine.

As illustrated in FIG. 4B, the key execution subroutine is performed only when it is detected that a key has been depressed. Thus, in FIG. 8A, upon detection of a depressed key step 780 sets the blink flag to cause the display to blink to acknowledge depression of the key. Then, at step 782 it is determined whether the depressed key represents a digit or a non-digit.

In the previously described example, the first task was to set today's day. The first key pressed was day key 108. Accordingly, the determination at step 782 is positive. At step 784, on FIG. 8D, microprocessor 164 determines whether enter key 126 has been depressed. This determination will be negative so that processing continues to step 786 at which the automatic program counter is set to 4. With steps 788 and 790 in FIG. 8D, steps 792 and 794 in FIG. 8E and step 796 in FIG. 8F, microprocessor 164 will determine whether end key 116, applicator type key 118, vegetation use key 120, man on/off key 124 and am/pm key 122 have been depressed, respectively. Since all of these determinations will be negative, control will proceed to step 798 in FIG. 8F at which it will be determined that day key 108 has been depressed.

Depression of day key 108 has an effect only in the programming mode. Accordingly, step 800 determines whether function switch 128 is in the programming position. If it is not, the key execution subroutine ends. If switch 128 is in the programming mode, microprocessor 164 next determines at step 802 whether a starting time alert has been set. This occurs when start times key 114 has been previously depressed. In the present example, it has not been depressed so all key 102 alerts are cleared in step 804, a day alert is set at step 806 and the present day count is moved to display 142 in step 808 so that the presently indicated day is displayed. This ends the execution subroutine.

Figure 8A:
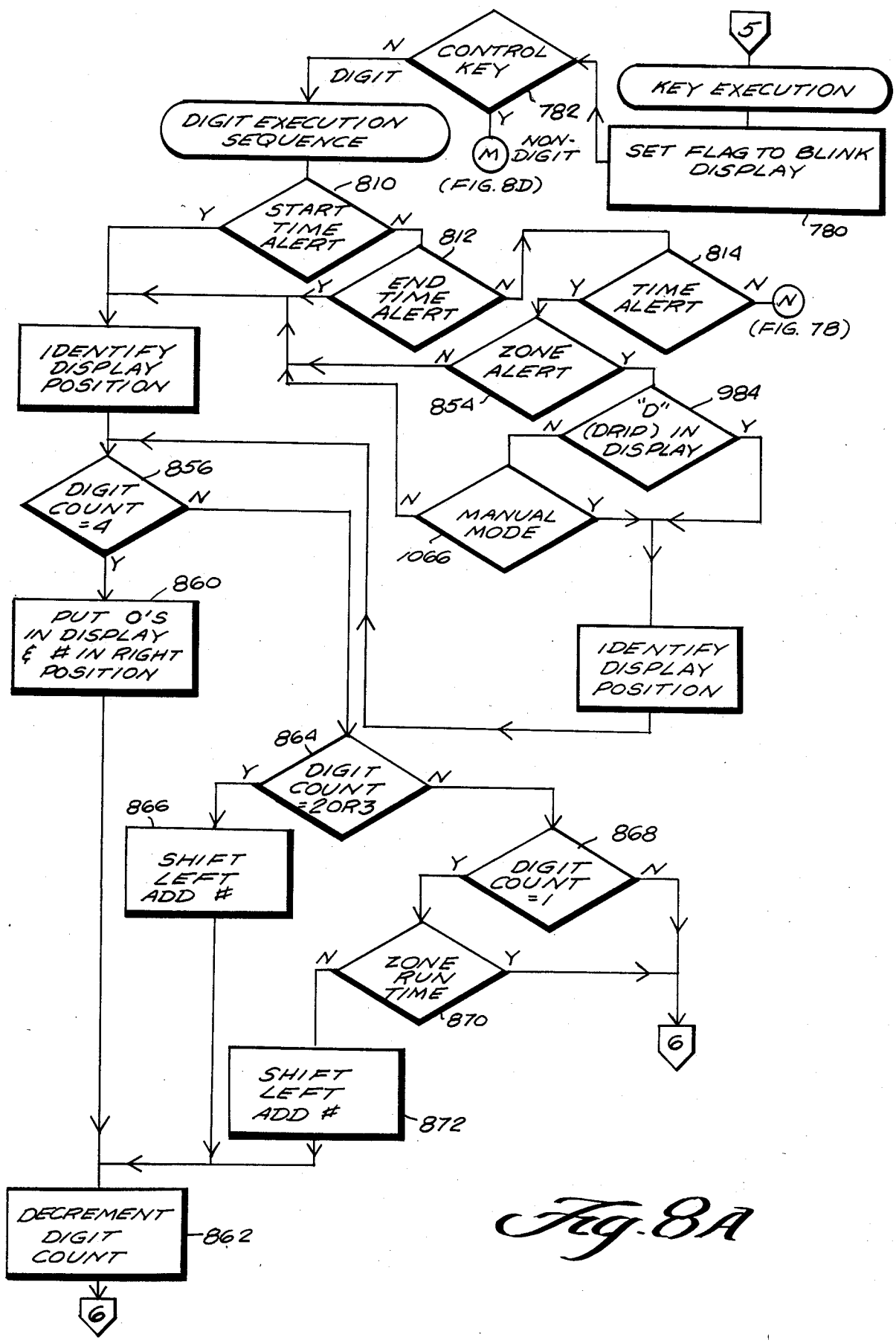
Figure 8B:
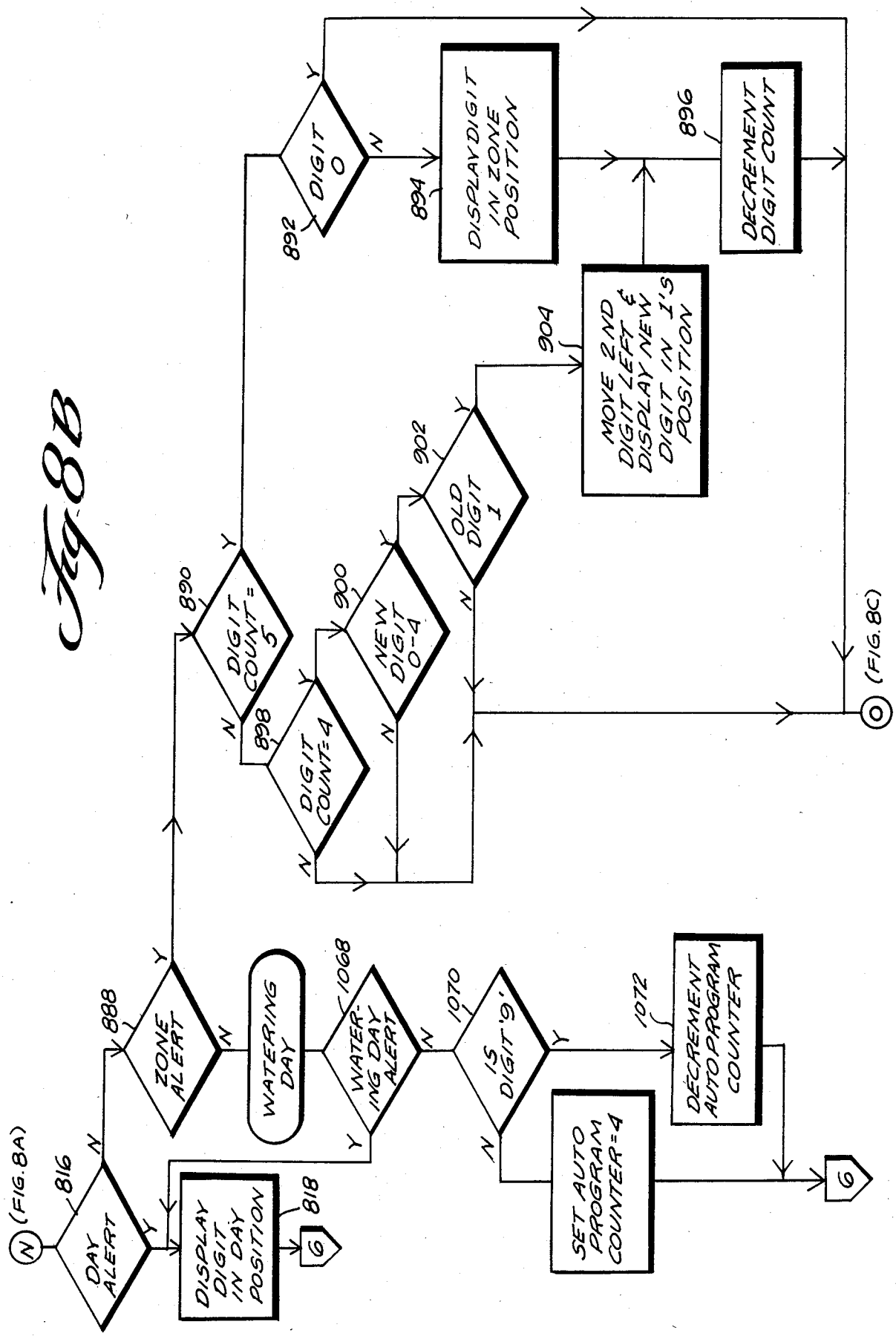

The next key depressed is the Thursday/4 key to enter that the present day is Thursday. When this occurs, the determination at step 782 in FIG. 8A is negative since the Thursday/4 key is digit. Then, in steps 810, 812 and 814, microprocessor 164 determines whether the start time alert, end time alert or time alert has been set. Since start time key 114, end time key 116 and time key 110 have not been previously depressed, these determinations will all be negative so that all processing proceeds to step 816 on FIG. 8B. Since day switch 108 has been depressed, and a day alert generated in step 806 of FIG. 8F, the determination at step 816 is positive so that step 818 displays the entered digit in the day position of display 142 before the key execution subroutine ends.

Next, the enter key is depressed to enter the day. Thus, the determinations in steps 782 and 784 in FIGS. 8A and 8D, respectively, are positive so that processing proceeds to step 820 in FIG. 8I. At step 820, it is determined whether all key 102 alerts are cleared. Since a day alert has been set, this determination is negative. At step 822 in FIG. 8J, microprocessor 164 determines that function switch 128 is in the program mode so that processing proceeds to steps 824 and 826 in FIG. 8J and then steps 828 and 830 in FIG. 8K. These steps determine that start time, end time and time alerts have not been set, but a day alert has been set. Accordingly, at step 832, the day indication appearing in display 142 is stored and the week count is cleared. Thus, whenever new day information is stored, the week count is reset to zero.

After step 832, step 834 is executed in FIG. 8I which causes processing to be suspended for a predetermined enter delay. Once this enter delay has been finished, the automatic program alert is cleared at step 836, all key 102 alerts are cleared and the auto program counter is reset to 4 at step 838 and the blink flag and drip change alert are cleared at step 840 before the key execution ends.

Next, the present time of day was entered in the example. This process began with depression of time key 110. When time key 110 is depressed, the decision at step 782 in FIG. 8A is positive. However, the decisions at steps 784, 788 and 790 (FIG. 8D), 792 and 794 (FIG. 8E), and 796 and 798 (FIG. 8F) are negative so that processing proceeds to step 842 in FIG. 8G. At step 842, it is determined that the time key has been depressed so that at step 844, all key 102 alerts except the zone alert are cleared and the time alert is set. Step 846 questions whether a zone alert has been set indicating that zone key 112 has been depressed. In this case, no zone should be on. Accordingly, the determination is negative so that control passes to step 848 in which the present time of day presently stored is displayed. At step 850, the digit count is set to 4 indicating that as many as four digits may be entered next to represent the time. Finally, at step 852, the presently entered day is displayed before the key execution subroutine ends.

The next procedure involved in entering the present time is to press the "1045" keys in sequence. With each depression, the decision as to whether or not a control key has been pressed at step 782 in FIG. 8A is negative so that processing proceeds to step 810 and 812. Since neither the start time nor end time alerts have been set, these decisions are negative so that processing continues to step 814 at which it is determined that a time alert has been set. Accordingly, step 854 determines whether a zone alert has also been set, indicating that zone key 112 has been depressed. This determination will be negative so that processing will continue to the next portion of the program in which the display position is identified. Thus, at step 856, it is determined whether the digit count is 4. The digit count was set to 4 in step 850 in FIG. 8G after depression of time key 110. Accordingly, this determination will be positive so that zeros are placed in the display and the first entered number is placed in the right position at step 860. Since a digit has been placed in the display, the digit count is decremented at step 862 before the key execution subroutine ends. With the second number to be entered, the determination at step 856 will be negative so that processing proceeds to step 864. Since the digit count was decremented to three in step 862, the decision at step 864 will be positive so that the new digit is added to on the right of the display after the display is shifted at step 866. The digit count is then decremented to 2 at step 862 before the key execution subroutine ends. The same procedure occurs with respect to the third digit, causing the digit count to be decremented to one at step 862.

With the fourth digit to be entered, the decisions at both step 856 and 864 will be negative so that processing proceeds to step 868. Since the digit count is equal to one, the decision will be positive so that processing proceeds to step 870. As mentioned above, two types of time may be entered. One type, time of day data, may include four digits. However, zone run times, can only be three digits. If the digit count is one, it means that a fourth digit has just been entered. Accordingly, if a zone run time is being entered, the decision at step 870 is positive so that the key execution subrountine ends without the entry or display of the most recently depressed digit key. However, in the present example, a zone run time is not being entered so that the decision at step 870 is negative. At step 872 the display is shifted to the left and the new digit is added and the digit count is decremented to zero at step 862. If any further digit keys are depressed, then the determinations at steps 856, 864 and 868 will be negative, ending the key execution subroutine without entry or display of any additional digits.

After the four time digits have been entered, am/pm key 122 may be depressed to change the displayed designation. Upon depression of this key, the decision at step 782 of FIG. 8A is positive. However, decisions at steps 784, 788 and 790 (FIG. 8D) and 792 and 794 (FIG. 8E) are negative so that processing proceeds to step 796 in FIG. 8F. There, microprocessor 164 determines that the am/pm key has been depressed. Accordingly, step 874 determines whether the digit count is zero or one, indicating that either three or four digits have already been entered. If less than three or four digits have been entered, it is premature to change the am/pm designation so that the key execution sequence ends without processing the depression of am/pm key 122. In the present example, the digit count is zero so that the decision at step 874 is positive. At step 876, it is determined whether an "A" is being displayed on display 142. If an "A" is being displayed, then the display is changed to "P" at step 882. If the determination at step 876 is negative, then the display is changed to "A" at step 880. Steps 880 and 882 end the key execution subroutine.

To enter the time data, it is necessary to press enter key 126. Upon depression of this key, the decision at step 782 in FIG. 7A is positive, as is the determination at step 784 in FIG. 8D. Accordingly, processing proceeds to step 820 in FIG. 8I which questions whether all key 102 alerts are cleared. Depression of time key 110 established a time alert at step 844 of FIG. 8G so this determination will be negative. Controller 64 is in the program mode so that the decision at step 822 in FIG. 8J is positive. However, since neither the time start alert nor the end time alert have been set, processing proceeds from steps 824 and 826 to step 828 in FIG. 8K which recognizes that a time alert has been set. Accordingly, processing passes to step 874 in FIG. 8L at which it is determined whether a zone alert has been set. Since the zone alert is set upon depression of zone key 112 which has not been depressed, the decision at step 874 is negative so that the time of day data is entered in the appropriate time of day counter at step 876. Processing then passes to step 834 in FIG. 8I which causes a predetermined delay to occur in the program. After that delay, the auto program alert is cleared in step 836, all key 102 alerts are cleared in step 838 and the blink flag and drip change alerts are cleared in step 840 before the key execution subroutine ends.

Next, in the example, zone data is entered. This is initiated by depressing zone key 112. Upon depression of this key, the determination at step 782 in FIG. 8A is positive, however the determinations at steps 784, 788 and 790 (FIG. 8D), 792 and 794 (FIG. 8E), 796 and 798 (FIG. 8F) and 842 (FIG. 8G) are negative so that processing proceeds to step 878 in FIG. 8G. At this step, microprocessor 164 determines that zone key 112 has been depressed. Accordingly, at step 880, all key 102 alerts are cleared and the zone alert is set. At step 882, the digit count is set to 5, allowing entry of two zone digits and three additional digits which may be employed if the controller is in the manual mode and the zone time left is being entered. However, in the present example, the controller is in the program mode so that the decision at step 884 is positive. As a result, step 886 displays "off" in display 140.

Next, the actual zone number is entered employing digit keys 104. Upon depression of each digit key, the decision at step 782 in FIG. 8A is negative, as are decisions at steps 810, 812 and 814 of FIG. 8A and step 816 of FIG. 8B. Thus, processing proceeds to step 888 at which it is determined that a zone alert has been set. Accordingly, at step 890, it is determined that the digit count is 5 as set in step 882 in FIG. 8G. Then, step 892 determines whether the depressed digit is zero. Since the digit count is 5, it means that the digit just entered is the first digit. If the digit is zero, then it can be ignored since most significant zero is not needed. If step 892 determines that the entered digit is not zero, then that digit is displayed in the zone position of display 140 at step 894 and the digit count is decremented at step 896.

Figure 8C:
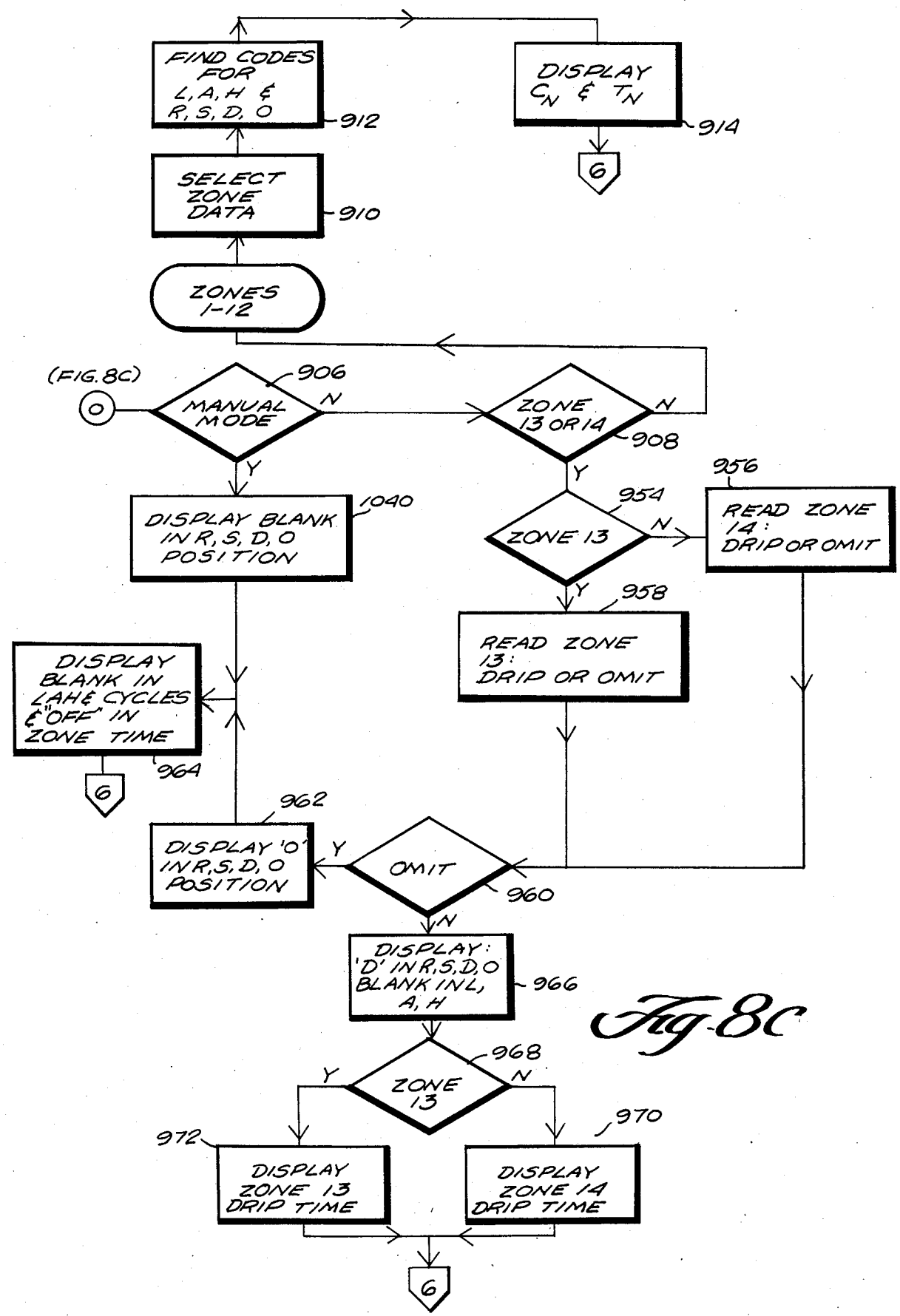
Figure 8J:
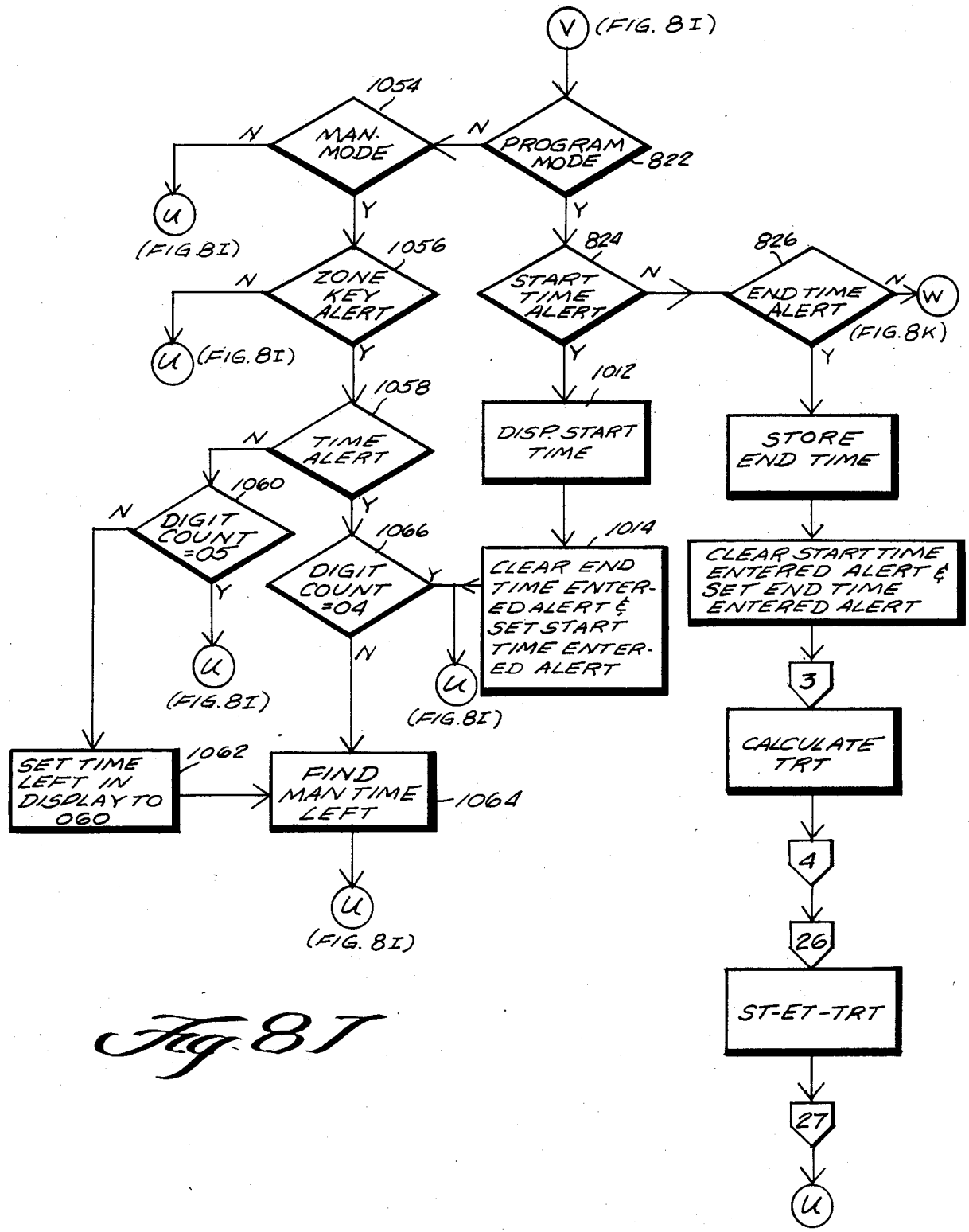
Figure 8K:
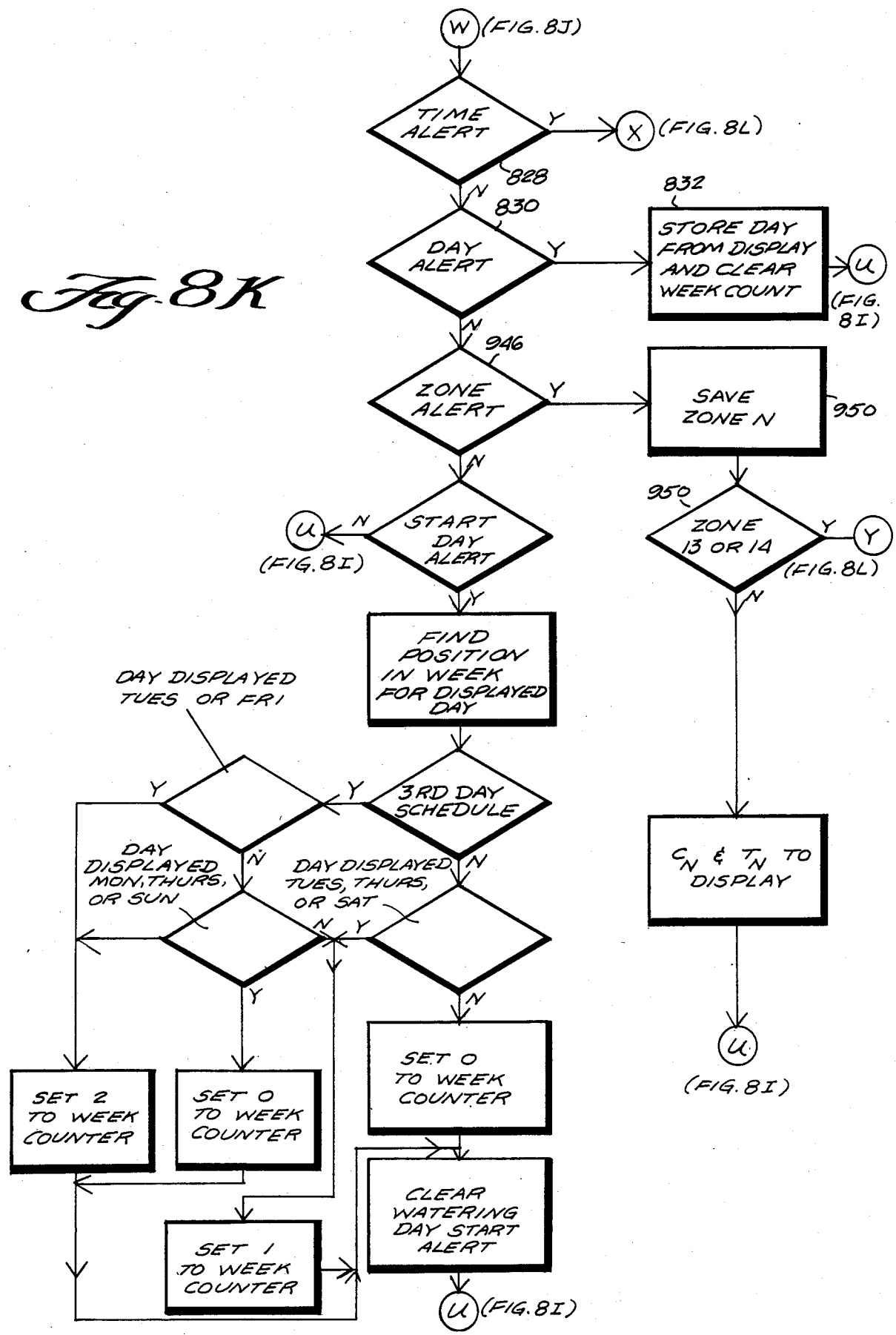

Processing then proceeds to step 906 in FIG. 8C which determines whether the controller is in the manual mode. In the present example, it is not in the manual mode so processing proceeds to step 908 which determines whether 13 or 14 has been entered as the zone number. Since only a single digit has been entered in the present example, this determination must be negative so that the controller assumes that one of zones 1 through 12 have been entered. Accordingly, at step 910, zone data is selected, applicator type and vegetation need codes are retrieved for the appropriate zone at step 912, and the number of cycles per application and the on time per cycle for that zone are displayed at step 914.

The first zone number to be entered is "1". After entry of the zone number, then applicator type key 118 may be depressed to change the applicator type displayed. If the applicator type key is depressed, the decision at step 782 in FIG. 8A is positive, while the decisions at steps 784 and 788 in FIG. 8D are negative.

Accordingly, processing proceeds to step 790 at which it is determined that applicator key 118 has been depressed. At step 916 it is determined whether a zone alert has been set. The zone alert created at step 880 in FIG. 8G has never been cleared after depression of zone key 112 so this determination is positive. At step 918, microprocessor 164 determines whether either number 13 or 14 has been entered as the zone. In this example, this determiantion is negative so processing proceeds to step 920 which determines whether a "0" is displayed as the applicator type. If so, the applicator type display is advanced to display a "R" at step 922. If at step 920 it is determined that the applicator display is not "0", then processing proceeds to step 924 at which it is determined whether a "R" is displayed as the applicator type. If it is, then the applicator type display is advanced to "S" at step 926. If not, the display is advanced to "O" at step 928. This ends the key execution subroutine.

The applicator type key can be pressed any number of times and this procedure will be carried out each time.

Also, the possibility exists that vegetation need key 120 may be depressed. If so, the decision at step 782 in FIG. 8A will be positive and the decisions at steps 784, 788 and 790 in FIG. 8D will be negative. Thus processing proceeds to step 792 in FIG. 8E. Since vegetation use key 120 has been depressed, step 930 determines whether a zone alert has been set. If a zone alert has not been set, vegetation use key 120 should have no effect so that key execution subroutine ends without any processing occurring with respect to depression of key 120.

In the present example, however, the zone alert has been set so that processing continues to step 932 in which it is determined whether zones 13 or 14 have been accessed. If they have, since these are drip zones, the vegetation use portion of the display should be blanked. This is accomplished at step 934. In the present example, however, zone 1 is being processed. Accordingly, processing passes to step 936 at which it is determined whether an "L" is being displayed in the vegetation use portion of display 140. If so, depression of vegetation use key 120 causes the display to advance to "A" in step 938. If an "L" is not being displayed as determined by step 936, step 940 determines whether an "A" is being displayed. If so, the display is advanced to "H" in step 942. If an "A" is not being displayed, then the display is advanced to "L" in step 944. This ends the key execution subroutine for depression of vegetation use key 120. Repeated depressions of key 120 cause the display to cycle through "L", "A" and "H" as controlled by steps 936 through 944.

To complete the entry of data for zone 1, enter key 126 is depressed. As a result, the determination at steps 782 in FIG. 8A and 784 in FIG. 8D are both positive so that processing proceeds to step 820 in FIG. 8I. The zone alert remains set so that the decision at step 820 is negative. Although controller 64 is in the program mode, none of the start time alert, end time alert and time alert are set so that the determination at step 822 in FIG. 8J produces a positive determination while steps 824 and 826 in FIG. 8J and steps 828 and 830 in FIG. 8K produce negative determinations. Thus, processing proceeds to step 946 which produces a positive determination that a zone alert has been set. At step 948, the data for the zone that has been entered is saved and at step 950, it is determined whether that zone is zone 13 or 14. In this case zone 1 has been entered so the determination is negative. At step 952, the cycles per application and the on time per cycles for that zone are displayed.

Processing then proceeds to step 834 in FIG. 8I which causes a delay in the processing to occur. After the processing, the indicated alerts are cleared in steps 836, 838 and 840 before the key execution subroutine ends.

The entry of data for zone 2 is identical for that of zone 1 so a detailed description will not be provided. However, the processing for zone 14 is a bit different and will now be described. Upon depressing zone key 112, processing occurs identical to that set forth with respect to zone 1. The result is that a zone alert is set and the digit count is set to five. Next a "1" is entered with digit keys 104 and again, processing occurs the same as when "1" was pressed with respect to zone 1. Then, digit key "4" of keys 104 is depressed. This causes negative determinations at steps 782, 810, 812 and 814 in FIG. 8A and step 816 of FIG. 8B. Accordingly, step 888 is next processed and since the zone alert has been set, a positive determination is made. At step 890, since the digit count has been decremented to four upon entry of the "1", the determination is negative, while the determination at step 898 is positive. Therefore, processing proceeds to step 900 in which it is determined whether the new digit is zero through four. Since this is the second digit of the zone, and since there can be only 14 zones, if the new digit is greater than 4, an invalid zone entry has been made so that this entry is not displayed or processed. Since, in the present example, "4" has been entered, the determination at step 900 is positive so that processing proceeds to step 902. It has now been determined that a second digit has been entered as the zone number. Therefore, the first digit could only have been a "1". If the old digit was not one, an invalid entry has been made and the new entry is not considered. Since, in the present example, the old digit is one, processing proceeds to step 904 in which the display is shifted and the new digit is displayed on the right. The digit count is decremented at step 896.

Processing then proceeds to step 906 in FIG. 8C in which it is determined that the controller is not in the manual mode. However, at step 908, it is determined that zone 13 or 14 has been entered. Zone 14 has been entered so that the determination at step 954 is negative. Then, the data for zone 14 is read to determine whether it is set for drip or omit at step 956. Alternatively, if zone 13 had been selected, at step 958, the data for zone 13 would have been read to determine whether it is set for drip or omit.

Whatever data has been read is now examined in step 960 and if omit data is stored, "O" is displayed in the applicator type position of display 140 at step 962. At step 964, a blank is displayed in both the vegetation use and cycles left portions of display 140 before the key execution subroutine ends.

If omit data had not been stored with respect to zones 13 and 14, a "D" is displayed in the applicator type portion of display 140 at step 966. Also, a blank is displayed in the vegetation use portion of display 140. At step 968 it is again determined whether zone 13 or zone 14 has been accessed. Depending on which zone is accessed, the drip time for that zone is displayed in the zone time portion of display 140 at steps 970 and 972.

Applicator key 118 may then be depressed to change the applicator type between drip and omit for zone 14. Upon depression of key 118, the decision at step 782 in FIG. 8A is positive, while the decisions at step 784 and 788 in FIG. 8D are negative. Processing proceeds to step 790. Since the applicator type key has been depressed, a zone alert has been set and zone 14 has been entered, the determination at steps 790, 916 and 918 are all positive. Thus, processing proceeds to step 974 where it is determined whether a "D" or an "O" are being displayed in the applicator type portion of display 140. Steps 976 and 978 cause the display to change from one indication to the other.

Next, to enter the desired run time for zone 14, time key 110 is depressed. As a result, processing proceeds to a positive determination it step 842 in FIG. 8G. As a result, at step 844, all of the key 102 alerts, except the zone alert, are cleared and the time alert is set. At step 846, it is determined that the zone alert has been set so that processing proceeds to step 980 where it is determined that "D" is indicated for zone 14 as the type of applicator. Accordingly, at step 982, the zone time portion of display 140 is loaded with 360 minutes, the digit count is set to 4 in step 850 and the day is displayed in step 852 before the key execution sequence ends.

In the example, the run time for zone 14 is to be set at 240 minutes. Therefore, "240" is depressed on keys 104. With the depression of each key, processing proceeds to step 814 (FIG. 8A) at which it is determined that a time alert has been set. At step 854, it is determined that a zone alert has also been set. Therefore, processing proceeds to step 984 where it is determined that zone 14 has been set for a drip type applicator. It is then necessary to identify the display position for each of the entered digits. At step 856, it is determined whether the digit count is 4. Since the digit count had been set to 4 at step 850 in FIG. 8G, this determination is positive so that zeros are placed in the display and the entered digit is positioned at the right in step 860 and the digit count is decremented to 3 in step 862. With the entry of the last two digits of the run time, the determination at step 856 will be negative, but the determination at step 864 will be positive. Therefore, at step 866, for each digit, the display is shifted to the left and the new digit is added. After the three digits have been entered, the digit count will have been decremented to one. Therefore, if another digit is entered, the determinations at step 856 and step 864 will be negative. Since the digit count is one, processing will proceed from step 868 to step 870 where, it is determined that a zone run time is being entered. Accordingly, the depressed key is ignored since a drip zone run time cannot extend beyond three digits.

To enter the run time for zone 14, enter key 126 is then depressed. Accordingly, processing proceeds to steps 828 of FIG. 8K and 874 of FIG. 8L at which it is determined that both a time alert and a zone alert are set. Since zone 14 has been selected, microprocessor 164 passes from step 986 to step 988. At step 992, zone 14 is not to be omitted, and at step 994 zone 13 has not been selected. Accordingly, the designated drip for zone 14 is stored at step 996 and displayed at step 998. Processing then proceeds to step 834 in FIG. 8I, and after the delay, the appropriate alerts are cleared as indicated in steps 836, 838 and 840 before the key execution subroutine ends.

Next, the start time must be entered. Accordingly, upon depression of start time key 114, processing proceeds to step 1000 in FIG. 8H. Since start time key 114 has been depressed, all key 102 alerts are cleared and the start time alert is set at step 1002. Since controller 64 is in the programming mode, from step 1004 processing progresses to step 1006. An end time was not entered the last so that at step 1008 the day position is blanked, and the start time previously stored is displayed at steps 1010 before the key execution subroutine ends.

Then, it is necessary to depress the keys associated with the desired start time. Thus, with depression of the first key, the determination at step 810 of FIG. 8A is positive so that microprocessor 164 proceeds to identify the display position as discussed above with respect to steps 856 through 872.

After the three or four time digits have been entered, the am/pm designation may be changed in accordance with the procedure as described above with respect to steps 874 through 882 in FIG. 8F. Then, enter key 126 is depressed to enter the new start time. Accordingly, processing proceeds to step 824 in FIG. 8J which determines that a start time alert has been set. At step 1012, the new start time is retrieved and displayed, and at step 1014, any end time entered alert is cleared and a start time entered alert is set. The start time entered alert provides an indication that an operator has specified a start time, whereas the end time entered alert indicates that an operator has specified an end time. Then, after a delay determined by step 834 in FIG. 8I, indicated alerts are cleared in steps 836, 838 and 840.

If it is desired to display the end time, end time key 116 is depressed. As a result, processing proceeds to step 788 in FIG. 8D. Since the end time key has been depressed, all key 102 alerts are cleared at steps 1016 and the end time alert is set. Since controller 64 is in the programming mode, and the end time entered alert has been cleared, processing proceeds through steps 1018 and 1020 to step 1022. At this step, the calculate TRT subroutine is called which is illustrated in FIGS. 6A through 6F. As explained above, this subroutine calculates the particular manner in which cycles are arranged in each application. Of importance at step 1022 is total run time, i.e., the period for an application. After the total run time is determined in the calculate TRT subroutine, step 1024 calculates the end time by adding the start time and the total run time. The end time is displayed at step 1026 and the end time alert is set set at step 1028 and the digit counter is set to 4 before ending the key execution subroutine.

The operations are somewhat different when function switch 128 is in the manual position. If, in the manual position, zone key 112 is depressed, processing proceeds to step 878 in FIG. 8G where it is determined that the zone key was pressed. At step 880, all key 102 alerts are cleared and the zone alert is set. At step 882, the digit count is set to 5. Step 884 determines whether the controller is in the program mode. In this case, the controller is in the manual mode so processing proceeds to step 1030 at which a positive determination is made. If the determinations at steps 884 and 1030 prove negative, then the device is in the automatic mode. In the automatic mode, the zone key has no function so at step 1032, the zone key alert is cleared and the subroutine ends. However, in the manual mode, the function portion of display 142 is blanked at step 1034. The manual time left counter is cleared at step 1036 and "ALL OFF" is displayed at step 1038.

Then a key is depressed indicative of the zone which is to be manually operated. Processing proceeds to step 906 in FIG. 8C where a positive determination will be made that the controller is in the manual mode. At steps 1040 and 964 the applicator type portion, vegetation use portion and cycles left portion of display 140 are blanked and "OFF" is displayed in the zone time portion.

To initiate manual operation, manual on/off key 124 is depressed. As a result, processing proceeds to step 794 in FIG. 8E at which a positive determination is made that the manual on/off key has been depressed. At step 1042, microprocessor 164 determines that the controller is in the manual mode so that step 1044 determines whether a dash is displayed in the function portion of display 142. Since a dash is not displayed, a dash is entered at step 1046.

Note that if the manual on/off key is employed to turn off the manually started cycle, the determination at step 1040 will be positive. Accordingly, at step 1048, the function portion of display 142 is blanked, the manual time left register is cleared at step 1050 and "ALL OFF" is displayed at step 1052.

Returning to the situation where the manual on/off key is depressed to begin a manual operation, processing passes from step 1046 in FIG. 8E to step 820 in FIG. 8I. Since the zone alert was set when zone key 112 was depressed, the determination will be negative so that processing proceeds through step 822 in FIG. 8J to step 1054. Since the manual mode has been entered and a zone alert set, but a time alert has not been set, processing passes through steps 1056 and 1058 to step 1060. When the zone number was entered, the digit count was decremented from 5 so that the determination at step 1060 will be negative. As a result, the zone time portion of display 140 is set to 60 and this value is stored as the manual time left in step 1064. Processing then proceeds to step 834 in FIG. 8I in which a delay is incurred. After the delay, the indicated alerts are cleared at steps 836, 838 and 840.

If a time other than 60 minutes is to be set for the manual operation, while controller 64 is in the manual mode, zone key 112 and the appropriate zone number is depressed. Then, time key 110 is depressed. This causes processing to proceed to step 842 in FIG. 8G. Since the time key was pressed, step 844 clears all key 102 alerts except the zone alert and sets the time alert. Since the zone alert has been set, step 980 determines that drip is not indicated. At step 1062, it is determined that the function of the controller is at manual. Accordingly, at step 1064, 60 minutes is displayed in the zone time portion of display 140 at step 1064, the digit count is set to 4 and the day is displayed at steps 850 and 852.

Then, the actual digits for the desired on time for the manual cycle are sequentially entered. With each key depression, processing will proceed to step 1066 of FIG. 8A at which it will be determined that the mode of the controller is manual. Accordingly, microprocessor 164 will go on to identify the display position of the digit just entered in steps 856 through 872.

After the digit keys have been pressed to set the time, manual on/off key 124 is depressed. As a result, processing proceeds to step 794 in FIG. 8E. At step 1042, it is determined that the controller is in a manual mode and at step 1044 it is determined that a dash is not presently displayed in the function portion of display 140. As a result, step 1046 causes a dash to be displayed and processing proceeds to step 820 in FIG. 8I. There, since the zone alert and time alert are set, processing proceeds to step 1054 in FIG. 8J at which it is determined that the controller is in the manual mode. Step 1056 determines that the zone alert is set and step 1058 determines that the time alert has been set. At step 1066, it is determined whether the digit count is 4. If the count is 4, it means that no digit was entered, which is inappropriate for initiating a manual operation. Accordingly, steps 834 through 840 are executed in FIG. 8I which essentially ignore the depression of manual on/off key 124.

Typically, the digit count will be less than 4 at step 1066 so that the manual time left is stored and displayed at step 1064 before steps 834 through 840 are performed in FIG. 8I.

The final operation to be described is the manner in which programming can occur while in the automatic mode. As indicated above, this state is entered by depressing the "9" digit key four times followed by enter key 126. Since no alerts are set due to the controller being in the automatic mode, upon depression of the first 9, processing will pass from step 888 to step 1068 in FIG. 8B at which it will be determined that a watering day alert is not set. At step 1070, it is determined whether the entered digit is a 9. Since the digit is a 9, the auto program counter is decremented at step 1072 from its previous value of 4. After the fourth 9 is entered, the auto program counter will have been decremented to zero. Then, if enter key 126 is depressed, processing proceeds to step 820 in FIG. 8I where it is determined that all of the key 102 alerts are clear. At step 1074, it is determined that the controller is in the automatic mode. However, the manual on/off switch 124 was not depressed while in the automatic mode so the determination at step 1076 is negative. The determination at step 1078 is positive so that the auto program alert is set at step 1080. Then, any programming may be performed. For example, the data for zone 1 may be entered. Accordingly, zone key 112 is depressed so that processing proceeds to step 884 in FIG. 8G. The programming mode (which includes the auto programming mode) has been entered so that "OFF" is displayed in the zone at step 886. After entry of the appropriate zone number and all zone information in the manner as described above, enter key 126 is depressed. Depression of enter key 126 is processed in the manner identical as if function switch 128 is in the programming position.

Although only a single exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. Apparatus for controlling an irrigation system having a plurality of irrigation zones each having applicator means and means for selectively providing water to said applicator means in response to a control signal, said apparatus comprising:
    data entry means for manually entering prior to irrigation data related to conditions in each of said zones with respect to the amount of water needed to be applied and the soil water infiltration rate;
    processing means responsive to said data entry for performing the following functions: (1) accepting said conditions entered prior to irrigation with said data entry means, (2) determining for each zone the number of cycles and the length of time in each cycle that said applicator means applies water so that (a) the amount of water applied during each cycle does not exceed the amount of water the soil can absorb during that cycle and (b) the total amount of water needed in that zone is applied, and (3) organizing said number of cycles and said length of time for all of said zones to create an application program; and means responsive to said organizing function of said processing means for generating said control signals for said zones in accordance with the application program.

2. Apparatus for controlling an irrigation system having a plurality of irrigation zones each having applicator means and means for selectively providing water to said applicator means in response to a control signal, said apparatus comprising:

data entry means for manually entering prior to irrigation data related to condiitons in each of said zones including the soil water infiltration rate;

processing means responsive to said data entry means for performing the following functions: (1) accepting said conditions entered prior to irrigation with said data entry means, (2) determining for each zone the number of cycles and the length of time in each cycle that said applicator means applies water so that (a) the amount of water applied during each cycle does not exceed the amount of water the soil can absorb during that cycle and (b) the total amount of water needed in that zone is applied, and (3) organizing said number of cycles and said length of time for all of said zone to create and application program; and means responsive to said organizing function of said processing means for generating said control signals for said zones in accordance with the application program.

3. Apparatus as in claim 2 wherein:

said apparatus further comprises water volume entry means for manually entering data related to the overall amount of water needed in all of said zones;

said data entry means includes means for manually entering data related to the general amount of water needed by vegetation in each of said zones; and said processing means is further responsive to said water volume entry means for determining for each zone the number of cycles and the length of time in each cycle that said applicator means applies water so that the amount of water applied during each cycle does not exceed the amount of water the soil can absorb during that cycle, taking into consideration said water volume entry means and said data entry means, and the total amount of water needed in that zone is applied in accordance with said water volume entry means and said data entry means.

4. Apparatus as in claim 2 wherein:

said apparatus further comprises day entry means for manually entering data related to the days on which irrigation is to occur;

said data entry means includes means for manually entering data related to the amount of water needed by vegetation in each of said zones; and said processing means is also responsive to said day entry means for determining for each zone the number of cycles and the length of time in each cycle that said applicator means applies water so that the amount of water applied during each cycle, on the days specified, in accordance with the specified amount of water needed for vegetation, does not exceed the amount of water the soil can absorb during that cycle and the total amount of water needed in that zone is applied over the days selected in accordance with the selected amount of water needed for vegetation in each zone.

5. Apparatus as in claim 2 wherein:

said data entry means includes means for manually entering data related to the type of said applicator means employed in each zone and the amount of water needed by vegetation in each zone; and said processing means determines the number of cycles and the length of time in each cycle for each of said zones in accordance with the type of said applicator means specified and the specified amount of water needed by vegetation in each of said zones.

6. Apparatus as in claim 2 wherein:

said apparatus further comprises water volume entry means for manually entering data related to the overall amount of water needed to be applied to all of said zones and day entry means for manually entering data related to the days on which irrigation is to occur;

said data entry means includes means for manually entering data related to the amount of water needed by vegetation in each of said zones; and said processing means is also responsive to said water volume entry means and said day entry means for determining for each zone the number of cycles and the length of time in each cycle in accordance with the overall water volume specified by said water volume entry means, the days on which irrigation is to occur as specified by said day entry means and the specified amount of water needed for vegetation in each of said zones.

7. Apparatus as in claim 2, wherein:

said apparatus further comprises water volume entry means for manually entering data related to the overall amount of water needed to be applied to all of said zones;

said data entry means includes means for manually entering data related to the type of said applicator means employed in each of said zones and the amount of water needed to be applied to vegetation in each of said zones; and said processing means is also responsive to said water volume entry means for determining for each zone the number of cycles and the length of time in each cycle in accordacne with the overall water volume specified, the type of said applicator means specified and the water needs of vegetation in each zone specified.

8. Apparatus as in claim 2, wherein:

said apparatus further comprises day entry means for manually entering data related to the days on which irrigation is to occur;

said data entry means includes means for manually entering data related to the type of said applicator means employed in each zone and the amount of water needed to be applied for vegetation in each zone; and said processing means is also responsive to said water volume entry means for determining for each zone the number of cycles and the length of time in each cycle that said applicator means applies water in accordance with the specified days on which irrigation is to occur, the specified type of said applicator means employed in each zone and the specified amount of water needed for vegetation in each zone.

9. Apparatus for controlling an irrigation system having a plurality of irrigation zones each having applicator means and means for selectively providing water to said applicator means in response to a control signal, said apparatus comprising:
data entry means for manually entering prior to irrigation data related to conditions in each of said zone;
water volume entry means for manually entering data prior to irrigation related to the overall amount of water needed across all of said zones;
processing means responsive to said data entry means and said water volume entry means for performing the following functions: (1) accepting said conditions entered prior to irrigation with said data entry means and said overall amount of water entered prior to irrigation with said water volume entry means, (2) determining for each zone the number of cycles and the length of time in each cycle that said applicator means applies water so that (a) the amount of water applied during each cycle does not exceed the amount of water the soil can absorb during that cycel and (b) the total amount of water needed in that zone is applied, and (3) organizing said number of cycles and said length of time for all of said zones to create an application program; and
means responsive to said organizing function of said processing means for generating said control signals for said zones in accordance with the application program.

10. An irrigation system according to claim 9, wherein
said controlling means is also for testing said lines prior to generation of said control signals.

11. Apparatus for controlling an irrigation system having a plurality of irrigation zones each having applicator means and means for selectively providing water to said applicator means in response to a control signal, said apparatus comprising:
data entry means for manually entering prior to irrigation data related to conditions in each of said zones;
day entry means for manually entering prior to irrigation the days of the week on which irrigation is to occur;
processing means responsive to said data entry means and said day entry means for performing the following functions: (1) accepting said conditions entered prior to irrigation with said data entry means and said days entered prior to irrigation with said day entry means, (2) determining for each zone the number of cycles and the length of time in each cycle that said applicator means applies water during the selected days so that (a) the amount of water applied during each cycle does not exceed the amount of water the soil can absorb during that cycle, and (b) the total amount of water needed in that zone is applied during the selected days, and (3) organizing said number of cycles and said length of time for all of said zones to create an application program; and
means responsive to said organizing function of said processing means for generating said control signals for said zones in accordance with the application program.

12. Apparatus for controlling an irrigation system having a plurality of irrigation zones each having applicator means and means for selectively providing water to said applicator means in response to a control signal, said apparatus comprising:
data entry means for manually entering prior to irrigation data related to conditions in each of said zones including the type of said applicator means being used in each of said zones;
processing means responsive to said data entry means for performing the following functions: (1) accepting said conditions entered prior to irrigation with said data entry means, (2) determining for each zone the number of cycles and the length of time in each cycle that said applicator means applies water so that (a) the amount of water applied during each cycle does not exceed the amount of water the soil can absorb during that cycle, given the type of applicator means being employed, and (b) the total amount of water needed in that zone is applied, given the type of applicator means being employed, and (3) organizing said number of cycles and said length of time for all of said zones to create an application program: and
means responsive to said organizing function of said processing means for generating said control signals for said zones in accordance with the application program.

13. Apparatus for controlling an irrigation system having a plurality of irrigation zones each having applicator means and means for selectively providing water to said applicator means in response to a control signal, said apparatus comprising:
data entry means for manually entering prior to irrigation data related to conditions in each of said zones including a general indication of the amount of water needed by vegetation in each of said zones;
processing means responsive to said data entry means for performing the following functions: (1) accepting said conditions entered prior to irrigation with said data entry means, (2) determining for each zone the number of cycles and the length of time in each cycle that said applicator means applies water so that (a) the amount of water applied during each cycle does not exceed the amount of water the soil can absorb during that cycle, and (b) the total amount of water needed in that zone, as determined in accordance with the vegetation needs, is applied, and (3) organizing said number of cycles and said length of time for all of said zones to create an application program; and
means responsive to said organizing function of said processing means for generating said control signals for said zones in accordance with the application program.

14. Apparatus as in claim 2, 11, 12, or 13 wherein:
said apparatus further comprises water volume entry means for manually entering data related to overall changes in the amount of water needed in all of said zones; and
said processing means is responsive also to said water volume entry means for determining for each zone the number of cycles and the length of time in each cycle that said applicator means applies water so that the total amount of water needed in that zone in accordance with said data entry means and said water volume entry means is applied.

15. Apparatus as in claim 2, 12 or 13 wherein:

said apparatus further comprises day entry means for manually entering data related to the days of the week irrigation is to occur; and said processing means is also responsive to said day entry means for determining for each zone the number of cycles and the length of time in each cycle that said applicator means applies water so that the amount of water applied during each cycle does not exceed the amount of water the soil can absorb during that cycle and the total amount of water needed in that zone is applied in the selected days.

16. Apparatus as in claim 2 or 13 wherein:

said data entry means includes means for manually entering data related to the type of applicator means employed in each of said zones; and said processing means determines for each zone the number of cycles and the length of time in each cycle that said applicator means applies water so that the amount of water applied during each cycle, given the type of applicator means employed, does not exceed the amount of water the soil can absorb during that cycle and the total amount of water needed in that zone is applied in view of the type of applicator means employed.

17. Apparatus as in claim 2, 12 or 13 further comprising:

water volume entry means for manually entering data related to changes in the amount of water needed across all of said zones; and day entry means for entering data related to the days on which irrigation is to occur, said processing means also being responsive to said water volume entry means and said day entry means for determining for each zone the number of cycles and length of time in each cycle that said applicator means applies water so that the amount of water applied during each cycle does not exceed the amount of water the soil can absorb during that cycle and the total amount of water needed in that zone is applied in view of the total water volume selected with said water volume entry means and the days selected by said day entry means.

18. Apparatus as in claim 2 or 13, wherein:

said apparatus further comprises water volume entry means for manually entering data related to the overall amount of water needed generally in all of said zones;

said data entry means includes means for manually entering data related to the type of said applicator means employed in each of said zones; and said processing means is also responsive to said water volume entry means for determining for each zone the number of cycles and the length of time in each cycle that said applicator means applies water so that the amount of water applied during each cycle does not exceed the amount of water the soil can absorb during that cycle and the total amount of water needed in that zone is applied, taking into consideration the type of said applicator means specified and the overall water volume specified.

19. Apparatus as in claim 2 or 13 wherein:

said apparatus further comprises day entry means for manually entering data related to the days on which irrigation is to occur;

said data entry means includes means for specifying the type of said applicator means employed in each of said zones; and said processing means is also responsive to said day entry means for determining for each zone the number of cycles and the length of time in each cycle that said applicator means applies water so that the amount of water applied during each cycle, as determined in accordance with the entered days and type of applicator means selected, does not exceed the amount of water the soil can absorb during that cycle and the total amount of water needed in that zone is applied on the selected days in accordance with the type of said applicator means selected.

20. Apparatus as in claim 2 or 13 wherein:

said apparatus further comprises water volume entry means for manually entering data related to the overall amount of water needed to be applied in all of said zones and day entry means for manually entering data related to the days on which irrigation is to occur;

said data entry means includes means for manually entering data related to the type of said applicator means employed in each of said zones; and said processing menas is also responsive to said water volume entry means and said day entry means for determining for each zone the number of cycles and the length of time in each cycle in accordance with the overall water volume specified by said water volume entry means, the days on which irrigation is to occur as specified by said day entry means and the type of said applicator means employed in each zone.

21. Apparatus for controlling an irrigation system having a plurality of irrigation zones each having applicator means and means for selectively providing water to said applicator means in response to a control signal, said apparatus comprising:

water volume entry means for manually entering prior to irrigation data related to the overall amount of water needed to be applied to all of said zones;

day entry means for manually entering prior to irrigation data related to days on which irrigation is to occur;

data entry means for manually entering prior to irrigation data related to conditions in each of said zones including the amount of water needed to be applied for vegetation in each of said zones, the soil water infiltration rate and the type of said applicator means employed in each of said zones;

processing means, responsive to said water volume entry means, said day entry means and said data entry means for performing the following functions: (1) accepting said data entered prior to irrigation with said water volume entry means, day entry means and data entry means, (2) determining for each zone, in accordance with all of the accepted data, the number of cycles and the length of time in each cycle that said applicator means applies water so that (a) the amount of water applied during each cycle does not exceed the amount of water the soil can absorb during that cycle and (b) the total amount of water needed in that zone is applied, and (3) organizing said number of cycles and said length of time for all of said zones to create an application program; and means responsive to said organizing function of said processing means for generating said control signals for said zones in accordance with the application program.

22. Apparatus as in claim 1, 2, 9, 11, 12, 13 or 21, wherein:
said irrigation system includes a pump for providing water to said zones and valve means, responsive to said control signals, for selectively permitting water from said pump to reach said applicator means in each zone; and
said control signal generating means includes means for energizing said pump a predetermined period of time before any of said valve means are actuated.

23. Apparatus as in claim 1, 2, 9, 11, 12, 13 or 21, wherein:
said apparatus further comprises lines for conducting said control signals to said providing means in each of said zones; and
said processing means also causes said generating means to test at least said lines for zones to which water is to be provided prior to generating said control signals.

24. Apparatus as in claim 1, 2, 9, 11, 12, 13 or 21, wherein said processing means repeatedly performs said functions (1) through (3) at predetermined time intervals.

25. Apparatus as in claim 1, 2, 9, 11, 12, 13 or 21, wherein said organizing function of said processing means orders said cycles to occur sequentially, one cycle for each of said zones in which watering is to occur, before the next cycle is selected for any of said zones.

26. Apparatus as in claim 1, 2, 9, 11, 12, 13 or 21, wherein:
said apparatus further comprises start time entry means for manually entering a time at which said application program is to begin; and
said generating means generates said control signals in response to coincidence between said start time and the present time of day.

27. Apparatus as in claim 1, 2, 9, 11, 12, 13 or 21, wherein:
said apparatus further comprises means for generating a manual operation signal; and
said generating means initiates said control signals in response to said manual operation signal.

28. An irrigation system comprising:
a plurality of applicators disposed in a plurality of irrigation zones;
a pump for providing water to said irrigation zones;
valve means for providing water from said pump to said applicators in selected zones; and
control means for determining for each zone the number of cycles and the lengh of time in each cycle that said applicator apply water and for actuating said pump and said valve means in responsive to said determination, said pump being energized a predetermined period of time before any of said valve means is opened to provide water having at least a predetermined pressure to a corresponding one of said zones prior to opening of said valve means.

29. A method for controlling an irrigation system having a plurality of irrigation zones each having applicator means and means for selectively providing water to said applicator means in response to a control signal, said method comprising the steps of:
manually entering with an input device prior to irrigation data related to conditions in each of said zones including the amount of water needed to be applied and the soil water infiltration rate;
electronically determining for each zone the number of cycles and the length of time in each cycle that said applicator means applies water from said data manually entered prior to irrigation so that (a) the amount of water the soil can absorb during that cycle and (b) the total amount of water needed in that zone is applied;
electronically organizing the number of cycles and said length of time for all of said zones to create an application program; and
generating said control signals for said zones in accordance with the application program.

30. A method for controlling an irrigation system having a plurality of irrigation zones each having applicator means and means for selectively providing water to said applicator means in response to a control signal, said method comprising the steps of:
manually entering with an input device prior to irrigation data related to conditions in each of said zones including the soil water infiltration rate;
electronically determining for each zone the number of cycles and the length of time in each cycle that said applicator means applies water from said data manually entered prior to irrigation so that (a) the amount of water applied during each cycle does not exceed the amount of water the soil can absorb during that cycle and (b) the total amount of water needed in that zone is applied;
electronically organizing said number of cycles and said length of time for all of said zones to create an application program; and
generating said control signals for said zones in accordance with the application program.

31. A method as in claim 30 wherein:
said method further comprises the step of manually entering data related to the overall amount of water needed in all of said zones;
said conditions entering step enters data related to the general amount of water needed by vegetation in each of said zones; and
said determining step determines for each zone the number of cycles and the length of time in each cycle that said applicator means applies water so that the amount of water applied during each cycle does not exceed the amount of water the soil can absorb during that cycle, taking into consideration said entered data, and the total amount of water needed in that zone is applied in accordance with said entered data.

32. A method as in claim 30 wherein:
said method further comprises the step of manually entering data related to the days on which irrigation is to occur;
said conditions entering step enters data related to the amount of water needed by vegetation in each of said zones; and
said determining step determines for each zone the number of cycles and the length of time in each cycle that said applicator means applies water so that the amount of water applied during each cycle on the days specified in accordance with the specified amount of water needed for vegetation does not exceed the amount of water the soil can absorb during that cycle and the total amount of water needed in that zone is applied over the days selected in accordance with the selected amount of water needed for vegetation in each zone.

33. Apparatus as in claim 30 wherein:
said entering step enters data related to the type of said applicator means employed in each zone and the amount of water needed by vegetation in each zone: and
said determining step determines the number of cycles and the length of time in each cycle for each of said zones in accordance with the type of said applicator means specified and the specified amount of water needed by vegetation in each of said zones.

34. A method as in claim 30 wherein:
said method further comprises the steps of manually entering data related to the overall amount of water needed to be applied to all of said zones and manually entering data related to the days on which irrigation is to occur;
said conditions entering step enters data related to the amount of water needed by vegetation in each of said zones; and
said determining step determines for each zone the number of cycles and the length of time in each cycle in accordance with the overall water volume specified, the days on which irrigation is to occur and the specified amount of water needed for vegetation in each of said zones.

35. A method as in claim 30 wherein:
said method further comprises the step of manually entering data related to the overall amount of water needed to be applied to all of said zones;
said conditions entering step enters data related to the type of said applicator means imployed in each of said zones and the amount of water needed to be applied to vegetation in each of said zones; and
said determining step determines for each zone the number of cycles and the length of time in each cycle in accordance with the overall water volume specified, the type of said applicator means specified and the water needs of vegetation in each zone specified.

36. A method as in claim 30 wherein:
said method further comprises the step of manually entering data related to the days on which irrigation is to occur;
said conditions entering step enters data related to the type of said applicator means employed in each zone and the amount of water needed to be applied for vegetation in each zone; and
said determining step determines for each zone the number of cycles and the length of time in each cycle that said applicator means applies water in accordance with the specified days on which irrigation is to occur, the specified type of said applicator means employed in each zone and the specified amount of water needed for vegetation in each zone.

37. A method for controlling an irrigation system having a plurality of irrigation zones each having applicator means and means for selectively providing water to said applicator means in response to a control signal, said method comprising the steps of:
manually entering with an input device prior to irrigation data related to conditions in each of said zones;
manually entering with an input device prior to irrigation data related to the overall amount of water needed across all of said zones;
electronically determining for each zone the number of cycles and the length of time in each cycle that said applicator means applies water from said data manually entered prior to irrigation so that (a) the amount of water applied during each cycle does not exceed the amount of water the soil can absorb during that cycle and (b) the total amount of water needed in that zone is applied;
electronically organizing said number of cycles and said length of time for all of said zones to create an application program; and
generating said control signals for said zones in accordance with the application program.

38. A method as in claim 37 further comprising the step of
testing said lines prior to generation of said control signals.

39. A method for controlling an irrigation system having a plurality of irrigation zones each having applicator means and means for selectively providing water to said applicator means in response to a control signal, said method comprising the steps of:
manually entering with an input device prior to irrigation data related to conditions in each of said zones;
manually entering with an input device prior to irrigation the days of the week on which irrigation is to occur;
electronically determining for each zone the number of cycles and the length of time in each cycle that said applicator means applies water during the selected days from said data manually entered prior to irrigation so that (a) the amount of water applied during each cycle does not exceed the amount of water the soil can absorb during that cycle, and (b) the total amount of water needed in that zone is applied during the selected days;
electronically organizing said number of cycles and said length of time for all of said zones to create an application program; and
generating said control signals for said zones in accordance with the application program.

40. A method for controlling an irrigation system having a plurality of irrigation zones each having applicator means and means for selectively providing water to said applicator means in response to a control signal, said method comprising the steps of:
manually entering with an input device prior to irrigation data related to conditions in each of said zones including the type of said applicator means being used in each of said zones;
electronically determining for each zone the number of cycles and the length of time in each cycle that said applicator means applies water from said data manually entered prior to irrigation so that (a) the amount of water applied during each cycle does not exceed the amount of water the soil can absorb during that cycle, given the type of applicator means being employed, and (b) the total amount of water needed in that zone is applied, given the type of applicator means being employed;
electronically organizing said number of cycles and said length of time for all of said zones to create an application program; and generating said control signals for said zones in accordance with the application program.

41. A method for controlling an irrigation system having a plurality of irrigation zones each having applicator means and means for selectively providing water to said applicator means in response to a control signal, said method comprising the steps of:

manually entering with an input device prior to irrigation data related to conditions in each of said zones including a general indication of the amount of water needed by vegetation in each of said zones;

electronically determining for each zone the number of cycles and the length of time in each cycle that said applicator means applies water from said data manually entered prior to irrigation so that (a) the amount of water applied during each cycle does not exceed the amount of water the soil can absorb during that sycle, and (b) the total amount of water needed in that zone, as determined in accordance with the vegetation needs, is applied;

electronically organizing said number of cycles and said length of time for all of said zones to create an application program; and generating said control signals for said zones in accordance with the application program.

42. A method as in claim 30, 39, 40 or 41 wherein:

said method further comprises the step of manually entering data related to overall changes in the amount of water needed in all of said zones; and said determining step determines for each zone the number of cycles and the length of time in each cycle that said applicator means applies water so that the total amount of water needed in that zone in accordance with said entered data is applied.

43. A method as in claim 30, 40 or 41 wherein:

said method further comprises the step of manually entering data related to the days of the week irrigation is to occur; and said determining step determines for each zone the number of cycles and the length of time in each cycle that said applicator means applies water so that the amount of water applied during each cycle does not exceed the amount of water the soil can absorb during that cycle and the total amount of water needed in that zone is applied in the selected days.

44. A method as in claim 30 or 41 wherein:

said entering step enters data related to the type of applicator means employed in each of said zones; and said determining step determines for each zone the number of cycles and the length of time in each cycle that said applicator means applies water so that the amount of water applied during each cycle, given the type of applicator means employed, does not exceed the amount of water the soil can absorb during that cycle and the total amount of water needed in that zone is applied in view of the type of applicator means employed.

45. A method as in claim 30, 40 or 41 further comprising the steps of:

manually entering data related to changes in the amount of water needed across all of said zones; and entering data related to the days on which irrigation is to occur, said determining step also determining for each zone the number of cycles and length of time in each cycle that said applicator means applies water so that the amount of water applied during each cycle does not exceed the amount of water the soil can absorb during that cycle and the total amount of water needed in that zone is applied in view of the total water volume selected.

46. A method as in claim 30 or 41, wherein:

said method further comprises the step of manually entering data realted to the overall amount of water needed generally in all of said zones;

said conditions entering step also enters data related to the type of said applicator means employed in each of said zones; and said determining step determines for each zone the number of cycles and the length of time in each cycle that said applicator means applies water so that the amount of water applied during each cycle does not exceed the amount of water the soil can absorb during that cycle and the total amount of water needed in that zone is applied, taking into consideration the type of said applicator means specified and the overall water volume specified.

47. A method as in claim 30 or 41 wherein:

said method further comprises the step of manually entering data related to the days on which irrigation is to occur;

said conditions entering step specifies the type of said applicator means employed in each of said zones; and said determining step determines for each zone the number of cycles and the length of time in each cycle that said applicator means applies water so that the amount of water applied during each cycle, as determined in accordance with the entered days and type of applicator means selected, does not exceed the amount of water the soil can absorb during that cycle and the total amount of water needed in that zone is applied on the selected days in accordance with the type of said applicator means selected.

48. A method as in claim 30 or 41 wherein:

said method further comprises the steps of manually entering data related to the overall amount of water needed to be applied in all of said zones and manually entering data related to the days on which irrigation is to occur;

said conditions entering step enters data related to the type of said applicator means employed in each of said zones; and said determining step determines for each zone the number of cycles and the length of time in each cycle in accordance with the overall water volume specified, the days on which irrigation is to occur and the type of said applicator means employed in each zone.

49. A method for controlling an irrigation system having a plurality of irrigation zones each having applicator means and means for selectively providing water to said applicator means in response to a control signal, said method comprising the steps of:

manually entering with an input device prior to irrigation data related to the overall amount of water needed to be applied to all of said zones;

manually entering with an input device prior to irrigation data related to days on which irrigation is to occur;

manually entering with an input device prior to irrigation data related to conditions in each of said zones including the amount of water needed to be applied for vegetation in each of said zones, the soil water infiltration rate and the type of said applicator means employed in each of said zones;

electronically determining for each zone, in accordance with all of the accepted data, the number of cycles and the length of time in each cycle that said applicator means applies water from said data manually entered prior to irrigation so that (a) the amount of water applied during each cycle does not exceed the amount of water the soil can absorb during that cycle and (b) the total amount of water needed in that zone is applied;

electronically organizing said number of cycles and said length of time for all of said zones to create an application program; and generating said control signals for said zones in accordance with the application program.

50. A method as in claims 29, 30, 37, 39, 40, 41 or 49, wherein:
said irrigation system includes a pump for providing water to said zones and valve means, responsive to said control signals, for selectively permitting water from said pump to reach said applicator means in each zone; and
said control signal generating step includes the step of energizing said pump a predetermined period of time before any of said valve means are actuated to provide water having at least a predetermined pressure to a corresponding one of said zones prior to opening of said valve means.

51. A method as in claim 29, 30, 37, 39, 40, 41, or 49, wherein:
lines conduct said control signals to said providing means in each of said zones; and
said method further comprises the step of testing at least said lines for zones to which water is to be provided prior to generating said control signals.

52. A method as in claim 29, 30, 37, 39, 40, 41 or 49, wherein said determining and organizing steps are repeatedly performed at predetermined time intervals.

53. A method as in claim 29, 30, 37, 39, 40, 41 or 49, wherein said organizing step orders said cycles to occur sequentially, one cycle for each of said zones in which watering is to occur, before the next cycle is selected for any of said zones.

54. A method as in claim 29, 30, 37, 39, 40, 41, or 49, wherein:
said method further comprises the step of manually entering a time at which said application program is to begin: and
said generating step generates said control signals in response to coincidence between said start time and the present time of day.

55. A method as in claim 29, 30, 37, 39, 40, 41 or 49, wherein:
said method further comprises the step of generating a manual operation signal; and
said generating step initiates said control signals in response to said manual operation signal.

56. A method of operating an irrigation system having a plurality of applicator means disposed in a plurality of irrigation zones, a pump for providing water to said irrigation zones, and valve means for providing water from said pump to selected zones, said method comprising the steps of:
determining for each zone the number of cycles and the length of time in each cycle that said applicator means applies water; and
actuating said pump and said valve means in response to said determination, said pump being energized a predetermined period of time before any of said valve means is opened to provide water having at least a predetermined pressure to a corresponding one of said zones prior to opening of said valve means.

* * * * *